(12) United States Patent
Rassat et al.

(10) Patent No.: US 9,954,245 B2
(45) Date of Patent: Apr. 24, 2018

(54) MANDREL FOR ELECTRODE ASSEMBLIES

(71) Applicant: Medtronic, Inc., Minneapolis, MN (US)

(72) Inventors: Jay T. Rassat, Buffalo, MN (US); Michael J. Nidelkoff, White Bear Lake, MN (US); Jeffrey J. Clayton, Ramsey, MN (US); Seth M. Humphrys, Golden Valley, MN (US); Paul B. Aamodt, Minnetonka, MN (US); Steven J. May, Minnetonka, MN (US)

(73) Assignee: MEDTRONIC, INC., Minneapolis, MN (US)

( * ) Notice: Subject to any disclaimer, the term of this patent is extended or adjusted under 35 U.S.C. 154(b) by 217 days.

(21) Appl. No.: 14/841,045

(22) Filed: Aug. 31, 2015

(65) Prior Publication Data

US 2015/0372336 A1 Dec. 24, 2015

Related U.S. Application Data

(62) Division of application No. 13/456,692, filed on Apr. 26, 2012, now Pat. No. 9,130,223.

(51) Int. Cl.
*H01M 10/04* (2006.01)
*H01M 2/26* (2006.01)
(Continued)

(52) U.S. Cl.
CPC ....... *H01M 10/0409* (2013.01); *H01M 2/263* (2013.01); *H01M 10/0431* (2013.01); *H01M 10/052* (2013.01); *H01M 10/0587* (2013.01); *H01M 2220/30* (2013.01); *Y02E 60/122* (2013.01)

(58) Field of Classification Search
CPC ........ H01M 10/0409; H01M 10/0431; H01M 10/052; H01M 10/0587; H01M 2/263; H01M 2220/30; Y02E 60/122
See application file for complete search history.

(56) References Cited

U.S. PATENT DOCUMENTS 3,615,834 A 10/1971 Sundberg
3,791,868 A 2/1974 Compton et al.
(Continued)

FOREIGN PATENT DOCUMENTS

CN 201440435 U 4/2010
EP 2 320 496 A1 5/2011
(Continued)

OTHER PUBLICATIONS

U.S. Appl. No. 13/332,686, filed Dec. 21, 2011, Humphrys.
(Continued)

*Primary Examiner* — Gregg Cantelmo
(74) *Attorney, Agent, or Firm* — Mueting, Raasch & Gebhardt, P.A.

(57) ABSTRACT

A mandrel for use in a battery assembly may include a positive mandrel portion and a negative mandrel portion. Each of the mandrel portions may include a connector element coupling region and an electrode coupling region. The connector element coupling region may be configured to be coupled to a connector element and the electrode coupling region may be configured to be coupled to an electrode.

20 Claims, 45 Drawing Sheets

(51) Int. Cl.
*H01M 10/052* (2010.01)
*H01M 10/0587* (2010.01)

(56) References Cited

U.S. PATENT DOCUMENTS

| | | | |
|---|---|---|---|
| 4,092,386 A | 5/1978 | Rigstad | |
| 4,158,300 A | 6/1979 | Hug et al. | |
| 4,212,179 A | 7/1980 | Juergens | |
| 4,328,945 A | 5/1982 | Perkins | |
| 4,476,624 A | 10/1984 | Klein et al. | |
| 4,863,815 A | 9/1989 | Chang et al. | |
| 4,879,190 A | 11/1989 | Lundsgaard | |
| 4,975,095 A | 12/1990 | Strickland et al. | |
| 5,047,068 A | 9/1991 | Stoklosa | |
| 5,326,652 A | 7/1994 | Lake | |
| 5,486,215 A | 1/1996 | Kelm et al. | |
| 5,958,088 A | 9/1999 | Vu et al. | |
| 6,391,068 B2 | 5/2002 | Yoshida et al. | |
| 6,485,859 B1 | 11/2002 | Szyskowski | |
| 6,596,427 B1 | 7/2003 | Wozniczka et al. | |
| 6,670,071 B2 | 12/2003 | Skinlo et al. | |
| 6,780,207 B1* | 8/2004 | Han | H01M 10/052 29/623.1 |
| 6,881,233 B2 | 4/2005 | Cho et al. | |
| 7,070,881 B2 | 7/2006 | Kishiyama et al. | |
| 7,141,332 B2 | 11/2006 | Kejha et al. | |
| 7,378,181 B2 | 5/2008 | Skinlo | |
| 7,432,012 B2 | 10/2008 | Tsukamoto et al. | |
| 7,488,553 B2 | 2/2009 | Tsukamoto et al. | |
| 7,569,305 B2 | 8/2009 | Skinlo et al. | |
| 7,578,898 B2 | 8/2009 | Le Gal | |
| 7,601,461 B2 | 10/2009 | Skinlo et al. | |
| 7,632,603 B2 | 12/2009 | Tsukamoto et al. | |
| 7,833,648 B2 | 11/2010 | Park et al. | |
| 7,862,627 B2 | 1/2011 | Li et al. | |
| 7,879,486 B2 | 2/2011 | Tsukamoto et al. | |
| 8,778,521 B2 | 7/2014 | Nidelkoff et al. | |
| 2003/0091893 A1 | 5/2003 | Kishiyama et al. | |
| 2003/0134184 A1 | 7/2003 | Skinlo et al. | |
| 2003/0134185 A1* | 7/2003 | Nakahara | H01M 2/22 429/94 |
| 2004/0053115 A1 | 3/2004 | Skinlo | |
| 2004/0053116 A1 | 3/2004 | Skinlo | |
| 2005/0174092 A1 | 8/2005 | Dougherty et al. | |
| 2006/0085971 A1 | 4/2006 | Andrews et al. | |
| 2007/0138905 A1 | 6/2007 | Axelrod et al. | |
| 2007/0180686 A1 | 8/2007 | Woo | |
| 2008/0248375 A1 | 10/2008 | Cintra et al. | |
| 2011/0217576 A1* | 9/2011 | Ueda | H01M 2/26 429/94 |
| 2011/0247204 A1 | 10/2011 | Viavattine et al. | |
| 2011/0250479 A1 | 10/2011 | Viavattine et al. | |
| 2011/0250481 A1 | 10/2011 | Viavattine | |
| 2012/0084979 A1 | 4/2012 | Viavattine et al. | |
| 2012/0251854 A1 | 10/2012 | Kusama et al. | |
| 2013/0288116 A1 | 10/2013 | Rassat et al. | |

FOREIGN PATENT DOCUMENTS

| | | |
|---|---|---|
| JP | 06168736 A | 6/1994 |
| JP | 08-329958 | 12/1996 |
| JP | H10-64588 | 3/1998 |
| KR | 2003-053599 | 7/2003 |
| WO | WO 2011/077775 A1 | 6/2011 |
| WO | WO 2013/163151 A1 | 10/2013 |
| WO | WO 2013/163179 A1 | 10/2013 |
| WO | WO 2013/163189 A1 | 10/2013 |

OTHER PUBLICATIONS

U.S. Appl. No. 13/456,700, filed Apr. 26, 2012, Nidelkoff et al.
U.S. Appl. No. 13/456,714, filed Apr. 26, 2012, Nidelkoff et al.
International Search Report and Written Opinion dated Jun. 25, 2013 for PCT/US2013/037754; 9 pgs.
International Search Report and Written Opinion dated Jun. 24, 2013 for PCT/US2013/037794; 9 pgs.
International Search Report and Written Opinion dated Jun. 26, 2013 for PCT/US2013/037810; 12 pgs.

* cited by examiner

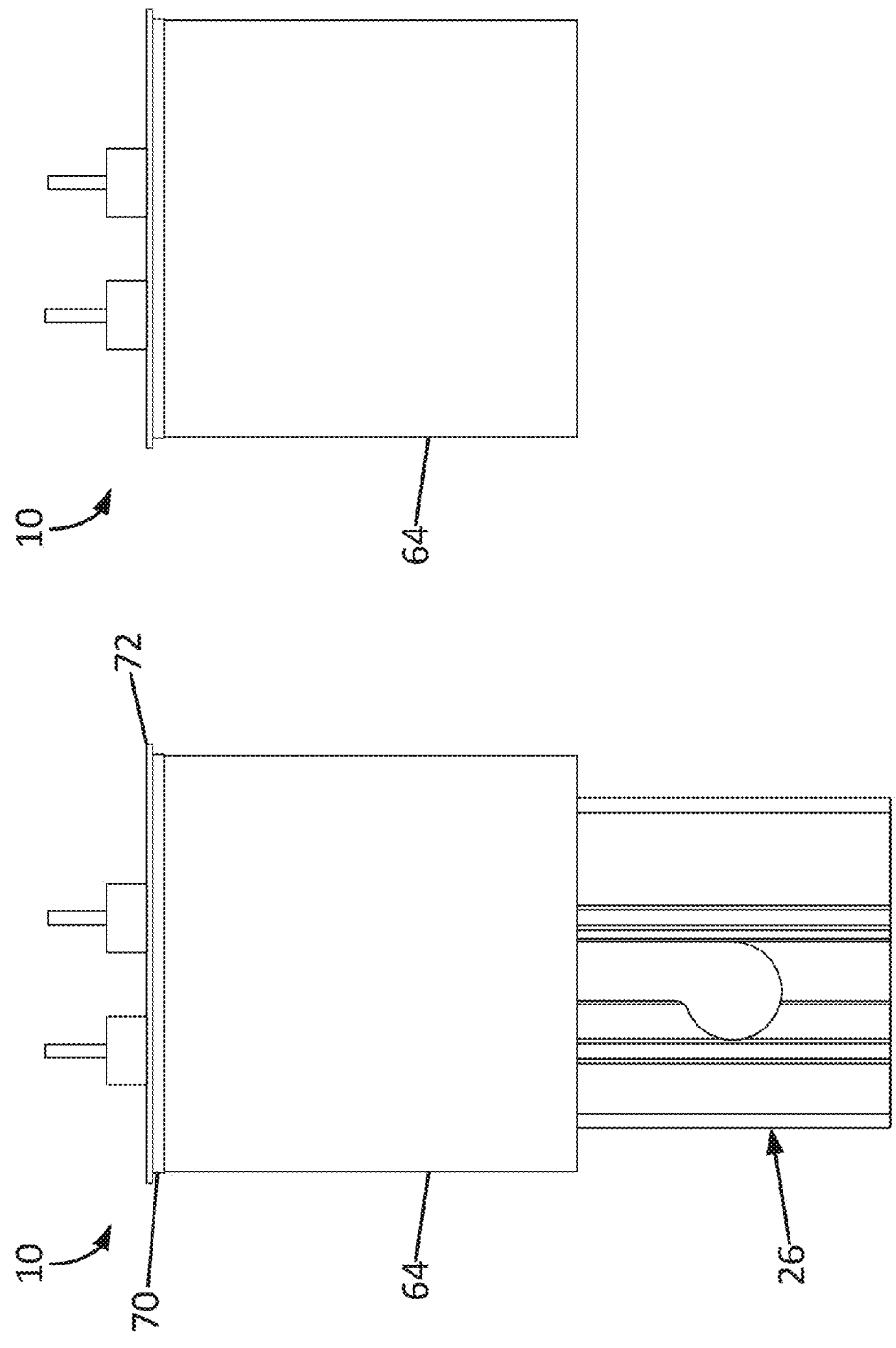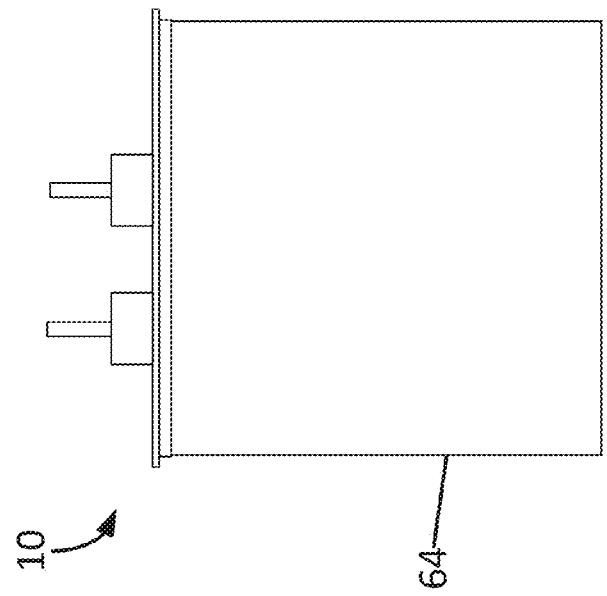

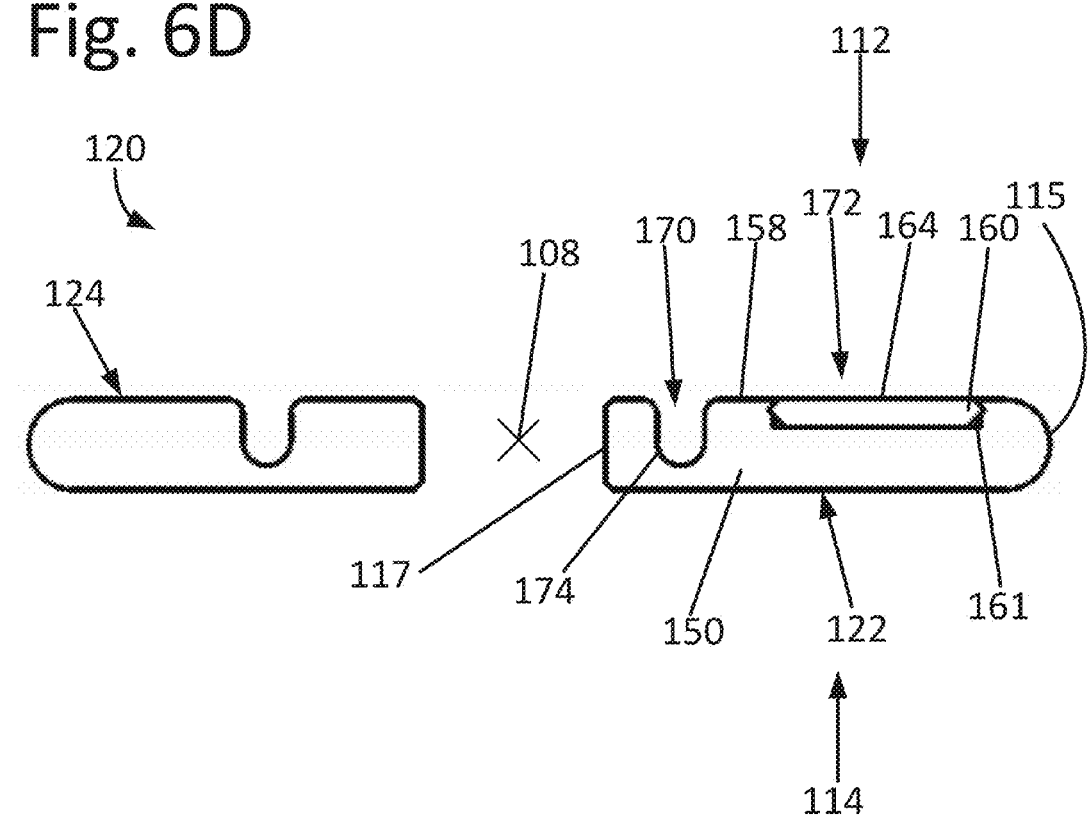

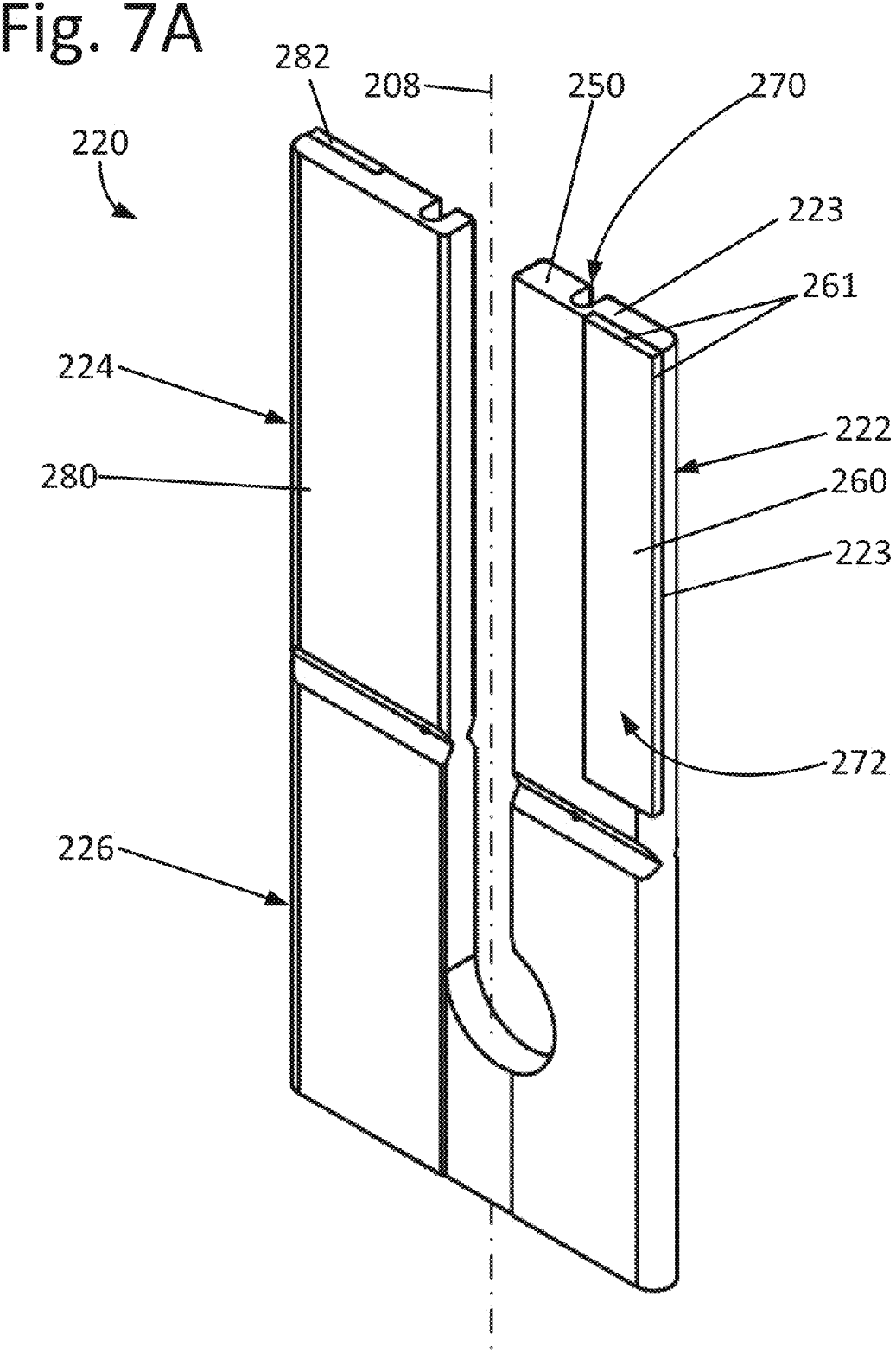

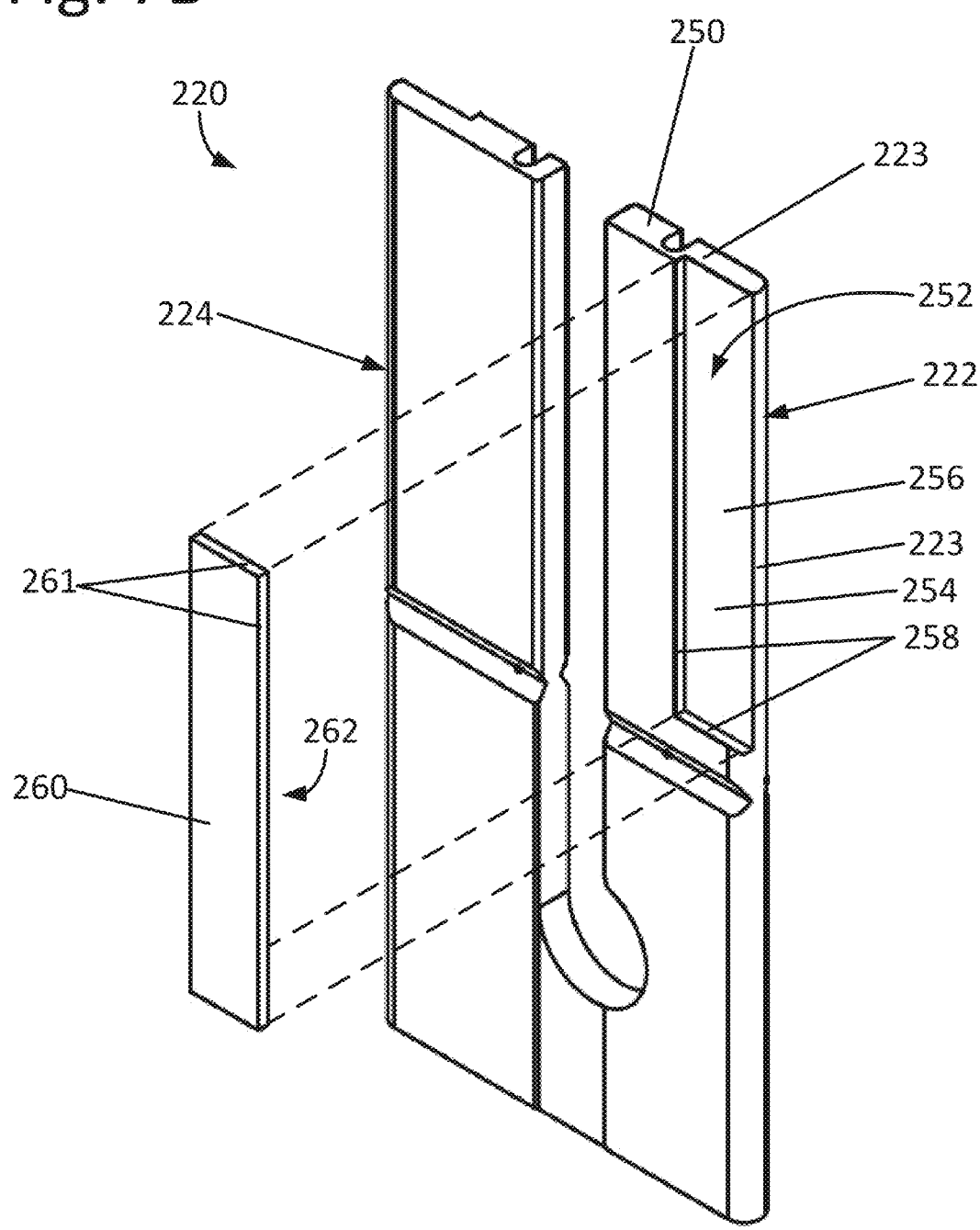

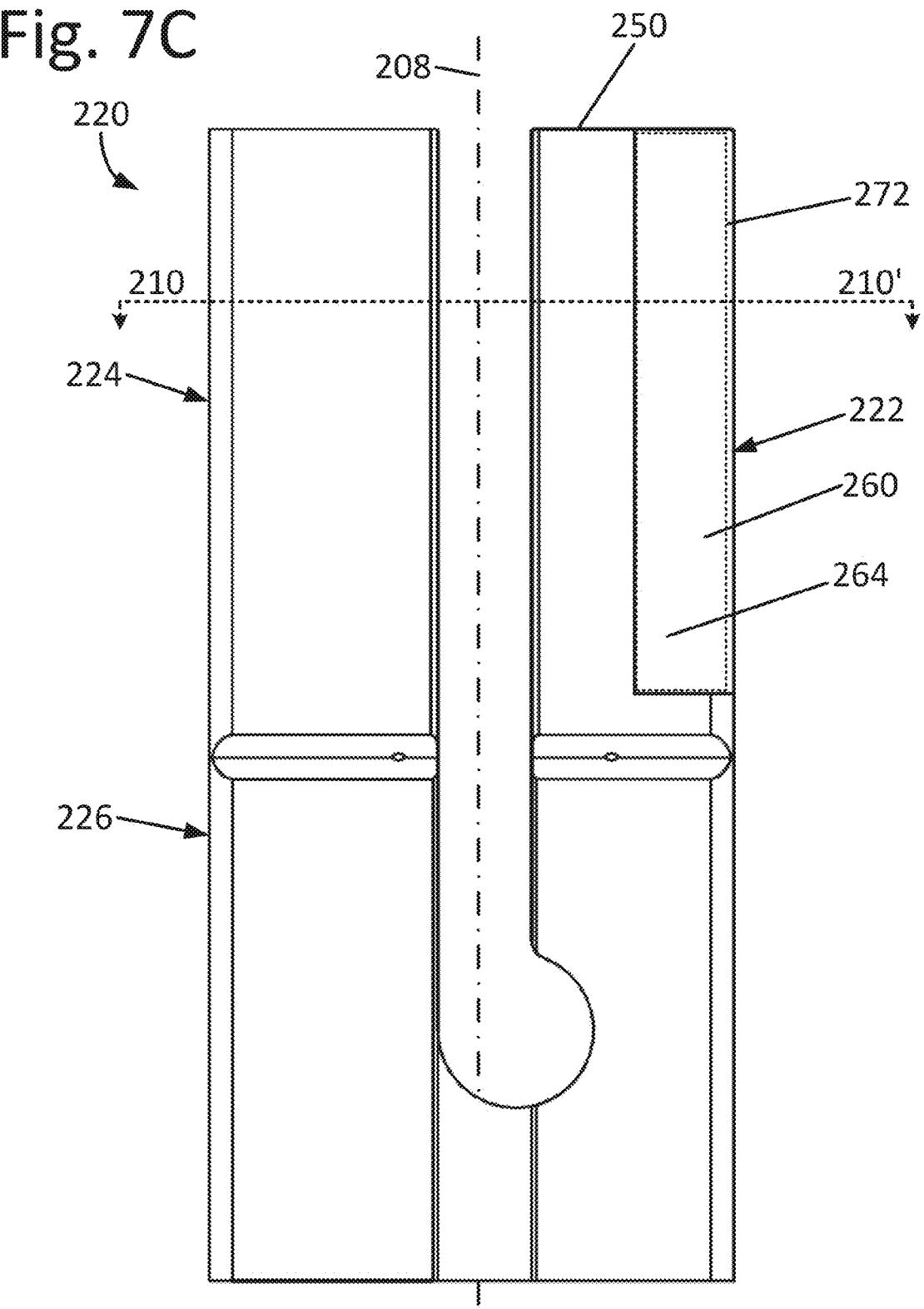

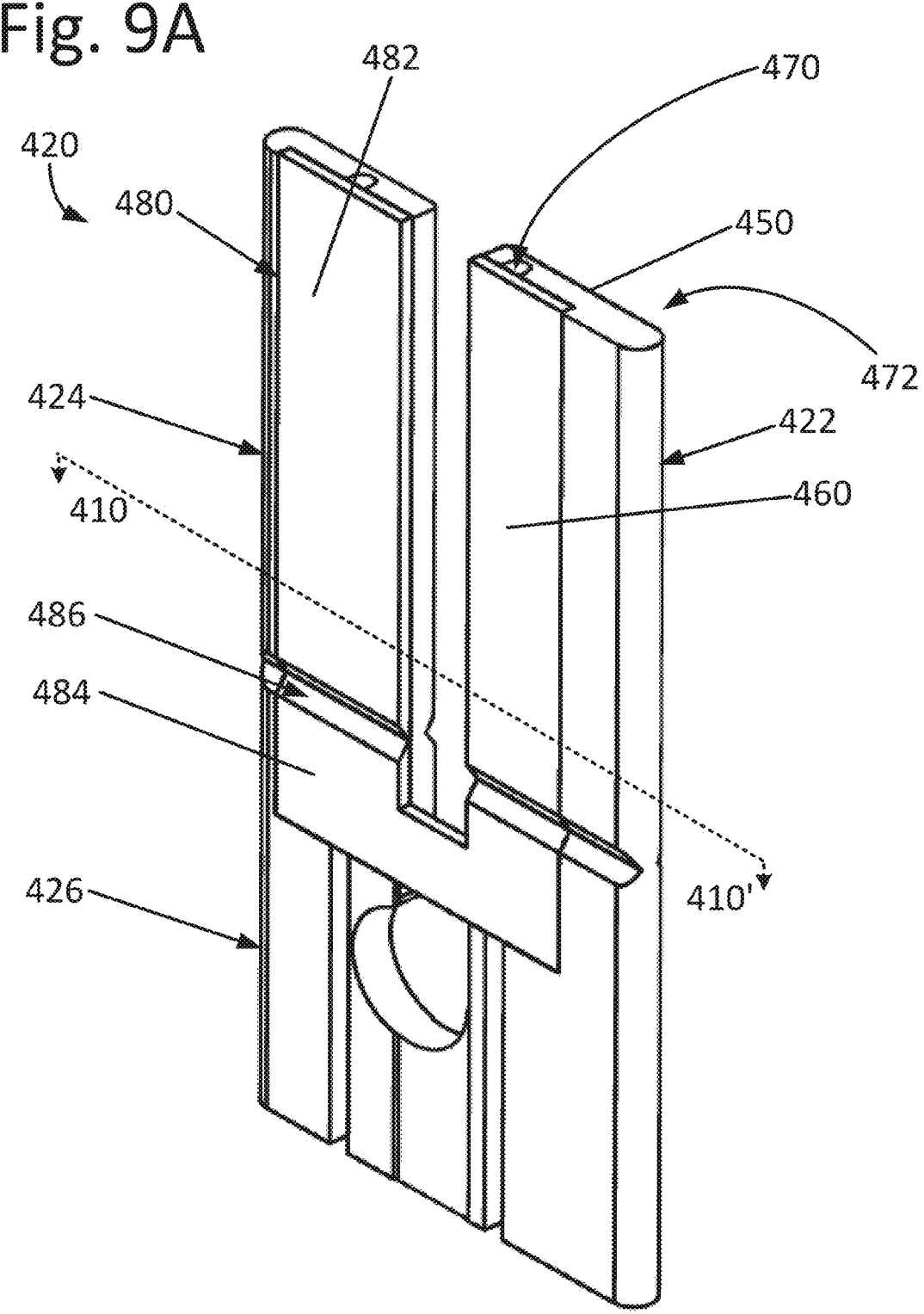

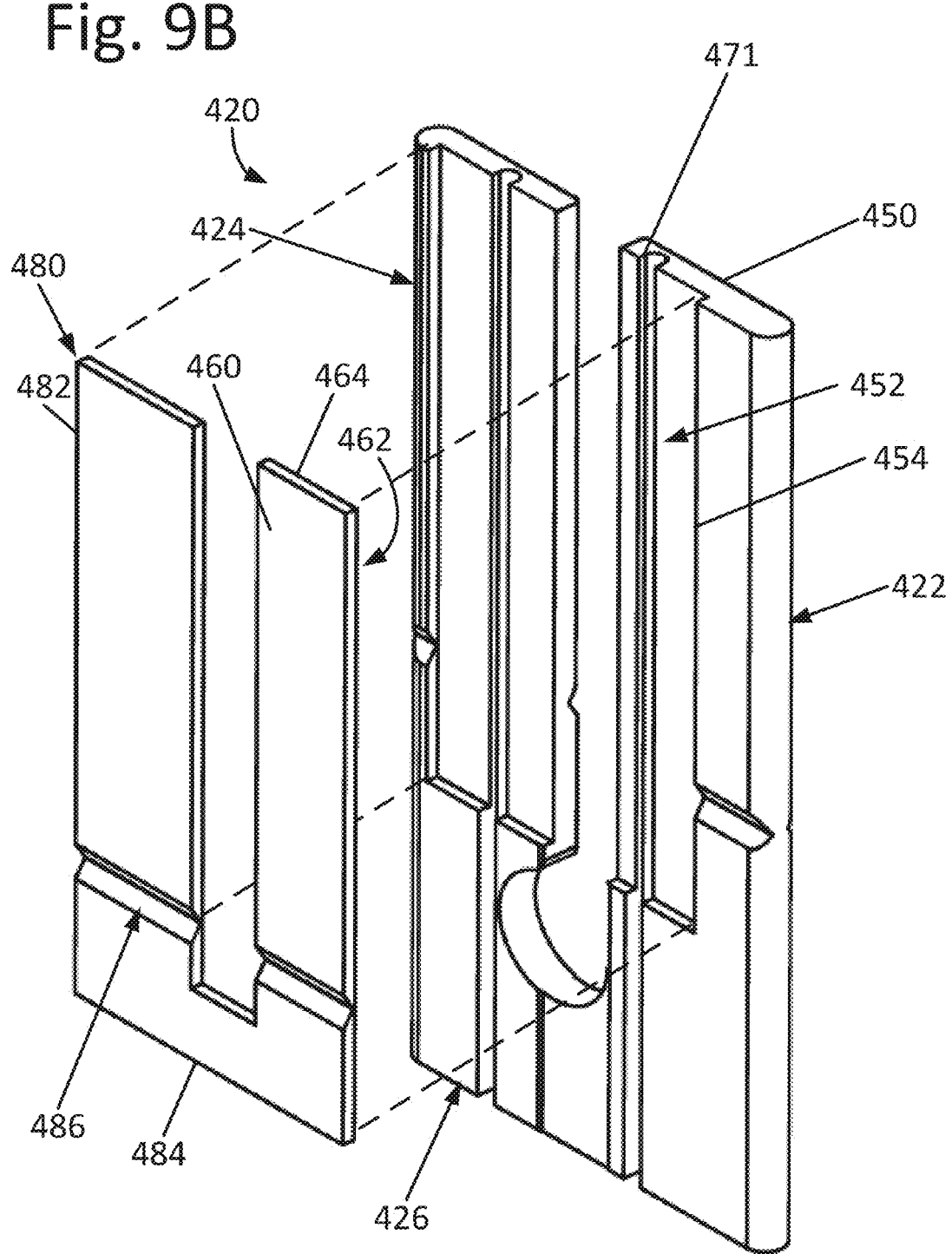

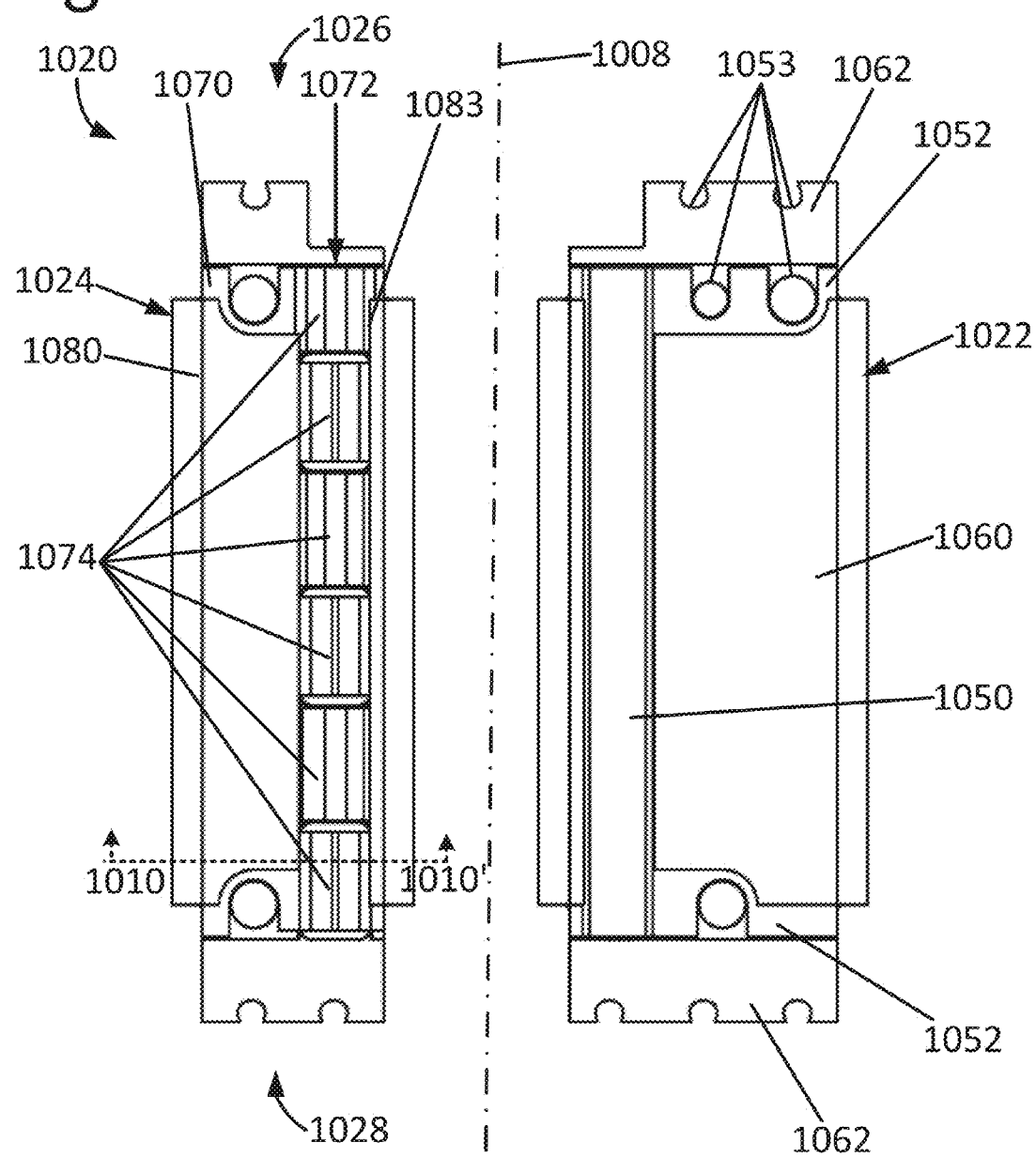

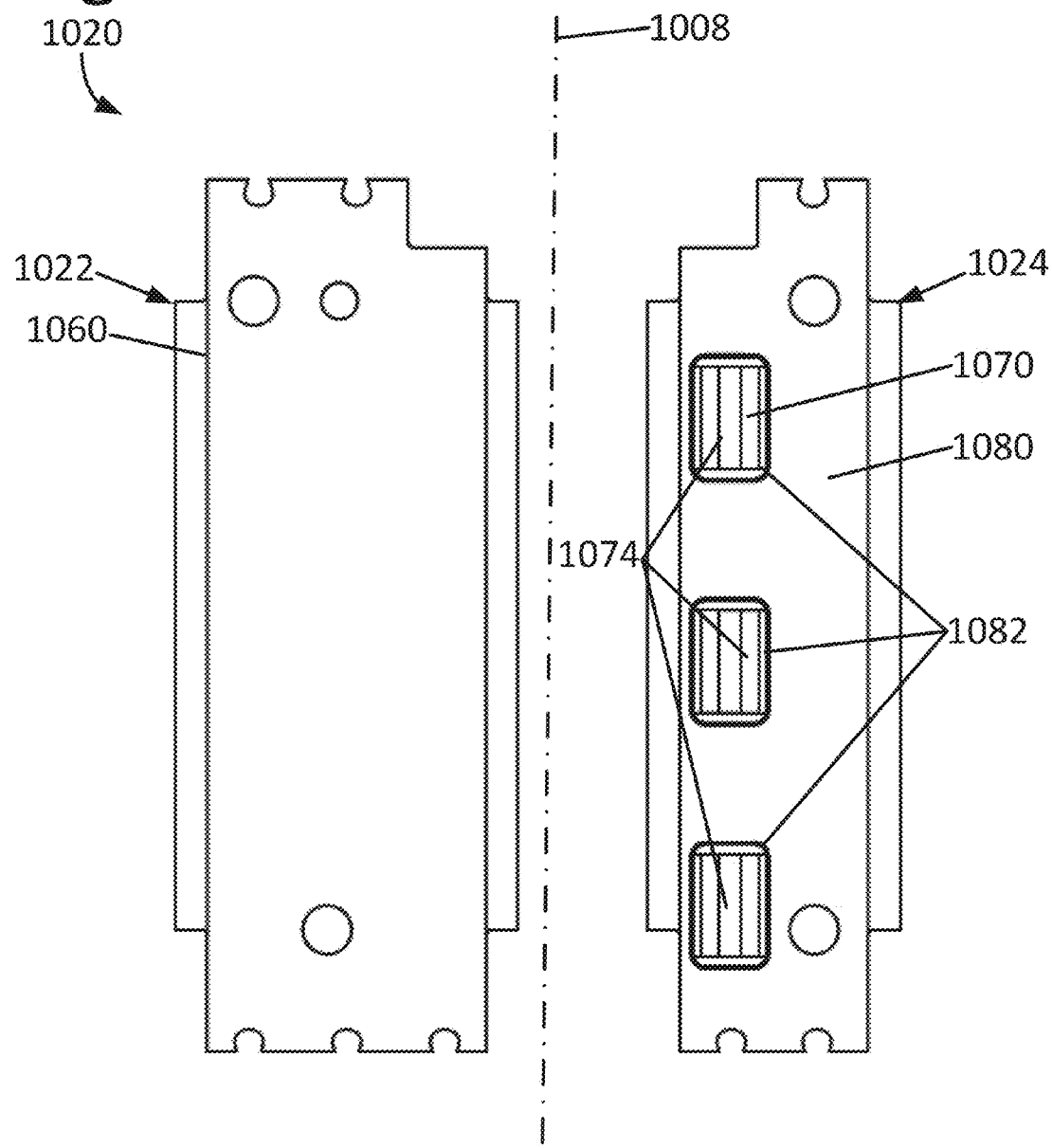

MANDREL FOR ELECTRODE ASSEMBLIES

This application is a divisional application of U.S. patent application Ser. No. 13/456,692, filed Apr. 26, 2012, issued as U.S. Pat. No. 9,130,223 on Sep. 8, 2015, which is incorporated herein by reference in its entirety.

The disclosure herein relates to mandrels for electrode assemblies and for methods of providing such mandrels and electrode assemblies.

Batteries for medical devices, such as implantable medical devices, have demanding requirements. For example, such requirements may include long life, high-power output, low self-discharge rate, compact size, and high reliability. Further, the need for miniaturization while maintaining, or increasing, power output may result in the elimination of dead space within a battery. The elimination of dead space, however, may result in a greater difficulty of assembly due to the increasingly small size of components.

Traditionally, coiled battery assemblies have been produced by coupling electrodes to a mandrel (e.g., wrapping around). Once coupled, the mandrel may be removed providing a coiled electrode assembly for use in a battery. The removal of the mandrel from the core of the coiled electrode assembly may potentially damage the electrode assembly (e.g., the core of the coiled electrode assembly may be pulled out with the removal of the mandrel).

Further, coiled electrode assemblies have been produced by coupling electrodes around rod-shaped, non-conductive, and/or non-deformable cores. Conductive tabs may be added to each electrode and may be used for electrical connection outside of the battery.

SUMMARY

Generally, the disclosure herein describes mandrels for use in electrode assemblies that include a connector element coupling region and an electrode coupling region. Such electrode assemblies may be used in batteries for implantable medical devices. The connector element coupling region may be configured for coupling a connector element such as, e.g., a feedthrough pin, to the mandrel, and the electrode coupling region may be configured for coupling an electrode to the mandrel. The connector element coupling region and the electrode coupling region may be electrically coupled such that a connector element coupled to the connector element coupling region may be electrically coupled to an electrode coupled to the electrode coupling region. The connector element coupling and electrode coupling regions may each include one or more materials selected to provide effective coupling (e.g., mechanical coupling, electrical coupling, etc.) to a connector element and an electrode, respectively. In at least one embodiment, the connector element coupling region may include at least one material that is also included in the connector element to be coupled thereto, and the electrode coupling region may include at least one material that is also included in the electrode to be coupled thereto.

Connector elements may include different material than electrodes. For example, a connector element may include titanium while an electrode may include aluminum. As such, in this example, the connector element coupling region may include titanium and the electrode coupling region may include aluminum. Generally, the connector element coupling region may include a different material than the electrode coupling region. In other words, the connector element coupling region may include a first material and the electrode coupling region may include a second material that is different than the first material.

One exemplary mandrel for an electrode assembly (e.g., to be used in a battery of an implantable medical device) may include a positive mandrel portion and a negative mandrel portion. The positive mandrel portion may include a connector element coupling region and an electrode coupling region. The connector element coupling region may be configured for coupling the positive mandrel portion to a connector element and may include a first conductive material (e.g., titanium). The electrode coupling region may be electrically coupled to the connector element coupling region and may be configured for coupling the positive mandrel portion to an electrode. The electrode coupling region may include a second conductive material (e.g., aluminum) different than the first conductive material.

The negative mandrel portion of the exemplary mandrel may be spaced apart from the positive mandrel portion and may include a connector element coupling region and an electrode coupling region. The connector element coupling region may be configured for coupling the negative mandrel portion to a connector element and may include a first conductive material (e.g., titanium). The electrode coupling region may be electrically coupled to the connector element coupling region and may be configured for coupling the negative mandrel portion to an electrode. The electrode coupling region may include a second conductive material (e.g., aluminum) different than the first conductive material. In at least one embodiment, the second conductive material of the electrode coupling region of the positive mandrel portion is different than the second conductive material of the electrode coupling region of the negative mandrel portion.

In one or more exemplary mandrels, for at least one of the positive mandrel portion and the negative mandrel portion, at least a portion of the electrode coupling region may be positioned adjacent to at least a portion of the connector element coupling region to mechanically couple the connector element coupling region and the electrode coupling region. In at least one embodiment, for at least one of the positive mandrel portion and the negative mandrel portion, the connector element coupling region may define a mating region (e.g. an opening) configured to mate with a mating region defined by at least a portion of the electrode coupling region to mechanically couple the connector element coupling region and the electrode coupling region.

In one or more exemplary mandrels, the electrode coupling region for at least one of the positive mandrel portion and the negative mandrel portion is formed by depositing the second conductive material. In at least one embodiment, for at least one of the positive mandrel portion and the negative mandrel portion, the connector element coupling region may define a connector element channel configured for receiving a connector element to be coupled therein, and the electrode coupling region may include at least a planar surface for coupling an electrode thereto. In at least one embodiment, the mandrel may further include a removable portion removably coupled to both of the positive mandrel portion and the negative mandrel portion. In at least one embodiment, for at least one of the positive mandrel portion and the negative mandrel portion, the connector element may include the first conductive material and the electrode may include the second conductive material.

One exemplary mandrel for an electrode assembly (e.g., to be used in a battery of an implantable medical device) may include a positive mandrel portion and a negative mandrel portion spaced apart from the positive mandrel portion. At least one of the positive mandrel portion and the negative mandrel portion may include a primary portion and an electrode coupling portion. The primary portion may include a first conductive material (e.g., titanium). The electrode coupling portion may be electrically coupled to the primary portion and may include a second conductive material (e.g., aluminum) different than the first conductive material. Further, the electrode coupling portion may define an electrode coupling region configured for coupling to an electrode. In at least one embodiment, the electrode may include the second conductive material.

In one or more exemplary mandrels, the electrode coupling region may include at least a planar surface on the electrode coupling portion for coupling an electrode thereto. In at least one embodiment, the electrode coupling region may define at least one coupling protrusion on the electrode coupling portion for coupling an electrode thereto.

In one or more exemplary mandrels, the primary portion may define a connector element region configured for coupling to a connector element. In at least one embodiment, the connector element region may define a connector element channel configured for receiving a connector element to be coupled therein.

In one or more exemplary mandrels, the primary portion may define a mating region configured to mate with a mating region defined by at least a portion of the electrode coupling portion to mechanically couple the primary portion and the electrode coupling portion. In at least one embodiment, the mating region of the primary portion may define an opening configured to receive at least a portion of the mating region of the electrode coupling portion.

In one or more exemplary mandrels, the electrode coupling portion may be formed by depositing the second conductive material onto a deposition region of the primary portion. In at least one embodiment, the mandrel further may include a removable portion removably coupled to both of the positive mandrel portion and the negative mandrel portion.

One exemplary mandrel for an electrode assembly (e.g., to be used in a battery of an implantable medical device) may include a positive mandrel portion and a negative mandrel portion spaced apart from the positive mandrel portion. At least one of the positive mandrel portion and the negative mandrel portion may include a primary portion and a connector element coupling portion. The primary portion may include a first conductive material (e.g., aluminum). The connector element coupling portion may be electrically coupled to the primary portion and may include a second conductive material (e.g., titanium) different than the first conductive material. The connector element coupling portion may define a connector element coupling region configured for coupling to a connector element. In at least one embodiment, the connector element may include the second conductive material.

In one or more exemplary mandrels, the connector element coupling region may define a connector element channel configured for receiving a connector element to be coupled therein. In at least one embodiment, the primary portion may define a mating region configured to mate with a mating region (e.g., an opening) defined by at least a portion of the connector element coupling portion to mechanically couple the primary portion and the connector element coupling portion.

In one or more exemplary mandrels, the connector element coupling portion may be formed by depositing the second conductive material onto a deposition region of the primary portion. In at least one embodiment, the primary portion may define an electrode coupling region, and the electrode coupling region may include at least a planar surface on the primary portion for coupling an electrode thereto.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIGS. 5A-5B are front views of exemplary battery assemblies using the coiled electrode assembly of FIG. 4.

FIG. 6D is a cross sectional view of the mandrel of FIGS. 6A-6C.

FIG. 7A is a perspective view of an exemplary mandrel for an electrode assembly including positive and negative mandrel portions, each including an electrode coupling portion.

FIG. 7B is a perspective, exploded view of the mandrel of FIG. 7A.

FIG. 7C is a plan view of the mandrel of FIGS. 7A-7B.

FIG. 9A is a perspective view of an exemplary mandrel for an electrode assembly including positive and negative mandrel portions, each including a connector element coupling portion.

FIG. 9B is a perspective, exploded view of the mandrel of FIG. 9A.

FIG. 15A is a front view of an exemplary mandrel for an electrode assembly including positive and negative mandrel portions, each including a connector element coupling portion and an electrode coupling portion.

FIG. 15B is a rear view of the mandrel of FIG. 15A.

DETAILED DESCRIPTION OF EXEMPLARY EMBODIMENTS

Figure 1:
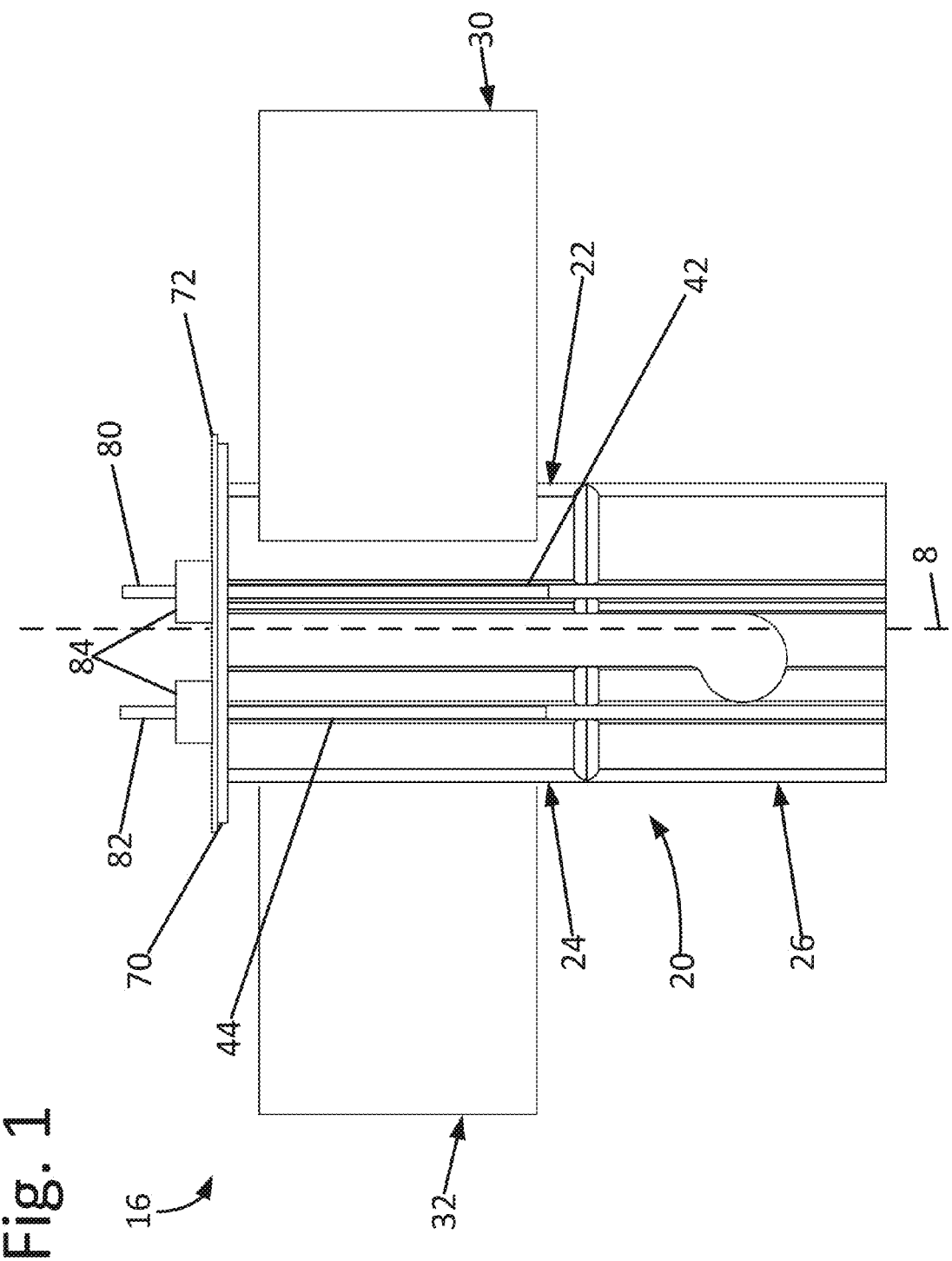
FIG. 1 is a front view of an exemplary electrode assembly.
Figure 2:
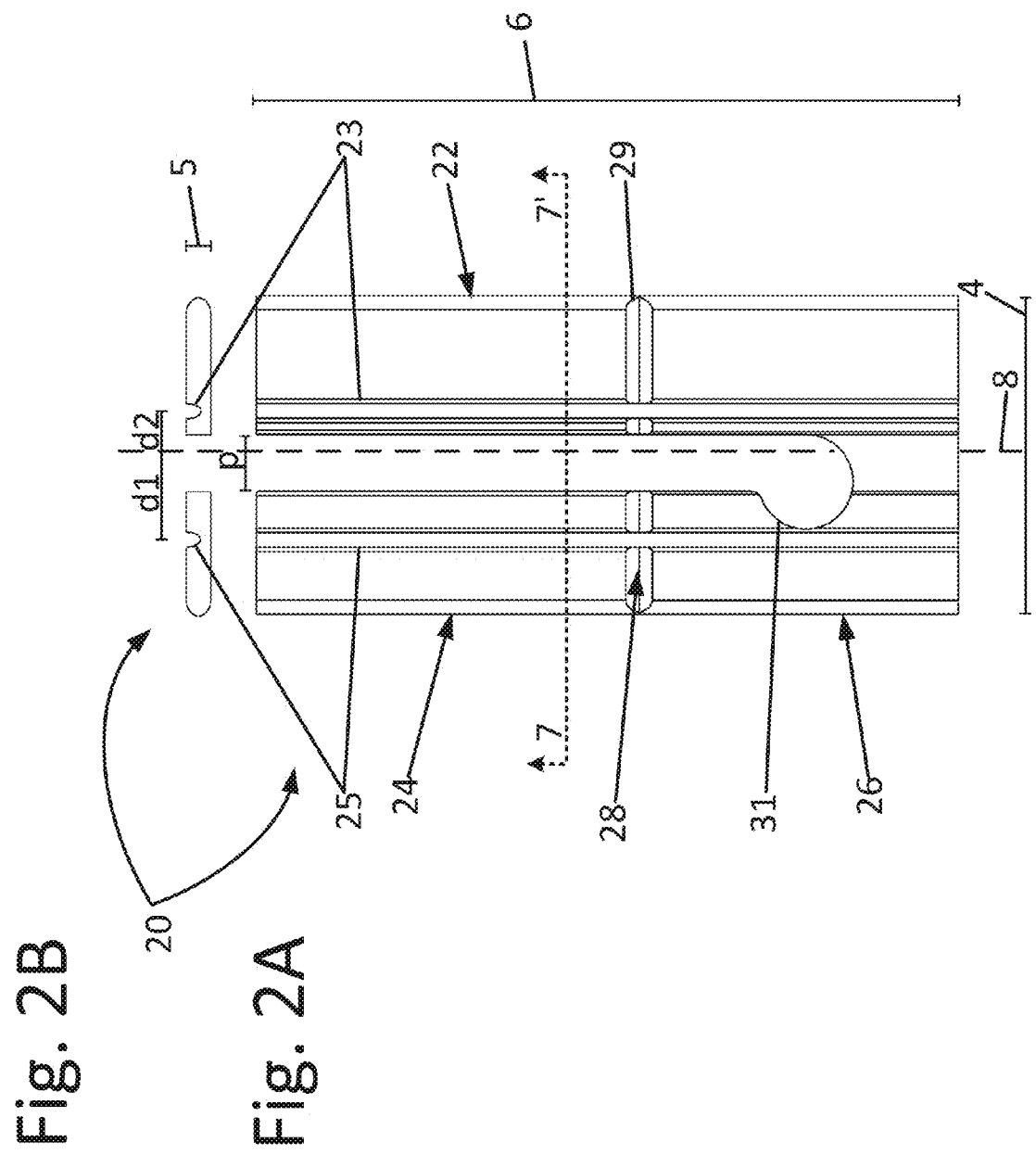
FIGS. 2A-2B are front and cross sectional views, respectively, of an exemplary mandrel of the electrode assembly of FIG. 1.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and methods shall be described with reference to FIGS. 1-20. It will be apparent to one skilled in the art that elements or processes from one embodiment may be used in combination with elements or processes of the other embodiments, and that the possible embodiments of such apparatus and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

As used herein, the term "mandrel" may refer to at least a portion of an interior core of an electrode assembly upon which one or more electrodes may be wound. Further, the term "mechanically coupled" may refer to a connection between elements, or portions, that resists separation between such elements when faced with ordinary forces that occur during the typical usage of electrode assemblies. Further, the term "electrically coupled" may refer to a conductive connection between electrical components that effectively conducts electricity therebetween. In addition, the term "electrode" may refer to an electrode substrate that can be coated with an active material, e.g., for use in a coiled battery assembly. In at least one embodiment, an electrode may include a substrate in the form of a strip of thin conductive material such as a foil.

The disclosure herein relates to mandrels for electrode assemblies and for methods of providing such mandrels and electrode assemblies. More specifically, such mandrels may include a positive mandrel portion and a negative mandrel portion, each portion defining an electrode coupling region for coupling to an electrode and a connector element coupling region for coupling to a connector element (e.g., such as a feedthrough pin). To define such electrode coupling and connector element coupling regions, the positive and negative mandrel portions may utilize one or more portions, materials, structures, etc. as will be described herein with reference to FIGS. 6-20. A general exemplary electrode assembly including a mandrel is described herein with reference to FIGS. 1-5 to, e.g., provide a descriptive reference example.

An electrode assembly 16 including a mandrel 20 having a positive mandrel portion 22 and a negative mandrel portion 24 (e.g., conductive portions) is illustrated in FIG. 1. The electrode assembly 16 further includes positive and negative electrodes 30, 32 and positive and negative connector elements 42, 44. In this example, the positive connector element 42 is a positive feedthrough pin (e.g., elongated and having a circular cross section) and the negative connector element 44 is a negative feedthrough pin (e.g., elongated and having a circular cross section). Although the connector elements 42, 44 are feedthrough pins in this and other embodiments described herein, exemplary connector elements 42, 44 may be any element configured to be coupled to, or part of (e.g., integral with), the positive and negative mandrel portions 22, 24 of the mandrel 20 and configured to conduct electricity from the positive and negative mandrel portions 22, 24 to outside of a battery casing that the electrode assembly 16 may be located within. In at least one embodiment, the connector elements 42, 44 may be elongated portions (e.g., a tabs, etc.) extending from each of the positive and negative mandrel portions 22, 24. In at least one embodiment, the connector elements may be rods having various cross sectional shapes (e.g., rectangular cross section, oblong cross section, etc.). In at least one embodiment, the connector elements may be sheet-like material similar to the electrodes 30, 32.

Figure 4:
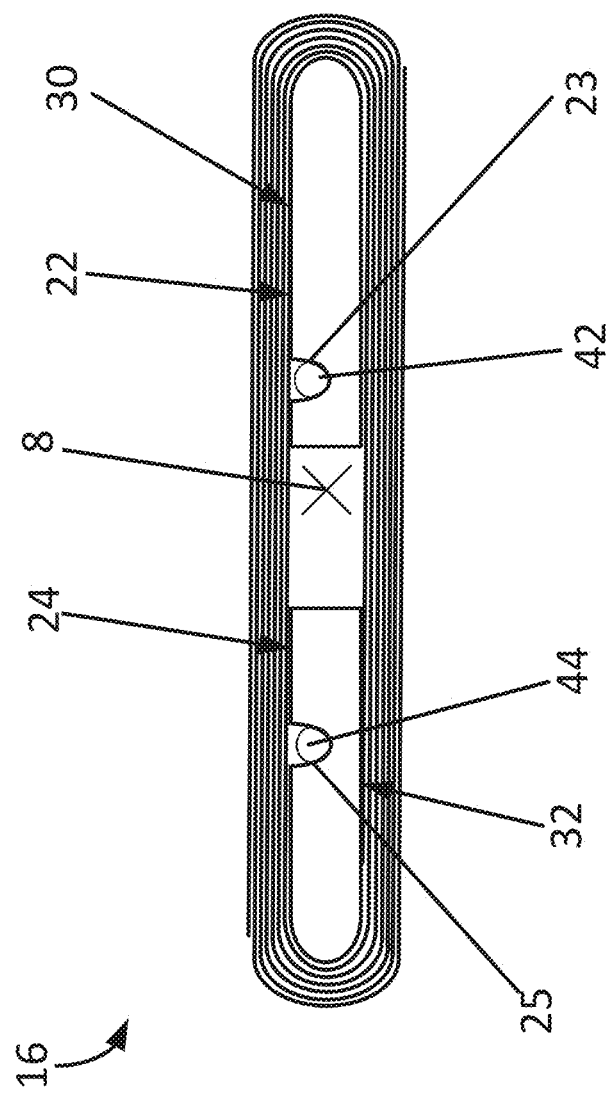
FIG. 4 is an end view of an exemplary coiled electrode assembly using the mandrel of FIGS. 1-3.

As shown, the electrode assembly 16 may be described as being oriented along an axis 8. For example, as shown, the connector elements 42, 44 (and the channels 23, 25 within which the connector elements 42, 44 are located as labeled in FIGS. 2A-2B) are parallel to the axis 8. Further, the mandrel 20 may be configured to be rotated about the axis 8 to wind, or wrap, the electrodes 30, 32 around the mandrel 20 to form a coiled battery assembly (as shown in FIG. 4).

The positive electrode 30 and the negative electrode 32 may be coupled (e.g., electrically coupled, mechanically coupled, bonded, etc.) to the mandrel 20. More specifically, the positive electrode 30 may be electrically and mechanically coupled to the positive mandrel portion 22 and the negative electrode 32 may be electrically and mechanically coupled to the negative mandrel portion 24. As illustrated, the positive electrode 30 and the negative electrode 32 may be coupled to the mandrel 20 on opposite faces (or sides) while the connector elements 42, 44 may be coupled on the same face (or side) of the mandrel 20. In at least one embodiment, the positive electrode 30 and the negative electrode 32 may be coupled to the mandrel 20 on the same face (or side). In at least one embodiment, the connector elements 42, 44 may be coupled to the mandrel 20 on opposite faces (or sides).

As shown, the positive electrode 30 and the negative electrode 32 can be electrically coupled to the mandrel portions 22, 24, respectively, by welding the electrodes 30, 32 to a flat, or planar, surface of the mandrel portions 22, 24 of the mandrel 20 (see FIG. 3) as further described herein. Further, a separator (not depicted) can be located (e.g., placed, interwoven, etc.) between the positive and negative mandrel portions 22, 24 of the mandrel 20 through passage "p" labeled in FIGS. 2A-2B to, e.g., electrically isolate, or insulate, the positive mandrel portion 22 from the negative mandrel portion 24 when the electrode assembly 16 is assembled into a battery. The separator may be coupled or not coupled to the mandrel 20.

The mandrel 20 may further include removable portion 26 and may define a decoupling region 28 configured to assist the removal of the removable portion 26 from the positive and negative mandrel portions 22, 24, e.g., after the electrode assembly 16 has been located within a battery casing, after the electrode assembly 16 has been produced, etc. As used herein, a "removable portion" may refer to a portion of the mandrel 20 that can be detached from the remainder of the mandrel 20. In at least the embodiment depicted, the decoupling region 28 may include a depression 29 that is formed (e.g., scored, molded, stamped, etc.) between the removable portion 26 and the remainder of the mandrel 20 to allow the removable portion to be removed from the remainder of the mandrel 20. In at least one embodiment, the removable portion 26 may be detached, or decoupled, by snapping, cutting, breaking, tearing, and/or clipping the removable portion 26 from the remainder of the mandrel 20.

The depression 29 (e.g., a channel, groove, etc.) may extend across the mandrel 20 perpendicular to the axis 8 and between the mandrel portions 22, 24 and the removable portion 26. As such, the removable portion 26 may be removed (e.g., "broken off") from the positive and negative mandrel portions 22, 24 by holding the positive and negative mandrel portions 22, 24 stationary and rotating the removable portion 26 about an axis (e.g., an axis perpendicular to the axis 8) defined by the depression 29.

Although the depression 29 is depicted in one or more embodiments described herein, it is to be understood that the exemplary mandrels described herein may include any one or more features or elements in the decoupling region 28 different than the depression 29 that are configured to assist the removal of the removable portion 26 from the positive and negative mandrel portions 22, 24. For example, the decoupling region 28 may include a perforation, a thinned region, weakened region, tabs, balls, isolated geometric decoupling features, cones, pins, rods, etc., which may be configured to assist in the removal of the removable portion 26 from the positive and negative mandrel portions 22, 24. Further, in at least one embodiment, no feature or element may be included, or defined, in the mandrel 20 in the decoupling region 28. In this example, the removable portion 26 may be removed from the positive and negative mandrel portions 22, 24 by removing material (e.g., cutting) between (e.g., using a laser, saw, etc.) the removable portion 26 and the positive and negative mandrel portions 22, 24.

While the exemplary mandrels described herein can be made using any appropriate process, an exemplary mandrel can be made using electric discharge machining (EDM). Alternatively, an exemplary mandrel can be made by metal extrusion or by injection molding depending on the needs of the battery and the composition of the mandrel. Further, an exemplary mandrel can be formed using one or more progressive stamping processes. Still further, the regions, channels, grooves, etc. formed in the exemplary mandrels (e.g., for receiving connector elements, for forming the decoupling region, or for any other feature or element) can be made, produced, or formed, by machining, etching, stamping, cutting, welding, extruding, electromagnetic forming, hot isostatic processing, thermal mechanical or thermomechanical forming, hydro mechanical forming, and/or any other method.

The width 4 of the mandrel 20 (as shown in FIG. 2A) may be greater than or equal to about 0.1 inches, about 0.2 inches, about 0.25 inches, about 0.3 inches, etc. Further, the width 4 of the mandrel 20 may be less than or equal to about 0.35 inches, about 0.4 inches, about 0.45 inches, about 0.5 inches, about 0.6 inches, etc. The length 6 of the mandrel 20 (as shown in FIG. 2A) may be greater than or equal to about 0.4 inches, about 0.5 inches, about 0.6 inches, about 0.7 inches, etc. Further, the length 6 of the mandrel 20 may be less than or equal to about 0.75 inches, about 0.8 inches, about 0.85 inches, about 0.95 inches, about 1.0 inches, about 1.25 inches, about 1.25 inches, etc. The thickness 5 of the mandrel 20 (as shown in FIG. 2B) may be greater than or equal to about 0.005 inches, about 0.01 inches, about 0.015 inches, about 0.02 inches, etc. Further, the thickness 5 of exemplary mandrel 20 may be less than or equal to about 0.025 inches, about 0.03 inches, about 0.04 inches, about 0.045 inches, about 0.05 inches, about 0.06 inches, etc.

In the embodiment depicted, channels 23, 25 (e.g., coupling regions) for receiving the connector elements 42, 44 (e.g., positive and negative feedthrough pins, etc.) may be formed in the positive and negative mandrel portions 22, 24, respectively, of the mandrel 20. Although the channels 23, 25 as shown are both on the same face (or side) of the mandrel 20, in other embodiments, the channels 23, 25 may be on opposite faces. It is to be understood that the channels 23, 25 (e.g., grooves, etc.) may be appropriately sized and/or shaped to accommodate various shapes and sizes of connector elements 42, 44. For example, the channels 23, 25, can be in the shape of a "V," a rounded groove, a square bottomed groove, a "C," a half hex, a beveled square bottomed groove, a dovetail groove, etc. Further, the channels 23, 25 may be sized to be slightly smaller than the connector elements to be received therein so as to form an interference fit if the connector elements 42, 44 were pressed or forced into the channels 23, 25.

The electrodes 30, 32 may also vary in size, shape, and length. In at least one embodiment, the electrodes 30, 32 may be a foil or other thin malleable conductive substrate (e.g., a grid, expanded metal, mesh, etc.). In at least one embodiment, the foil can be in the form of a metal foil such as, for example, aluminum, steel, silver, copper, nickel, titanium, vanadium, and/or combinations or alloys thereof.

The length of the electrodes 30, 32 (e.g., when the electrodes are unrolled) may be greater than or equal to about 1 inch, about 2 inches, about 3 inches, about 4 inches, about 5 inches, about 6 inches, etc. Further, the length of the electrodes 30, 32 may be less than or equal to about 8 inches, about 10 inches, about 14 inches, about 16 inches, about 18 inches, about 20 inches, about 24 inches, etc. The width of the electrodes 30, 32 may be greater than or equal to about 0.05 inches, about 0.1 inches, about 0.2 inches, about 0.3 inches, about 0.5 inches, about 0.6 inches, about 0.75 inches, etc. Further, the width of the electrodes 30, 32 may be less than or equal to about 1 inch, 1.25 inches, etc. The thickness of the electrodes 30, 32 may be greater than or equal to about 0.002 inches, about 0.003 inches, about 0.004 inches, about 0.005 inches, about 0.008 inches, etc. Further, the thickness of the electrodes 30, 32 may be less than or equal to about 0.01 inches, about 0.015 inches, about 0.02 inches, about 0.025 inches, about 0.03 inches, about 0.04 inches, about 0.05 inches, etc. Also, the electrodes 30, 32 can vary in composition depending on the battery chemistry being used as described further herein.

Separator material, e.g., used to separate the electrodes 30, 32 when rolled around the mandrel 20, can be any non-conductive material such as polyethylene, polypropylene and layered combinations thereof. Exemplary separators (e.g., made of separator material) generally have a larger width and length than the electrodes they cover so as, e.g., to fully encase the electrodes. Generally, a separator can be sized to extend beyond a bottom portion of positive and negative mandrel portions 22, 24 after removal of removable portion 26 (e.g., to provide additional insulation towards the bottom portion of the mandrel portions 22, 24). Exemplary separators may be described in U.S. Patent Application Publication No. 2011/0250481 A1 published on Oct. 13, 2011 and entitled "COIL SEAL TO SECURE THE ELECTRODE WINDINGS OF AN ELECTROCHEMICAL CELL," which is incorporated herein by reference in its entirety. The separator material may be coupled or uncoupled to the mandrel 20, e.g., prior to locating the separator material between the electrodes 30, 32 when the electrodes 30, 32 are being located about, or around the mandrel 20. In at least one embodiment, the separator material may be passed through the passage "p" (e.g., without coupling the separator material to the mandrel 20) and extended such that it will separate the electrodes 30, 32 from each other when the mandrel 20 is rotated to locate the electrodes thereon (e.g., held by tension).

Connector elements 42, 44, (e.g., feedthrough pins) can be sized to fit within the channels 23, 25, or grooves, defined in the mandrel 20 and can be made of any electrically conductive material. For example, connector elements may include (e.g., be formed of) steel, platinum, aluminum, titanium, nickel, copper, tantalum, niobium, etc. and/or combinations or alloys thereof such as, e.g., titanium alloy such as grade 5 or grade 23, platinum-iridium such as 90 percent platinum/10 percent iridium, aluminum sleeve or shell over a titanium core, stainless steel, clad materials, coated materials (e.g., dipped or sprayed), etc. The length of the connector elements 42, 44 may be greater than or equal to about 0.1 inches, about 0.2 inches, about 0.3 inches, about 0.4 inches, about 0.5 inches, about 0.6 inches, etc. Further, the length of the connector elements may be less than or equal to about 0.7 inches, about 0.75 inches, about 0.8 inches, about 1 inch, about 1.5 inches, etc. The diameter of the connector elements 42, 44 may be greater than or equal to about 0.01 inches, about 0.025 inches, about 0.05 inches, etc. Further, the diameter of the connector elements 42, 44 may be less than or equal to about 0.075 inches, about 0.1 inches, about 0.2 inches, etc. Further, the portions of the connector elements 42, 44 that extend outside of the battery case after the electrode assembly has been inserted into a battery case may be cut to length.

The exemplary mandrel 20 of FIG. 1 is further illustrated in FIGS. 2A-2B without the remainder of the electrode assembly 16. More specifically, a front view of the mandrel 20 is depicted in FIG. 2A and a cross sectional view of the mandrel 20 taken across line 7-7' is depicted in FIG. 2B. As shown, the mandrel 20 is planar having two faces or sides (e.g., a front face/side and a back face/side). As described herein, the mandrel 20 may include a positive mandrel portion 22 and a negative mandrel portion 24. The positive mandrel portion 22 may be spaced apart from the negative mandrel portion 24 (e.g., such that the positive mandrel portion 22 and the negative mandrel portion 24 are not electrically coupled and/or not in contact with each other). As shown, a passage "p" separates the two portions 22, 24 (within which an insulative separator may be located). In addition, the mandrel 20 as shown may include a removable portion 26. Between the removable portion 26 and the positive and negative mandrel portions 22, 24 is the decoupling region 28 (e.g., depression 29 as shown) configured to assist the removal of the removable portion 26 from the positive and negative mandrel portions 22, 24.

Further, the mandrel 20 further defines a positive connector element channel 23 and a negative connector element channel 25 for receiving positive and negative connector elements, respectively. For example, the connector element channels 23, 25 may be dimensioned and configured to accept connector elements 42, 44 (such as feedthrough pins shown in FIG. 1). Further, as shown, the positive connector element channel 23 is located, or placed, closer to the axis 8, or midline, of the mandrel 20 than the negative connector element channel 25, which is illustrated by the distance "d2" from the positive connector element channel 23 to the axis 8 compared to the distance "d1" from the negative connector element channel 25 to the axis 8. In at least one embodiment, the channels 23, 25 may be equidistant from the axis 8. Further, in at least one embodiment, the negative connector channel 25 may be closer to the axis 8 than the positive connector channel 23. It is to be understood that the channels can be placed at any location on the mandrel 20. Further, it is also to be understood that having the connector elements positioned at two different distances from the axis 8, a battery top cover 72 (shown in FIGS. 1 and 5A-5B) can be constructed to fit over the mandrel 20 and electrodes 30, 32 located, or placed, (e.g., wrapped, etc.) around, or about, the mandrel 20 in only one position, which may insure that the terminals can be more quickly identifiable as positive and negative.

Further, as shown in FIG. 2A, the removable portion 26 can be separated, or removed, from positive mandrel portion 22 and negative mandrel portion 24 along the depression 29. As described herein, the depression 29 can be deep enough such that the mandrel 20 can be broken along the depression 29 resulting in individual positive and negative mandrel portions 22, 24 of the mandrel 20. For example, after the positive and negative mandrel portions 22, 24 have been separated from the removable portion 26, the negative mandrel portion 24 are spaced apart from the positive mandrel portion 22, e.g., such that the negative mandrel portion 24 is not electrically coupled to the positive mandrel portion 22. More specifically, the positive mandrel portion 22 and the negative mandrel portion 24 may be separated by the passage "p" located between the positive mandrel portion 22 and the negative mandrel portion 24. In at least one embodiment, an insulative separator portion may be located in the passage "p" to, e.g., provide structural support to the mandrel 20. As shown, the mandrel 20 may further define an orientation notch 31 shown as a foot-type aperture on the axis 8 of the mandrel 20. In the embodiment depicted in FIG. 2A, the "foot" of the notch 31 points toward negative mandrel portion 24 of the mandrel 20.

Figure 3:
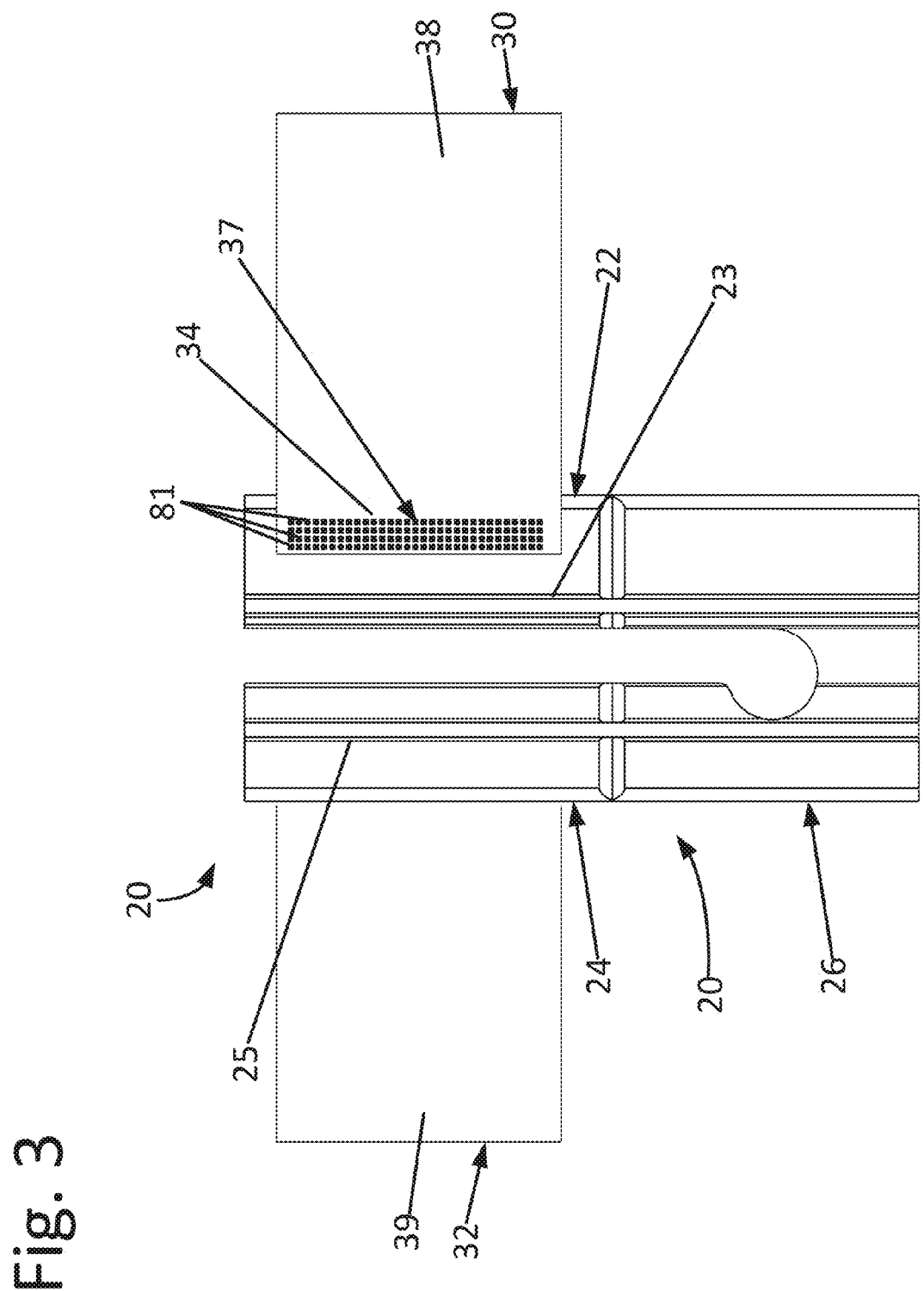
FIG. 3 is a front view of the mandrel of FIGS. 1-2 with electrodes attached thereto.

Electrodes 30, 32 may be attached to the mandrel 20 as shown in FIG. 3. More specifically, a positive electrode 30 may be attached to the positive mandrel portion 22 and a negative electrode 32 may be attached to the negative mandrel portion 24. As shown, the electrodes 30, 32 are attached to opposite sides of the mandrel 20.

The positive electrode 30 can be coated with a positive active material 38. As illustrated, the positive electrode 30 has a proximal end 34 that may not be coated with active material, e.g., for coupling to the positive mandrel portion 22. The proximal end 34 may be attached to positive mandrel portion 22 of the mandrel 20 at a selected, or specific, coupling region 37. Similarly, the negative electrode 32 can be coated with a negative active material 39, and the proximal end (not shown) of the negative electrode 32 may not be coated with active material. The proximal end of the negative electrode 32 may be attached to the negative mandrel portion 24 of the mandrel 20 at a selected, or specific, coupling region (not shown) similar to the coupling region 37 of the positive mandrel portion 22.

The electrodes 30, 32 can be attached to the positive mandrel portion 22 and negative mandrel portion 24, respectively, by welding (e.g., laser welding, ultrasonic welding, resistance welding, etc.), adhering, one or more mechanical processes (e.g., crimping, swaging, etc.), friction stir welding, diffusion, etc. As shown, multiple laser welds 81 may be used to electrically couple the proximal end 34 of the positive electrode 30 to the coupling region 37 of the positive mandrel portion 22. In at least one embodiment, a combination of two or more different types of welds may be used to electrically couple the electrodes 30, 32 and the mandrel portions 22, 24, respectively.

It is to be understood that the positive active material 38 may include any one or more positive active materials used in electrode technology. For example, the positive active material 38 may include lithium cobalt oxide (e.g., for use in rechargeable batteries), carbon monofluoride ($CF_x$), silver vanadium oxide, lithium iron phosphate, lithium polonium, one or more oxides, one or more phosphates, one or more silicates, one or more fluorophosphates, etc. and/or combinations or alloys thereof. Similarly, the negative active material 39 may include any one or more negative active material used in electrode technology. For example, the negative active material 39 may include lithium titanate, artificial graphite powder (MCMB), lithium, one or more oxides, one or more metals or bimetals, silicon, etc. and/or combinations or alloys thereof.

Both the positive and negative electrodes 30, 32 can be coated on one side or both sides to provide an electron flow suitable to generate a current. It is to be understood that coating the electrodes on both sides with active material may allow for more efficient use of the two sides of the electrodes, which may result in increased energy and power in contrast to a single side coated electrode. Further, it is to be understood that the proximal and/or distal ends of the electrodes 30, 32, may not be coated on one or both sides. Still further, it is to be understood that any suitable combination of coatings and coated portions of the electrode(s) is within the scope of this disclosure.

As shown in FIGS. 1 and 4, positive and negative connector elements 42, 44 such as, e.g., the feedthrough pins, may be placed, or located, in the connector element channels 23, 25 and coupled therein. The connector elements 42, 44 may be electrically coupled (e.g., conductively connected, etc.) and mechanically coupled to the portions 22, 24, respectively, of the mandrel 20 using one or more processes such as, e.g., welding (e.g., laser welding, ultrasonic welding, resistance welding, etc.), crimping, stamping, adhering, swaging, friction stir welding, diffusion, etc. In at least one embodiment, connector elements may be spot welded (e.g., using laser welding) in one or more locations (e.g., a plurality of locations along the length of the connector elements). In at least one embodiment, the channels 23, 25 (e.g., coupling regions) may be "C"-shaped or "U"-shaped and the channels 23, 25, may be crimped such that the "C"-shape or "U"-shape is deflected inwardly compressing the connector element located within the "C"-shaped or "U"-shaped channel. In at least one embodiment, an adhesive or flowable/moldable material (e.g., conductive polymer) may be used at one or more locations (e.g., a single location, a plurality of locations, etc.) to couple the connector elements 42, 44 in the connector element channel 23, 25.

Additional elements of the electrode assembly 16 depicted in FIG. 1 include an insulator 70 and a battery top cover 72. The insulator 70 may insulate the electrodes 30, 32 and the positive and negative mandrel portions 22, 24 from the battery top cover 72. Further, connector elements 42, 44 may extend through the insulator 70 and the battery top cover 72 and can be used as battery terminals 80, 82. The electrode assembly 16 may further include ferrules 84 attached (e.g., adhered, welded, etc.) to the battery top cover 72 to stabilize the terminals and isolate them from the battery top cover 72. A glass seal or sleeve (not shown) may be placed over each connector element 42, 44 prior to the placement of ferrules 84 to provide a seal between the connector elements and the battery top cover 72 and further insulate the ferrules 84 from the connector elements 42, 44.

The ferrules 84 may include (e.g., be formed of, etc.) titanium, titanium alloys, stainless steel, etc., and/or combinations or alloys thereof. The insulator 70 may include (e.g., be formed of, etc.) any insulating material such as, e.g., polyethylene, polypropylene, polyethylene terephthalate, polyimide, ethylene/tetrafluoroethylene copolymer (ETFE), etc., and/or combinations thereof. In at least one embodiment, the insulator may be a non-conductive film such as, e.g., DUPONT KAPTON polyimide film.

Although the electrode assembly 16 depicted in FIGS. 1-5 utilizes a positive and negative terminal without utilizing the case (e.g., the case is neutral), in other embodiments, a connection element (e.g., stud pin) can be coupled (e.g., welded) to the battery cover and may be configured for electrical coupling with one of the connector elements 42, 44 such that the case may be electrically coupled to one of the connector elements 42, 44 to provide the case as either a negative potential terminal/connection point or a positive potential terminal/connection point.

An end view an exemplary coiled electrode assembly 16 is shown in FIG. 4. As shown, the electrodes 30, 32 have been located (e.g., wrapped, wound, etc.) around the mandrel 20 (e.g., around axis 8) to create the coiled electrode assembly 16. As described herein, the mandrel 20 may include channels 23, 25 for the connector elements 42, 44 defined on the same side (or face) of the mandrel 20. Further, the electrodes 30, 32 may be electrically coupled to their respective mandrel portions 22, 24 on opposite sides of the mandrel 20. For example, uncoated portions (e.g., proximal end 34) of the electrodes 30, 32 can be connected to the positive and negative mandrel portions 22, 24 of the mandrel 20.

The separators, which are represented by white space between the electrodes 30, 32 in FIG. 4, can be located, or placed, so as to have opposing side adjacent to the positive electrode 30 and the negative electrode 32, respectively. When wound, the separators may isolate (e.g., electrically isolate or insulate, physically separate, etc.) the positive and negative electrodes 30, 32 from each other. The separators can be attached to the mandrel 20 using any one or more processes or remain unattached, or uncoupled, to the mandrel 20. In at least one embodiment, the separators can be connected using adhesive material etc. that is configured to couple, or adhere, the separators to the mandrel 20. Exemplary tape adhesive material may include polypropylene, polyethylene, polyester, nylon resin, etc. Exemplary adhesives may include, e.g., polyvinylidenefluoride (PVDF), co-polymers of polyhexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon, etc. and mixtures thereof.

Generally, to wind the electrodes 30, 32 around the mandrel 20, the mandrel 20 may be rotated using the removable portion 26 about axis 8. In other words, the removable portion 26 may be coupled to a rotation apparatus and the rotation apparatus may rotate the mandrel 20 such that the electrodes 30, 32 and one or more separators may be located around, or about, the mandrel 20. In at least one embodiment, the removable portion 26 may include a clamp portion. The clamp portion may be coupled to the rotation apparatus and may be configured to assist in the rotation of the mandrel 20 to wind the electrode 30, 32 thereabout. Further, the removable portion 26 may include any one or more features or portions that may further assist or aid in assembly (e.g., in coupling the mandrel to the rotation apparatus).

The rotation process may be performed manually or automatically. In at least one embodiment, the removable portion 26 of the mandrel 20 may be attached to a ligature or other holding mechanism (not shown) that can be turned by a motor. Once wound, any adhesive or attachment apparatus or material may be used to keep the electrodes in place (e.g., such that the electrodes 30, 32 do not unwind or unroll). For example, insulating tape can be used such as, e.g., Teflon, or polyimide tape such as, e.g., DUPONT KAPTON. In at least one embodiment, polymer material may be molded over one or both end regions or portions of the mandrel 20, e.g., to provide insulation between the electrodes 30, 32 and any other portion of the electrode assembly 16 or battery, to provide structure to the electrode assembly 16, to be used as the removable portion 26 of the mandrel 20, etc.

Figure 6A:
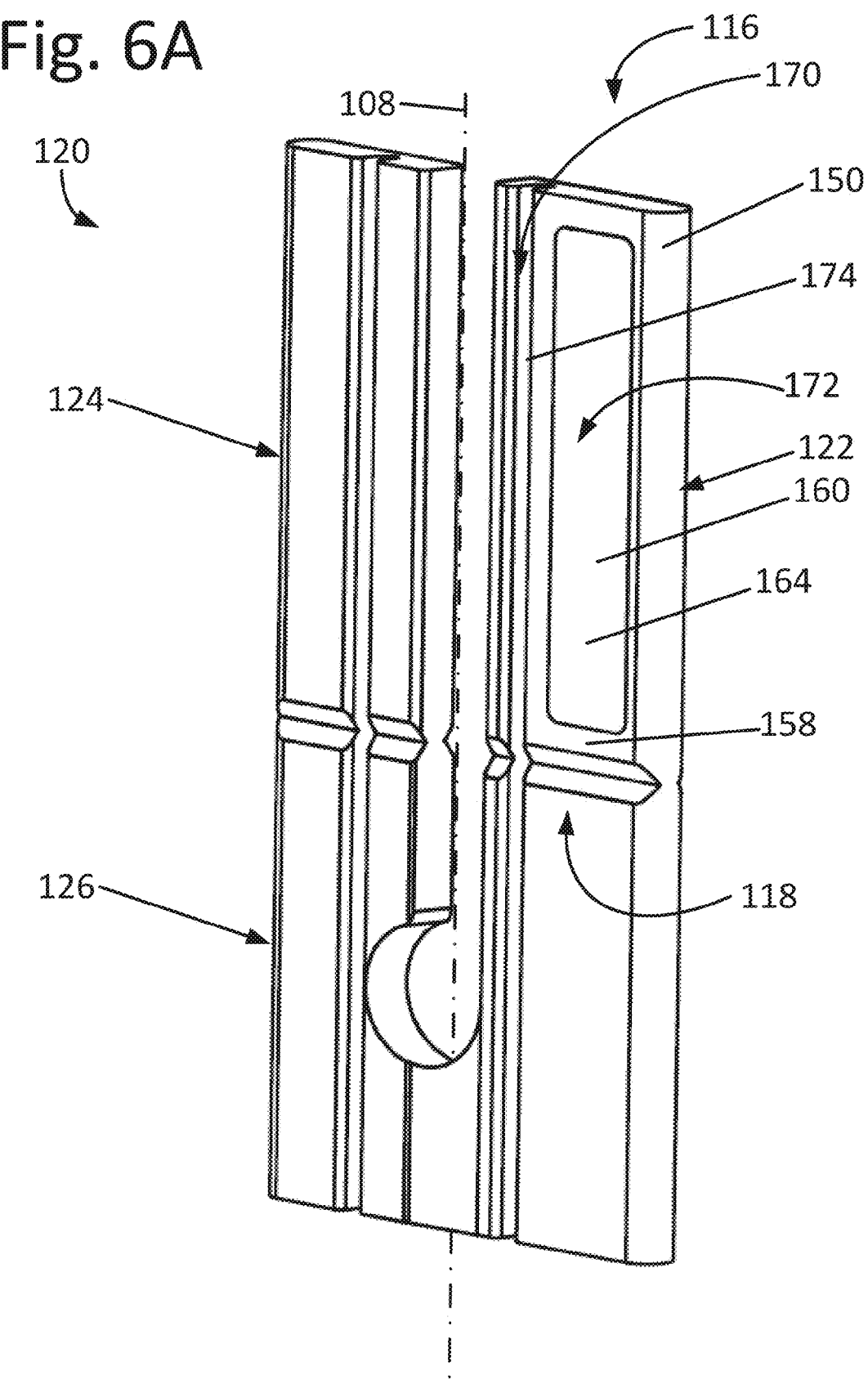
FIG. 6A is a perspective view of an exemplary mandrel for an electrode assembly including positive and negative mandrel portions, each including an electrode coupling portion.
Figure 6B:
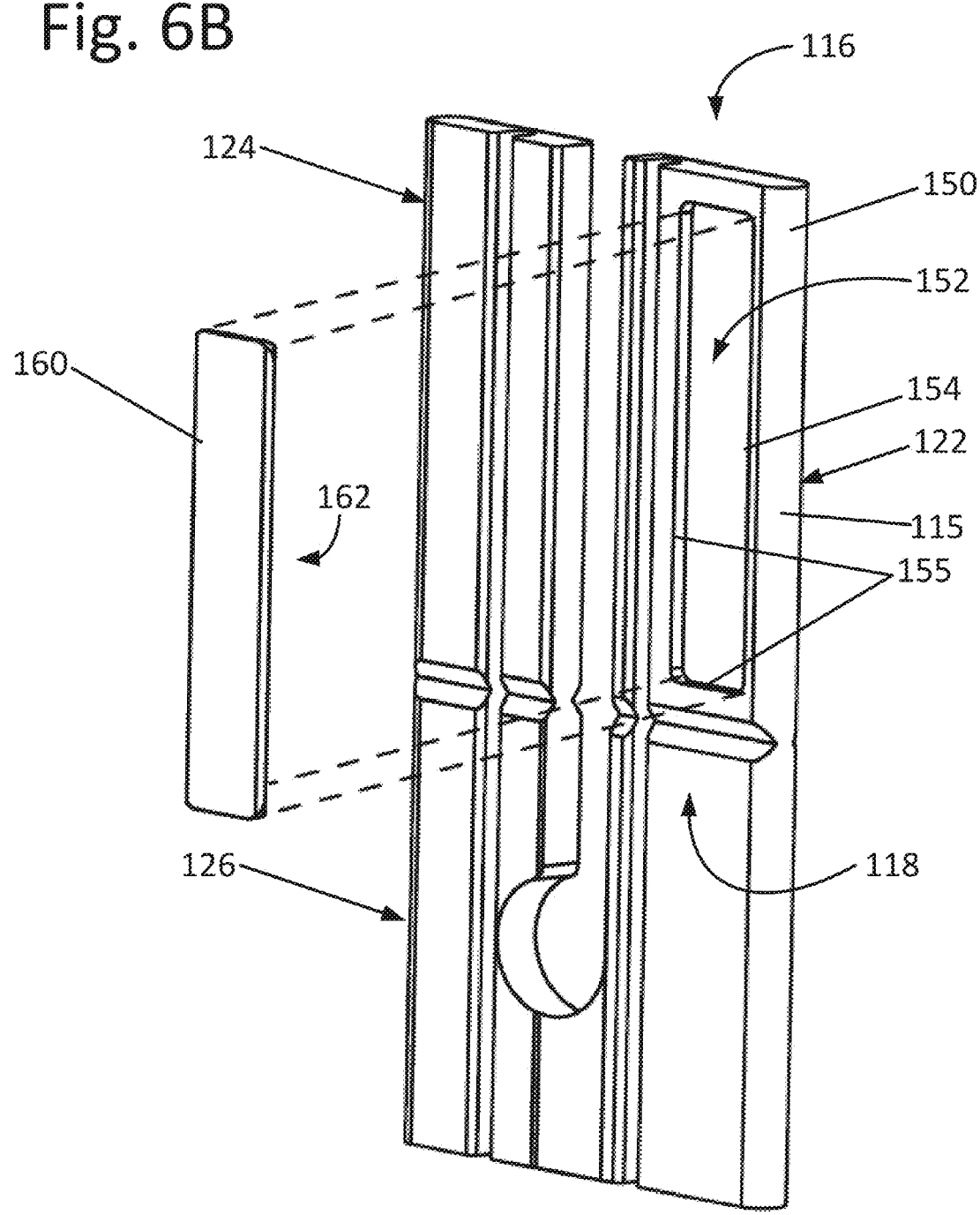
FIG. 6B is a perspective, exploded view of the mandrel of FIG. 6A.

FIGS. 5A-5B show a battery assembly 10 including the coiled electrode assembly 16 made using a mandrel 20 described herein with reference to FIGS. 1-4. More specifically, the battery assembly 10 is depicted in FIG. 5A within an exemplary battery case 64 located over the positive and negative mandrel portions (not shown) and coiled electrodes (not shown) before the removable portion 26 is removed. Further, the battery assembly 10 is shown in FIG. 6B with the removable portion 26 removed. As illustrated, the battery case 64 is dimensioned so as to approximate the size of the mandrel without removable portion 26. Further, separation of the removable portion 26 may result in individual positive and negative mandrel portions 22, 24 of the mandrel 20 integrated into the coiled electrode assembly 16. In at least one embodiment, the coiled electrode assembly 16 can be wound or coiled to a tension desired to accommodate the battery rather than coiling the coiled electrode assembly to a tension that allows the mandrel 20 to be removed from the electrode coil.

The various exemplary mandrels and/or electrode assemblies described herein may include features and/or elements described in U.S. Patent Application Publication No. 2011/0250481 A1 entitled "COIL SEAL TO SECURE THE ELECTRODE WINDINGS OF AN ELECTROCHEMICAL CELL" filed on Mar. 9, 2011, U.S. patent application Ser. No. 13/332,686 entitled "THROUGH WELD INTERCONNECT JOINT" filed on Dec. 21, 2011, issued as U.S. Pat. No. 9,083,053 on Jul. 14, 2015, and U.S. Patent Application Publication No. 2012/0084979 A1 entitled "COILING DEVICE FOR MAKING AN ELECTRODE ASSEMBLY AND METHODS OF USE" filed on Sep. 12, 2011, issued as U.S. Pat. No. 8,832,914 issued Sep. 16, 2014, each of which are also incorporated herein by reference in their entireties. Further, U.S. Pat. App. entitled "MANDREL FOR ELECTRODE ASSEMBLIES" filed on Apr. 26, 2012, now U.S. Pat. No. 8,778,521 issued Jul. 15, 2014, is also incorporated herein by reference in its entirety.

Exemplary mandrels may define one or more coupling regions that may include one or more materials and/or structures configured to provide effective mechanical and electrical coupling to additional electrode assembly elements such as connector elements (e.g., feedthrough pins), electrodes 30, 32 (e.g., foil electrodes), etc. For example, a coupling region may include at least some of the same material as the element (e.g., connector element, electrode, etc.) to be coupled thereto. For instance, a positive electrode may be formed of aluminum, and thus, an electrode coupling region of a positive mandrel portion including aluminum may be provided for coupling the positive electrode thereto. Further, for example, one or more coupling features may be provided in such coupling regions on the mandrel such as protrusions, bumps, apertures, channels, grooves, tabs, etc. that may further assist in coupling an element to the mandrel. Generally, the coupling region may define any one or more features (e.g., features formed by a process) to further assist in coupling an element to the mandrel.

The elements that may be couplable to the exemplary mandrels described herein may also include different materials. For example, connector elements such as feedthrough pins may include titanium and the electrodes may include aluminum. As such, the exemplary mandrels may provide more than one region that includes different material for each different element to be coupled thereto (e.g., coupled by welding, crimping, stamping, pressing, etc.). For example, a mandrel portion, such as a positive or negative mandrel portion 22, 24, may include two regions: an electrode coupling region configured for coupling the mandrel portion to an electrode and a connector element coupling region configured for coupling the mandrel portion to a connector element. The electrode coupling region may include one or more conductive materials and/or one or more features configured for electrical and mechanical coupling to an electrode, such as electrodes 30, 32 (e.g., foil electrodes). The connector element coupling region may include one or more conductive materials and/or one or more features configured for electrical and mechanical coupling to a connector element 42, 44 (e.g., feedthrough pins). The material included in the connector element coupling region may be different than the material included in the electrode coupling region, e.g., to accommodate connector elements that include different material than the electrodes. Exemplary mandrels, such as may be used in the configurations shown in FIGS. 1-5 or any other electrode assembly, including one or more electrode coupling regions and connector element coupling regions are depicted in FIGS. 6-13 and 15-20.

The exemplary mandrels and electrode assemblies may be used in batteries for medical devices (e.g., implantable medical devices) such as, e.g., defibrillators, pacemakers, neural stimulators, cardiac resynchronization therapy devices, drug pumps, insulin pumps, etc. and/or for any other device that may utilize electricity. In other words, exemplary medical devices (e.g., implantable medical devices) may include the mandrels and/or electrode assemblies described herein (e.g., in a battery) as well as any other components and/or features used to provide therapy by the medical devices. Such batteries may provide power (e.g., electricity) to the medical devices. For example, the batteries may be electrically coupled to components and/or features of the medical devices to provide power to such components and/or features.

The exemplary mandrel 120 depicted in FIGS. 6A-6D includes a positive mandrel portion 122, a negative mandrel portion 124, and a removable portion 126 arranged along axis 108. For simplicity, only the positive mandrel portion 122 will be further described in detail. It is to be understood that the negative mandrel portion 124 may also include the same or similar elements and/or features as the positive mandrel portion 122 and may further be configured in the same or similar ways as the positive mandrel portion 122. Further, although in this embodiment, the positive and negative mandrel portions 122, 124 are substantially the same size (e.g., width, height, thickness, etc.), in other embodiments, positive and negative mandrel portions of an exemplary mandrel may be different sizes e.g., for manufacturability, etc.

The positive mandrel portion 122 may be described as extending along the axis 108 from a first end 116 to a second end 118. The positive mandrel portion 122 may define a front side 112 (the surface shown in FIGS. 6A-C) and a rear side 114 (the surface hidden from view in FIGS. 6A-C). Side surfaces 115, or sides, may extend between the front side 112 and the rear side 114. The front and rear side 112, 114 (e.g., front and rear surfaces) may lie generally in planes parallel to the axis 108. Further, as depicted, one side surface 115 may define a curvature while an interior side surface 117 may be generally planar (e.g., parallel to the axis 108). The curved side surface 115 may be curved to, e.g., provide a smooth curve for coupling an electrode about. In other embodiments, the side surface 115 may be generally planar and/or the interior side surface 117 may be curved. Generally, the positive mandrel portion 122 may described as extending longitudinally along the axis 108 such that the mandrel portion 122 has a greater length (e.g., the length being defined by a direction parallel to the axis 108) than width (e.g., the width being defined by a direction perpendicular to the axis 108, the width extending along the front and rear sides 112, 114, etc.). Further, the width of the positive mandrel portion 122 may be greater than the thickness (e.g., the thickness being defined by the side surfaces 115, 117). One or more of the mandrels and/or mandrel portions described here may share the same, or similar, geometric properties.

As depicted, the positive mandrel portion 122 includes a primary portion 150 including a first conductive material and an electrode coupling portion 160 including a second conductive material. As used herein, the term "primary portion" may refer to a portion of a mandrel portion that is generally larger than the other portions of the mandrel portion. For example, a "primary portion" may define the majority of the mandrel portion. Each of the first conductive material and the second conductive material may be steel, platinum, aluminum, titanium, nickel, copper, niobium, etc. and/or combinations or alloys thereof such as, e.g., titanium alloy such as grade 5 or grade 23, platinum-iridium such as 90 percent platinum/10 percent iridium, aluminum sleeve or shell over a titanium core, stainless steel, coated/plated metal, etc. The primary portion 150 and the electrode coupling portion 160 may be electrically and mechanically coupled to each other through various processes. For example, the primary portion 150 may be mechanically coupled to the electrode coupling portion 160 through one or more processes such as, e.g., welding, stamping, pressing, electromagnetic forming, hot isostatic processing, thermal mechanical or thermomechanical forming, hydro mechanical forming, diffusion bonding, etc.

As shown in the exploded view of FIG. 6B, the primary portion 150 defines a mating region 152 configured to mate with a mating region 162 defined by at least a portion of the electrode coupling portion 160 to mechanically couple the primary portion 150 and the electrode coupling portion 160. For example, the mating region 152 of the primary portion 150 and the mating region 162 of the electrode coupling portion 160 may be moved towards and adjacent to one another to mechanically couple the primary portion 150 and the electrode coupling portion 160. Further, the mechanical coupling of the primary portion 150 and the electrode coupling portion 160 may also electrically couple the primary portion 150 and the electrode coupling portion 160.

More specifically, the mating region 152 of the primary portion 150 may define an opening 154 configured to receive at least a portion of the mating region 162 of the electrode coupling portion 160. Although the opening 154 as depicted includes flat or planar surfaces, the opening 154 may further define one or more features to facilitate, or assist, the coupling of the electrode coupling portion 160 therein. For example, although not depicted, the surfaces inside the opening 154 may include, or contain, one or more protrusions, bumps, recesses, ridges, apertures, grooves, channels, incisions, formed regions, etc. configured to mate with the mating region 162 of the electrode coupling portion 160.

The electrode coupling portion 160 may be nested within the opening 154 so as to expose a surface 164 of the electrode coupling portion 160 for coupling of an electrode thereto (e.g., coupled by welding, crimping, stamping, pressing, etc.). The surface 164 may be substantially flat or planar to provide an effective surface for the coupling of an electrode (e.g., foil electrode). In at least one embodiment, the surface 164 may further define one or more features to facilitate, or assist, the coupling of an electrode thereto. For example, although not depicted, the surface 164 may contain one or more protrusions, bumps, recesses, ridges, apertures, grooves, channels, incisions, roughness, formed regions, etc. configured to mate with an electrode.

In at least one embodiment, the opening 154 may be substantially the same size as the electrode coupling portion 160. In other words, the depth of the opening 154 may be the same as, or similar to, the thickness of the electrode coupling portion 160, the length of the opening 154 may be the same as, or similar to, the length of the electrode coupling portion 160, and the width of the opening 154 may be the same as, or similar to, the width of the electrode coupling portion 160.

In at least one embodiment, the opening 154 may not be the same size as the electrode coupling portion 160. For example, the thickness of the electrode coupling portion 160 may be greater than the depth of the opening 154 such that the exposed surface 164 of the electrode coupling portion 160 may extend outward from surface 158 of the primary portion 150 (e.g., the electrode coupling portion 160 may define a bulge above the surface 158). Further, for example, the thickness of the electrode coupling portion 160 may be less than the depth of the opening 154 such that the exposed surface 164 of the electrode coupling portion 160 is located below the surface 158 of the primary portion 150 (e.g., the electrode coupling portion 160 may define recess below the surface 158). Still further, the perimeter of the electrode coupling portion 160 may be slightly larger than the perimeter of the opening 154 of the primary portion 150 so as to provide a tight interference fit when mechanically coupled (e.g., when the electrode coupling portion 160 is located in the opening 154)

As shown in FIG. 6B, the sides surfaces 155 of the opening 154 may be substantially flat. As shown in the illustrative cross sectional view taken across line 110-110' depicted in FIG. 6D, alternatively, the sides surfaces 161 of the electrode coupling portion 160 may not be substantially flat. For example, as shown, the side surfaces 161 of the electrode coupling portion 160 may be pointed, or beveled, which, e.g., may assist in coupling of the electrode coupling portion 160 and the primary portion 150 to each other.

The primary portion 150 may define a connector element coupling region 170. Generally, the connector element coupling region 170 (indicated by arrows in FIGS. 6A & 6D and by a dotted outline in FIG. 6C) may define a region where a connector element may be coupled (e.g., coupled by welding, crimping, stamping, pressing, etc.). For example, the connector element coupling region 170 may include a connector element channel 174 defined by the primary portion 150 configured for receiving a connector element to be coupled therein (e.g., coupled by welding, crimping, stamping, pressing, etc.). As shown in FIG. 6D, the channel 170 in this embodiment defines a "U"-shape. The channel 174, however, may be any shape that facilitates the coupling of a connector element (e.g., "C"-shaped to snap fit a connector element therein, "V"-shaped to receive a connector element by insertion at one end or the other, etc.).

Figure 6C:
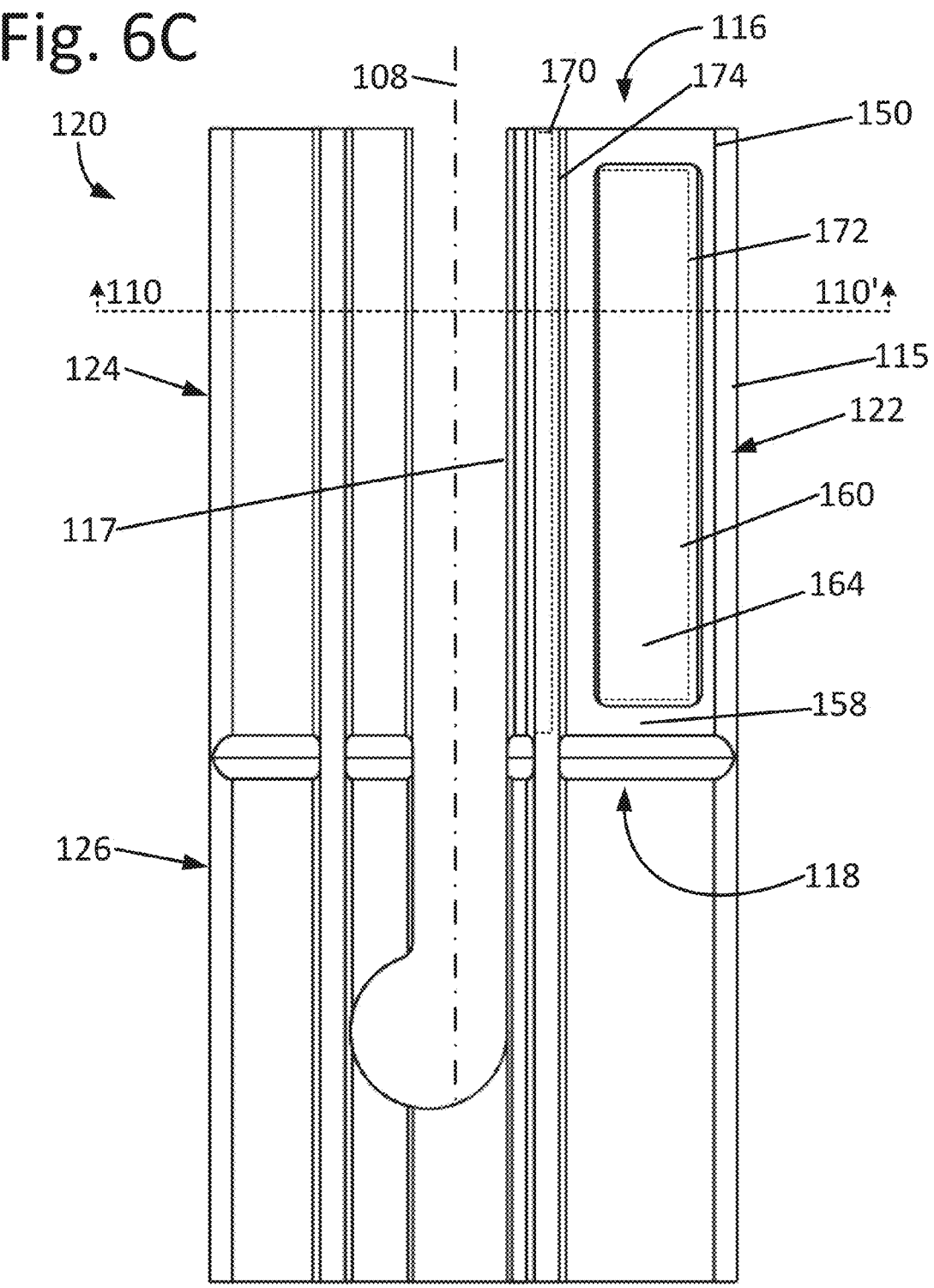
FIG. 6C is a plan view of the mandrel of FIGS. 6A-6B.

When the primary portion 150 and the electrode coupling portion 160 are coupled together (e.g., mechanically and electrically coupled), the positive mandrel portion 122 may define an electrode coupling region 172 (indicated by arrows in FIGS. 6A & 6D and by a dotted outline in FIG. 6C). The electrode coupling region 172 may define a region where an electrode may be coupled. For example, the flat surface 164 of the electrode coupling portion 160 may provide the electrode coupling region 172 for coupling an electrode thereto. In at least one embodiment, a coating (e.g., polyvinylidene fluoride (PVDF) electrode slurry binder) may be applied to the electrode coupling region 172, e.g., to eliminate or slow penetration of electrolyte to a weld zone, create a protective barrier, etc.

In essence, the connector element coupling region 170 may be defined by the primary portion 150 and the electrode coupling region 172 may be defined by the electrode coupling portion 160. Thus, the materials and features of the primary portion 150 may be configured to provide effective coupling to a connector element and the materials and features of the electrode coupling portion 160 may be configured to provide effective coupling to an electrode.

For example, the primary portion 150 may include a first material configured to be coupled to a connector element and the electrode coupling portion 160 may include a second material configured to be coupled to an electrode. The first and second materials may be different or the same. In at least one embodiment, the primary portion 150 may include titanium, e.g., to provide effective electrical and mechanical coupling to titanium connector elements (such as feedthrough pins, etc.), and the electrode coupling portion 160 may include aluminum, e.g., to provide effective electrical and mechanical coupling to aluminum electrodes.

Further, and generally, the negative mandrel portion 124 may also include a primary portion including a first conductive material and an electrode coupling portion including a second conductive material similar to the primary portion 150 and the electrode coupling portion 160 of the positive mandrel portion 122. The first conductive material of the primary portion of the negative mandrel portion 124 may be different than or the same as the second conductive material of the electrode coupling portion of the negative mandrel portion 124. Further, the first conductive material of the primary portion of the negative mandrel portion 124 may be different than or the same as the first conductive material of the primary portion 150 of the negative mandrel portion 122, and the second conductive material of the electrode coupling portion of the negative mandrel portion 124 may be different than or the same as the second conductive material of the electrode coupling portion 160 of the positive mandrel portion 122. For example, the electrode to be coupled to the positive mandrel portion 122 may include different material than the electrode to be coupled to the negative mandrel portion 124, and thus, the electrode coupling portions of the positive and negative mandrel portions 122, 124 may include different material to correspond to the electrode to be coupled thereto (e.g., to provide effective coupling). Further, for example, the connector element to be coupled to the positive mandrel portion 122 may include different material than the connector element to be coupled to the negative mandrel portion 124, and thus, the primary portions of the positive and negative mandrel portions 122, 124 may include different material to correspond to the connector element to be coupled thereto (e.g., to provide effective coupling).

Another exemplary mandrel 220 is depicted in FIGS. 7A-7D. The mandrel 220 includes a positive mandrel portion 222, a negative mandrel portion 224, and a removable portion 226 arranged about axis 208. Similar to the positive mandrel portion 122 of the mandrel 120 of FIGS. 6A-6D, the positive mandrel portion 222 of the mandrel 220 includes a primary portion 250 and an electrode coupling portion 260 mechanically and electrically coupled to each other. Further, the primary portion 250 defines a connector element coupling region 270 (e.g., including a "U"-shaped channel) for receiving and for coupling a connector element thereto (e.g., coupled by laser welding, ultrasonic welding, crimping, stamping, pressing, etc.), and the electrode coupling portion 260 defines an electrode coupling region 272 (e.g., a flat surface) for coupling an electrode thereto (e.g., coupled by laser welding, ultrasonic welding, crimping, stamping, pressing, etc.).

Differing from the mandrel 120, however, the electrode coupling portion 260 of the positive mandrel portion 222 is located in a corner region of the primary portion 250 such that two side surfaces 261 of the electrode coupling portion 260 define a portion of the side surface 223 of the positive mandrel portion 222. Similar to the mandrel 120 of FIGS. 6A-6D, the primary portion 250 and the electrode coupling portion 260 may include different conductive materials configured to provide effective coupling to elements including different conductive materials.

Further, the negative mandrel portion 224 of the mandrel 220 includes a primary portion 280 and an electrode coupling portion 282. As shown, the electrode coupling portion 282 of the negative mandrel portion 224 is located on the opposite face, or side, of the mandrel 220 as the electrode coupling portion 260 of the positive mandrel portion 222.

Figure 7D:
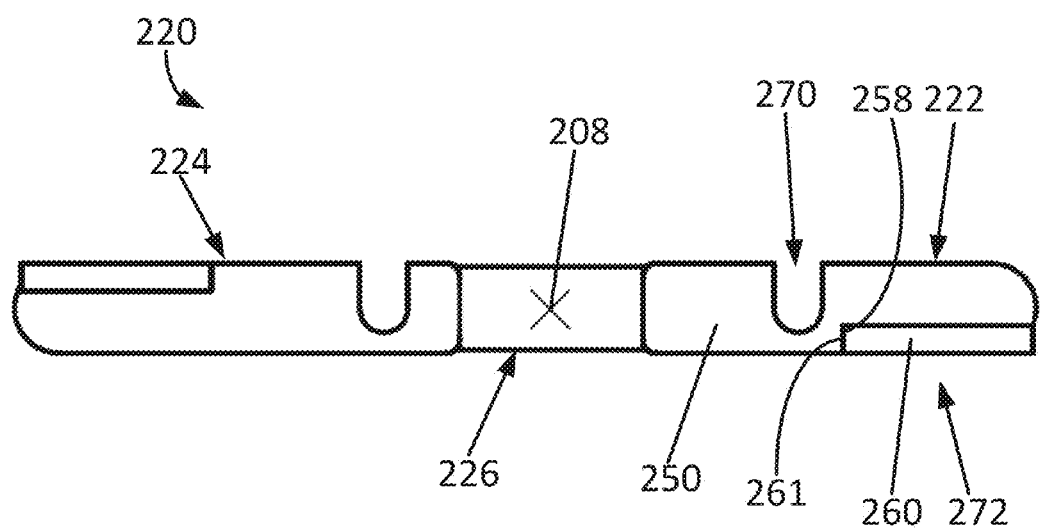
FIG. 7D is a cross sectional view of the mandrel of FIGS. 7A-7C.

As shown in the exploded view of FIG. 7B, the primary portion 250 may define a mating region 252 for coupling to a mating region 262 of the electrode coupling portion 260. The mating region 252 may define an opening 254 that includes a flat surface 256 and two side surfaces 258 for receiving the mating region 262 of the electrode coupling portion 260. As shown in the cross sectional view taken across line 210-210' depicted in FIG. 7D, the side surfaces 258 of the opening 254 and the sides surfaces 261 of the electrode coupling portion 260 may be substantially flat. The coupling portion 260 may be coupled in the opening 254 using, e.g., laser welding, resistance welding, diffusion bonding, crimping, pressing (using surface features), etc.

Figure 8A:
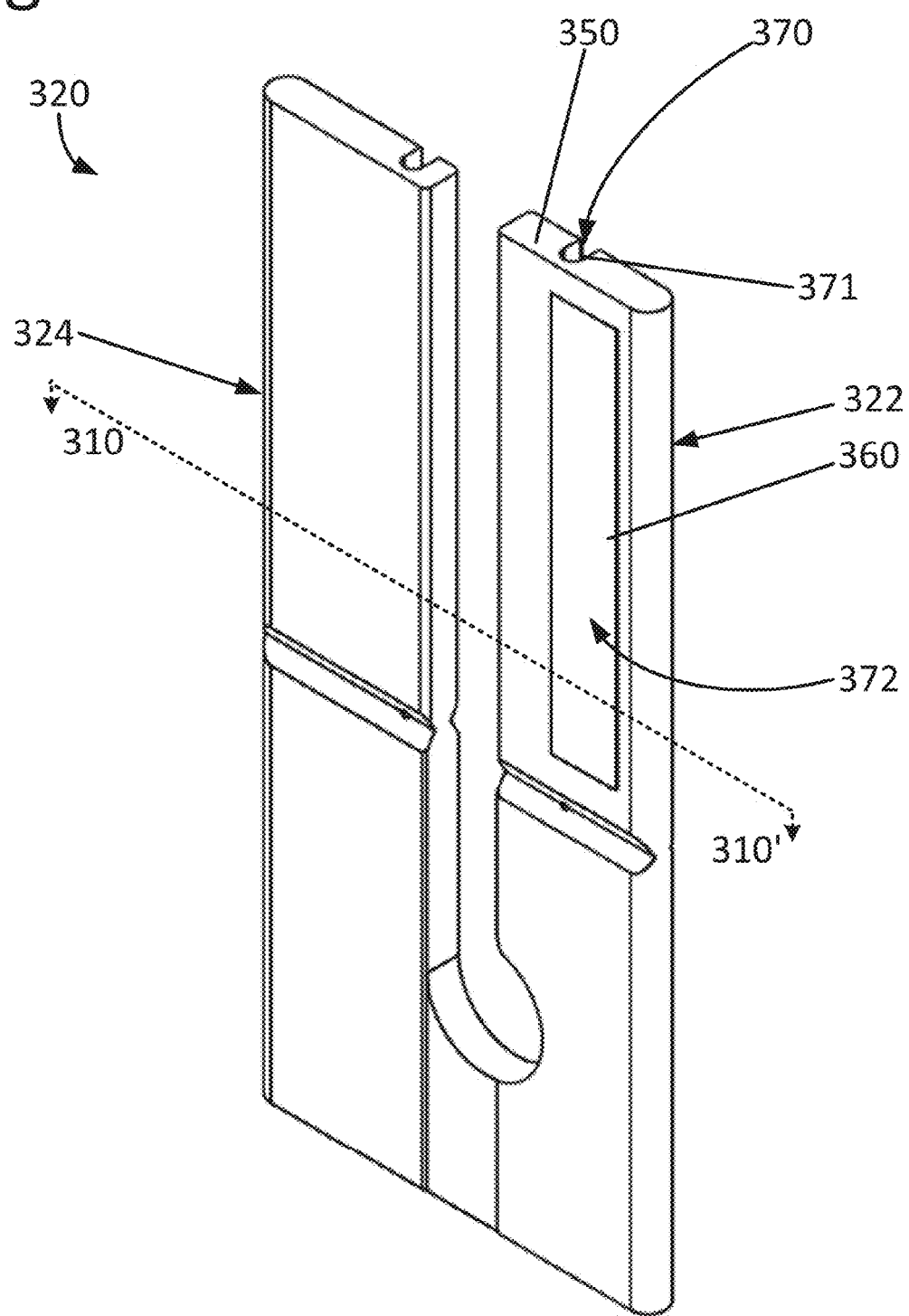
FIG. 8A is a perspective view of an exemplary mandrel for an electrode assembly including positive and negative mandrel portions, each including an electrode coupling portion formed by deposition.
Figure 8B:
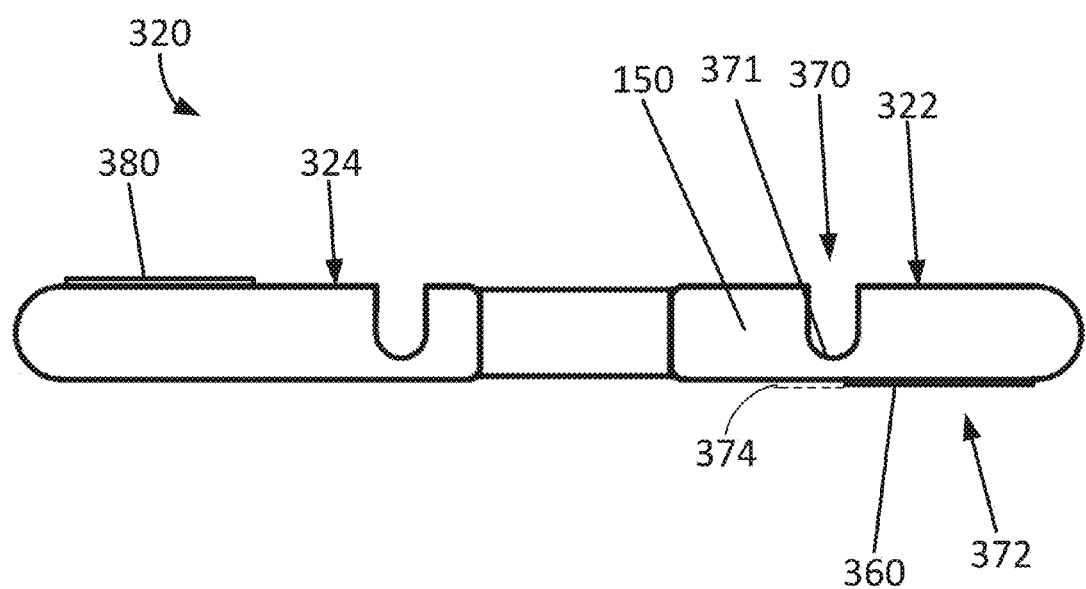
FIG. 8B is a cross sectional view of the mandrel of FIG. 8A.

Different than the embodiments depicted in FIGS. 6A-6D and 7A-7D, an electrode coupling portion may also be mechanically and electrically coupled to a primary portion through one or more deposition techniques such as chemical vapor deposition, plasma vapor deposition, ion bombardment, sputtering, ion beam deposition, atmospheric pressure ion deposition, etc. For example, an exemplary mandrel 320 including a positive mandrel portion 322 and a negative mandrel portion 324, each including an electrode coupling portion 360, 380, respectively, that has been deposited is depicted in FIGS. 8A-8B.

Although each of the positive and negative mandrel portions 322, 324 include deposited electrode coupling portions 360, 380, only the positive mandrel portion 322 will be described further herein in detail for simplicity. It is to be understood that the negative mandrel portion 324 may include the same or similar features and/or elements of the positive mandrel portion 322 and may be configured in the same, or in a similar, way.

As shown, the positive mandrel portion 322 may include a primary portion 350 and an electrode coupling portion 360. The primary portion 350 defines a region upon which the electrode coupling portion 360 may be deposited. In at least one embodiment, the region may define a flat or planar surface upon which the deposited electrode coupling portion 360 may be deposited. In at least one embodiment, the region may define a recess, or pocket, for receiving the deposited electrode coupling portion 360. In at least one embodiment, the region may define a recessed, roughened, smooth (e.g., polished), etc. surface for receiving the deposited electrode coupling portion 360.

The electrode coupling portion 360 may be deposited on the region of the primary portion 350 using one or more various techniques or processes. For example, the electrode coupling portion 360 may be deposited using chemical vapor deposition. For example, one or more masking processes (e.g., taping, coating such as wax coating or sacrificial/removable mask, painting, etc.), etching processes, etc. may be used to define the electrode coupling portion 360.

A cross sectional view of the mandrel 320 taken across line 310-310' is depicted in FIG. 8B. As shown, the electrode coupling portion 360 may include one or more layers formed on the primary portion 350 having a thickness 374, or depth, that is greater than or equal to about 1 micron, about 5 microns, about 10 microns, about 25 microns, about 50 microns, etc. Further, the electrode coupling portion 360 may form a layer on the primary portion 350 having a thickness 374, or depth, that is less than or equal to about 60 microns, about 70 microns, about 85 microns, about 100 microns, about 150 microns, about 200 microns, etc. The primary portion 350 may define a bond surface configured for receiving the one or more layers of the electrode coupling portion 360. In at least one embodiment, the electrode coupling portion 360 may extend along, or define, a length that is substantially the same as the width of an electrode (e.g., formed of foil) to be coupled thereto. Further, in at least one embodiment, the electrode coupling portion 360 may extend along, or define, a width that covers the entire, or less than the entire, width of the primary portion 350.

After deposition, the electrode coupling portion 360 may define an electrode coupling region 372 configured for the electrical coupling of an electrode thereto (e.g., coupled by laser welding, ultrasonic welding, crimping, stamping, pressing, etc.). Further, the primary portion 350 may define a connector element coupling region 370 configured for the electrical coupling of a connector element thereto (e.g., coupled by laser welding, ultrasonic welding, crimping, stamping, pressing, etc.). As shown, the connector element coupling region 370 includes a channel 371 for receiving a connector element such as a feedthrough pin. The connector element coupling region 370 and the electrode coupling region 372 may function in a similar manner to the connector element coupling region 170 and the electrode coupling region 172 described herein with reference to FIGS. 6A-6D.

Although the mandrels described herein with reference to FIGS. 6-8 include primary portions coupled to electrode coupling portions (to which electrodes may be coupled) using various processes, techniques, and structures, mandrels according to the present disclosure may include primary portions coupled to connector element coupling portions (to which connector elements may be coupled) using the same or different processes, techniques, and structures. In other words, the primary portion may be configured to be electrically and mechanically coupled to an electrode (as opposed to a connector element as in the embodiments described with reference to FIGS. 6-8) and a connector element coupling portion (as opposed to an electrode coupling portion as in the embodiments described with reference to FIGS. 6-8) coupled to the primary portion may be configured to be electrically and mechanically coupled to a connector element.

Figure 9C:
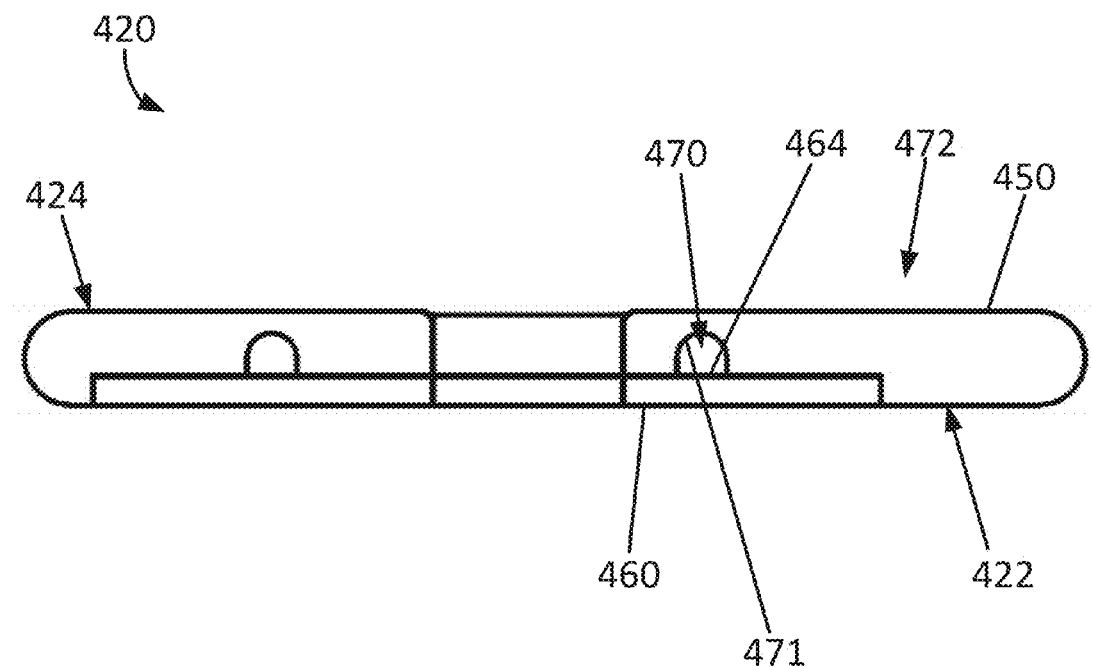
FIG. 9C is a cross sectional view of the mandrel of FIGS. 9A-9B.

For example, an exemplary mandrel 420 that utilizes a connector element coupling portion is depicted in FIGS. 9A-9C. The mandrel 420 includes a positive mandrel portion 422, a negative mandrel portion 424, and a removable portion 426. For simplicity, only the positive mandrel portion 422 will be further described in detail. It is to be understood that the negative mandrel portion 424 may also include the same or similar elements and/or features as the positive mandrel portion 422 and may further be configured in the same or similar ways as the positive mandrel portion 422.

As depicted, the positive mandrel portion 422 includes a primary portion 450 including a first conductive material and a connector element coupling portion 460 including a second conductive material different than the first conductive material. The primary portion 450 and the connector element coupling portion 460 may be electrically and mechanically coupled to each other through various processes similar to the exemplary processes used to couple the primary portion 150 and the electrode coupling portion 160 described herein with reference to FIGS. 6A-6D, or any other one or more coupling processes. For example, the connector element coupling portion 460 may be inserted, press fit, or otherwise mated with the primary portion 450, etc. Further, any other coupling processes described herein may be used to couple the primary portion 450 to the connector element coupling portion 460.

As shown in the exploded view depicted in FIG. 9B, the primary portion 450 may define a mating region 452 configured to mate with a mating region 462 defined by at least a portion of the connector element coupling portion 460. In other words, the mating regions 452, 462 may be used to mechanically couple the primary portion 450 and the connector element coupling portion 460. For example, the mating region 452 of the primary portion 450 and the mating region 462 of the connector element coupling portion 460 may be moved towards each other and adjacent to each other to mechanically couple the primary portion 450 and the connector element coupling portion 460. Further, the mechanical coupling between the primary portion 450 and the connector element coupling portion 460 may further provide electrical coupling therebetween.

More specifically, as shown, the mating region 452 of the primary portion 450 may define an opening 454 configured to receive at least a portion of the mating region 462 of the connector element coupling portion 460. Although the opening 454 as depicted includes flat or planar surfaces, the opening 454 may define one or more features to facilitate, or assist, the coupling of the connector element coupling portion 460 therein, which may be similar to the features described herein for coupling the primary portion 150 and the electrode coupling portion 160 with reference to FIGS. 6A-6D.

As shown in the cross sectional view of the mandrel 420 taken across line 410-410' depicted in FIG. 9C, the mating region 452 of the primary portion 450 may further define a channel 471 for receiving a connector element. In at least one embodiment, the channel 471 may be deposited with titanium (e.g., for coupling to a titanium connector element). When the connector element coupling portion 460 is received within the opening 454 (e.g., nested within the opening 454), the positive mandrel portion 422 may define a connector element coupling region 470 inside (e.g., across from) the channel 471 for coupling a connector element thereto (e.g., coupled by laser welding, ultrasonic welding, crimping, stamping, pressing, etc.). More specifically, at least a portion of the connector element coupling portion 460 may be configured to contact a connector element such as a feedthrough pin located in the channel 471. For example, the connector element coupling portion 460 may be positioned within the opening 454 such that at least a portion of a surface 464 of the connector element coupling portion 460 may be configured to contact a feedthrough pin (or any other connector element) located in the channel 471 to provide mechanical and electrical coupling therebetween. Although the surface 464 of the connector element coupling portion 460 as depicted includes a flat or planar surface, the surface 464 may define one or more features to facilitate, or assist, the coupling of the connector element coupling portion 460 within the opening 454, which may be similar to the features described herein for coupling the primary portion 150 and the electrode coupling portion 160 with reference to FIGS. 6A-6D. In at least one embodiment, the surface 464 may define a channel or depression for at least partially receiving a connector element.

For example, although not depicted, the surface 464 may contain one or more protrusions, bumps, recesses, ridges, deflectable portions, fingers, formed regions, etc. configured to contact a connector element located within the channel 471.

In at least one embodiment, the opening 454 may be substantially the same size as the connector element coupling portion 460. In other words, the depth of the opening 454 may be the same as, or similar to, the thickness of the connector element coupling portion 460, the length of the opening 454 may be the same as, or similar to, the length of the connector element coupling portion 460, and the width of the opening 454 may be the same as, or similar to, the width of the connector element coupling portion 460.

As depicted, the connector element coupling portion 460 may be a part of larger portion of material 480 that includes a connector element coupling portion 482 to be used with (e.g., to be coupled to) the negative mandrel portion 424 and a removable section 484 configured for removal with the removable portion 426. Further, a decoupling region 486 may be defined across at least part of the material 480.

As shown in the cross sectional view of the mandrel 420 taken across line 410-410' depicted in FIG. 9C, the primary portion 450 may define an electrode coupling region 472 (e.g., a flat surface) configured for coupling an electrode thereto. The primary portion 450, and therefore, the electrode coupling region 472 of the positive mandrel portion 422 may include a first conductive material configured for coupling to an electrode and the connector element coupling portion 460, and therefore, the connector element coupling region 470, may include a second conductive material configured for coupling to a connector element. The first and second conductive material may be the same or different, e.g., depending on the materials of the connector elements and the electrodes. For example, the connector element may include titanium, and thus, the connector element coupling portion 460 and the connector element coupling region 470 may also include titanium. The electrode may include aluminum, and thus, the primary portion 450 and the electrode coupling region 472 may include aluminum.

As described herein, various manufacturing techniques and processes may be used to form the exemplary mandrel portions described herein. Exemplary mandrels that may be produced using progressive stamping, rolling, forging, forming, swaging, machining, etching, stamping, cutting, welding, extruding, electromagnetic forming, hot isostatic processing, thermal mechanical or thermomechanical forming, hydro mechanical forming, etc. are described herein with reference to FIGS. 10-13 and 15-20. For example, at least a portion of a connector element coupling portion of a mandrel portion may be positioned adjacent (e.g., wrapped, swaged, stamped together, etc.) to at least a portion of an electrode coupling portion of the mandrel portion to mechanically couple the connector element coupling portion and the electrode coupling portion. The mechanical coupling between the connector element coupling portion and the electrode coupling portion may provide an electrical coupling therebetween.

Figure 10A:
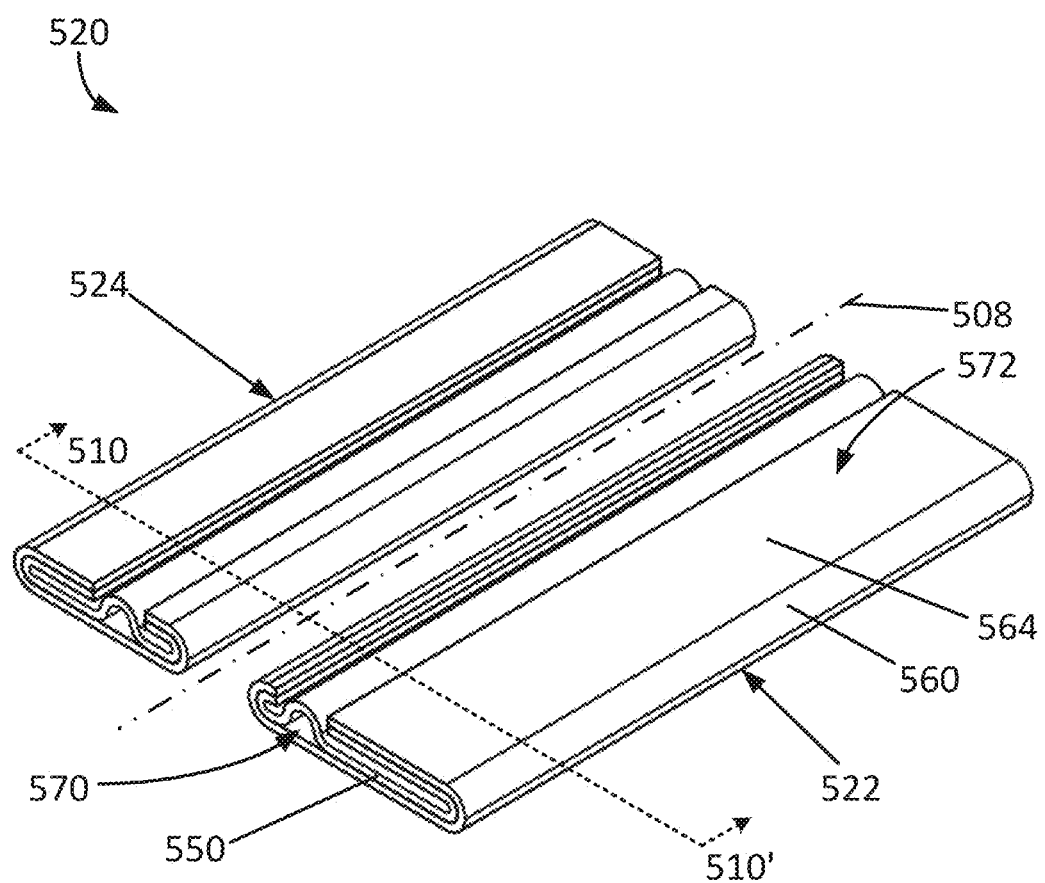
FIG. 10A is a perspective view of an exemplary mandrel for an electrode assembly including positive and negative mandrel portions, each including a connector element coupling portion and an electrode coupling portion.
Figure 10B:
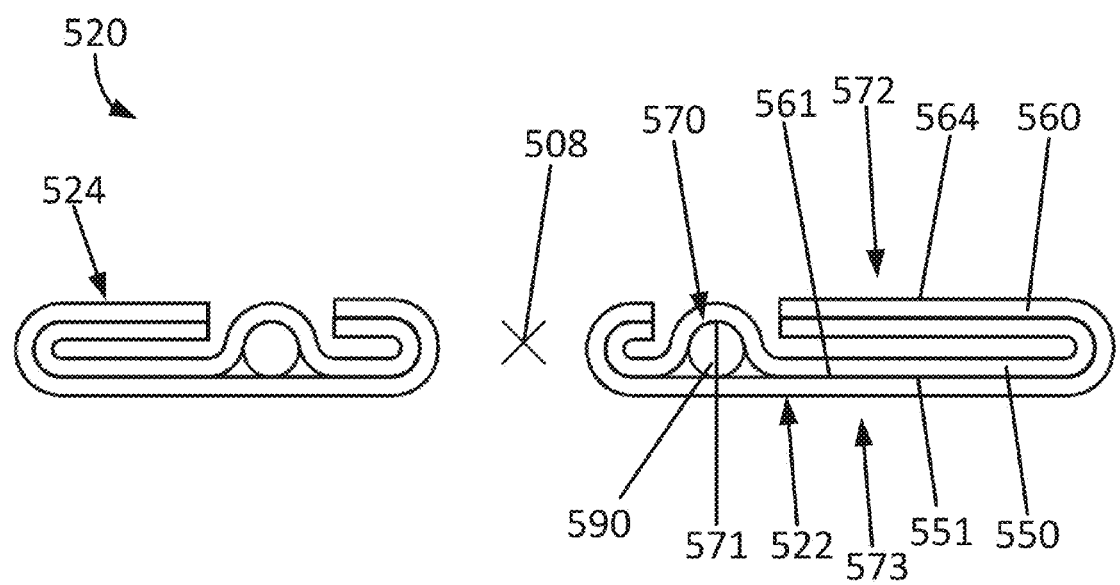
FIG. 10B is a cross sectional view of the mandrel of FIG. 10A.

The exemplary mandrel 520 depicted in FIGS. 10A-10B includes a positive mandrel portion 522 and a negative mandrel portion 524 arranged along axis 508. When the mandrel 520 is used in (e.g., to form) a battery assembly (e.g., when the electrodes are located, or placed, thereabout, etc.), the positive mandrel portion 522 may be spaced apart from the negative mandrel portion 524 as depicted in FIG. 10A and as further described herein with reference to the exemplary mandrel shown in FIGS. 1-5 using any suitable structure (e.g., polymer portions, removable portions, etc.). As shown, the positive mandrel portion 522 and the negative mandrel portion 524 may be similar, and as such, only the positive mandrel portion 522 will be further described in detail. It is to be understood that the negative mandrel portion 524 may also include the same or similar elements and/or features as the positive mandrel portion 522 and may further be configured in the same or similar ways as the positive mandrel portion 522.

The positive mandrel portion 522 may be configured to be electrically and mechanically coupled to a positive electrode to be located around the mandrel 520 to be used in a battery assembly. Further, the positive mandrel portion 522 may be configured to be electrically and mechanically coupled to a positive connector element configured to extend outside of a battery casing in a battery assembly. To provide such couplings, the positive mandrel portion 522 may include a connector element coupling portion 550 and an electrode coupling portion 560 that are electrically and mechanically coupled to each other. For example, a portion of the connector element coupling portion 550 and a portion of the electrode coupling portion 560 may be positioned adjacent to each other to mechanically couple them to each other. The mechanical coupling between the connector element coupling portion 550 and the electrode coupling portion 560 may further provide an electrical coupling therebetween.

As shown, about 85% of the connector element coupling portion 550 is positioned adjacent to about 85% of the electrode coupling portion 560. More specifically, as shown in the cross section of the mandrel 520 taken across line 510-510' depicted in FIG. 10B, an outer surface 551 of the connector element coupling portion 550 may be positioned adjacent to an inner surface 561 of the electrode coupling portion 560. Although, as described previously, about 85% of each of the outer surface 551 of the connector element coupling portion 550 and the inner surface 561 of the electrode coupling portion 560 are adjacent to each other, more or less of the outer and inner surfaces, or any other surfaces, of the connector element coupling portion 550 and the electrode coupling portion 560 may be positioned adjacent to each other such that they are effectively mechanically coupled to each other. For example, at least about 5%, about 10%, about 15%, about 20%, about 25%, about 35%, about 50%, about 65%, about 75%, about 85%, etc. of one or more surfaces of the connector element coupling portion 550 and the electrode coupling portion 560 may be positioned adjacent to each other as long as they may be effectively mechanically coupled to each other.

The connector element coupling portion 550, similar to previous connector element coupling portions described herein, may be configured to be coupled to a connector element. For example, the connector element coupling portion 550 may define a connector element coupling region 570 (e.g., a region for coupling a connector element thereto using welding, adhesion, press fit, interference fit, crimping, etc.). As shown, the connector element coupling portion 550 defines a channel 571 for receiving a connector element 590 as shown in FIG. 10B. In at least one embodiment, the channel 571 may be formed by stamping the channel 571 into the material of the connector element coupling portion 550 before being coupled to the electrode coupling portion 560. Exemplary formation of the channel 571 is further described herein with reference to FIG. 13B.

The electrode coupling portion 560 may be configured to be coupled to an electrode. For example, the electrode coupling portion 560 may define an electrode coupling region 572 (e.g., a region for coupling an electrode thereto by laser welding, ultrasonic welding, crimping, stamping, pressing, etc.). As shown, the electrode coupling portion 560 may define a planar, or flat, surface 564 to be coupled to an electrode. Although the electrode coupling region 572 and the surface 564 are depicted as being a top side in FIGS. 10A-10B, it is to be contemplated that the electrode coupling region 572 and the surface 564 may be located on the other, or bottom, side 573 (indicated in FIG. 10B) of the electrode coupling portion 560.

As shown, the positive mandrel portion 522 is wider (e.g., a direction perpendicular to the axis 508) than the negative mandrel portion 524, e.g., for manufacturability, to provide electrode coupling regions on opposite sides of the mandrel, etc. In other embodiments, the positive mandrel portion 522 may be substantially the same size as the negative mandrel portion 524.

As described herein, at least a portion of a connector element coupling portion and at least a portion of an electrode coupling portion may be positioned adjacent each other to mechanically couple the connector element coupling portion and the electrode coupling portion. The portions of the connector element coupling portion and the electrode coupling portions that are positioned adjacent to each other to provide mechanical coupling may be wrapped, swaged, crimped, stamped, etc. about each other to provide the mechanical coupling. The mechanical coupling may further provide an electrical coupling between the connector element coupling portion and the electrode coupling portion.

In at least one embodiment, at least a portion of an electrode coupling portion is wrapped about at least a portion of the connector element coupling portion to mechanically couple the connector element coupling portion and the electrode coupling portion. For example, as shown in FIGS. 10A-10B, the electrode coupling portion 560 wraps almost completely around the connector element coupling portion 550. Further, the connector element coupling portion 550 and the electrode coupling portion 560 may be crimped about each other simultaneously (e.g., bent, or molded, to each other at the same time).

The mandrel 520 may further include a removable portion that may be removably coupled to each of the positive and negative mandrel portions 522, 524. The removable portion may be part of one or both of the connector element coupling portion 550 and the electrode coupling portion 560, or may be a separated removable portion coupled thereto.

Although not depicted, the positive mandrel portion 522 may further include a tying portion (e.g., a layer) located between (e.g., sandwiched between) one or more portion (e.g., all) of each of the connector element coupling portion 550 and the electrode coupling portion 560. The tying portion may provide effective coupling, corrosion resistance, and/or various mechanical properties to the mandrel portion 522. The tying portion may be chosen, or selected, to have a melt point between the melt point of the materials of each of the connector element coupling portion 550 and the electrode coupling portion 560. For example, the connector element coupling portion 550 may include titanium and may have a melt point of about 1600 degrees Celsius, and the electrode coupling portion 560 may include aluminum and may have a melt point of about 600 degrees Celsius. In this example, the material of the tying portion may be selected to have a melt point between about 600 degrees Celsius and about 1600 degrees Celsius. In at least one embodiment, the tying portion may include copper and may have a melt point of about 1100 degrees Celsius.

The exemplary mandrels described herein may be provided (e.g., produced, manufactured, etc.) by one or more various chemical and physical processes. An exemplary method of providing mandrel portions is described herein with reference to FIG. 11. Although a single mandrel portion is described in the exemplary method, it is to be understood that each mandrel portion may be produced concurrently and/or separately.

Figure 11:
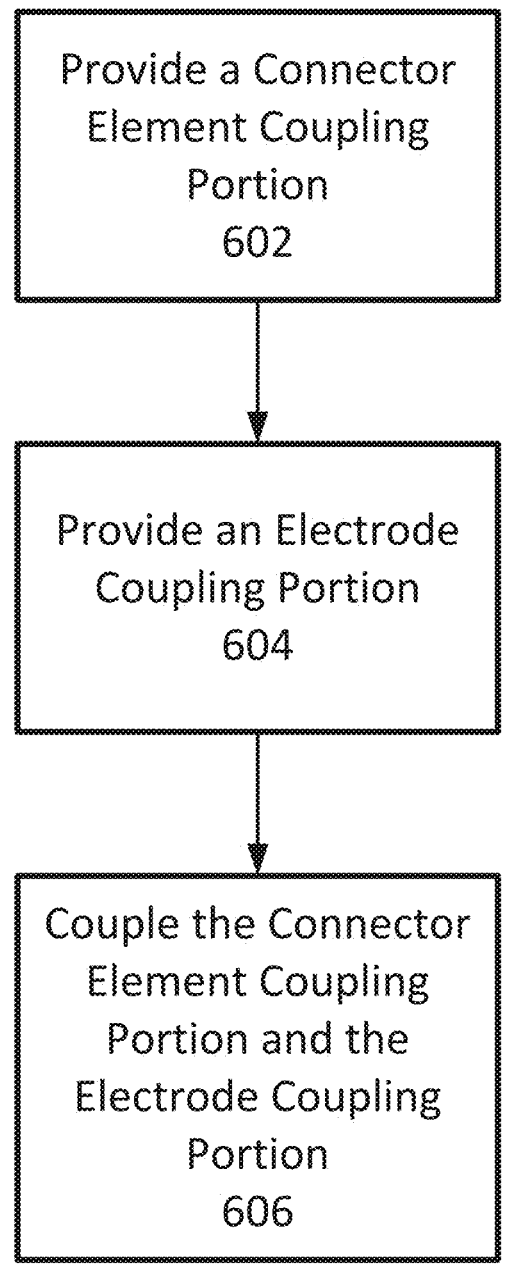
FIG. 11 is a block diagram of an exemplary method of producing an exemplary mandrel, e.g., the mandrel of FIGS. 10A-10B.

The exemplary method 600 depicted in FIG. 11 includes providing a connector element coupling portion 602 and providing an electrode coupling portion 604. The connector element coupling portion may include a first conductive material and the electrode coupling portion may include a second conductive material. In one or more embodiments, the second conductive material may be different than the first conductive material. For example, the first material may be titanium and the second material may be aluminum.

In at least one embodiment, the connector element coupling portion may be a sheet of material. Further, in at least one embodiment, the connector element coupling portion may be formed into a selected or specific shape configured for coupling to the electrode coupling portion and/or for coupling to a connector element. For example, various shapes and/or features may be formed (e.g., by stamping, cutting, pressing, crimping, welding, etc.) in the connector element coupling portion such as, e.g., channels, indentations, protrusions, roughened surfaces, fingers, openings, curves, etc. to facilitate coupling to the electrode coupling portion and/or a connector element.

Likewise, in at least one embodiment, the electrode coupling portion may be a sheet of material. Further, in at least one embodiment, the electrode coupling portion may be formed into a shape configured for coupling to the connector element coupling portion. For example, various shapes and/or features may be formed in the electrode coupling portion such as, e.g., channels, indentations, protrusions, roughened surfaces, fingers, openings, curves, etc. to facilitate such couplings to facilitate coupling to the connector element coupling portion and/or an electrode.

The exemplary method 600 may further include coupling the connector element coupling portion and the electrode coupling portion 606. Generally, at least a portion of the connector element coupling portion may be positioned adjacent to at least a portion of the electrode coupling portion to couple the connector element coupling portion and the electrode coupling portion. Coupling the connector element coupling portion and the electrode coupling portion 606 may include stamping, wrapping, crimping, welding, and/or swaging at least a portion of each of the connector element coupling portion and the electrode coupling portion together. In other words, one or more portions of each of the connector element coupling portion and the electrode coupling portion may be wrapped, crimped, welded, stamped, and/or swaged to each other to such that they are mechanically coupled. Further, the mechanical coupling between the connector element coupling portion and the electrode coupling portion may provide an electrical coupling therebetween.

Further, as described herein, a tying portion (e.g., layer) may be located between (e.g., sandwiched between) the connector element coupling portion and the electrode coupling portion before, or during, the coupling of the connector element coupling portion and the electrode coupling portion 606. Still further, a removable portion may be provided as part of, or coupled to, one or both of the connector element coupling portion and the electrode coupling portion.

Figure 12A:
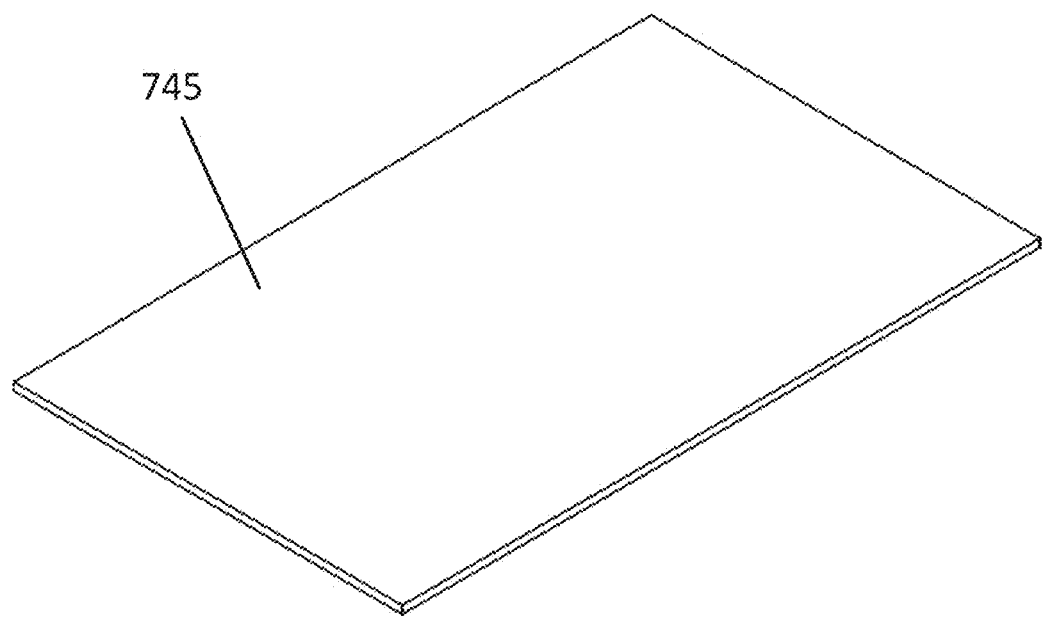
FIGS. 12A-12D are perspective views of portions of the exemplary mandrel of FIGS. 10A-10B being produced.

Perspective views of an exemplary mandrel portion being produced are depicted in FIGS. 12A-12D. A first material 745 (e.g., sheet of material, ribbon of material, block of material, etc.) for the connector element coupling portion may be provided as shown in FIG. 12A. As described herein, the connector element coupling portion may include material that may be effectively coupled to a connector element, and thus, the first material 745 used to form the connector element coupling portion may include material that may be effectively coupled to a connector element. For example, the first material 745 may include at least some of the same material as the connector element to facilitate effective coupling. In at least one embodiment, the sheet of material may include titanium to facilitate effective coupling to a titanium connector element.

Figure 12B:
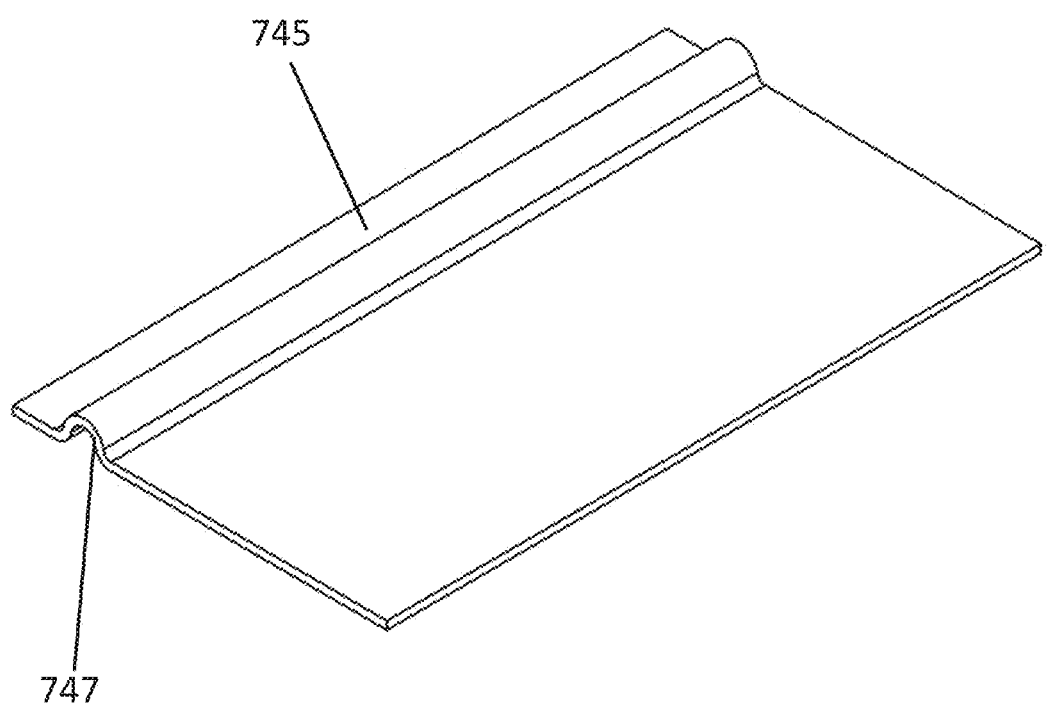

A channel 747 may be formed in the first material 745 as shown in FIG. 12B. The channel 747 may be configured to define a connector element coupling region and to receive a connector element for a battery assembly. Although a channel is depicted in FIG. 12B, any one or more features may be used to define a connector element coupling region. The channel 747 may be formed by stamping, bending, coining, rolling, machining, etc. the first material 745.

Figure 12C:
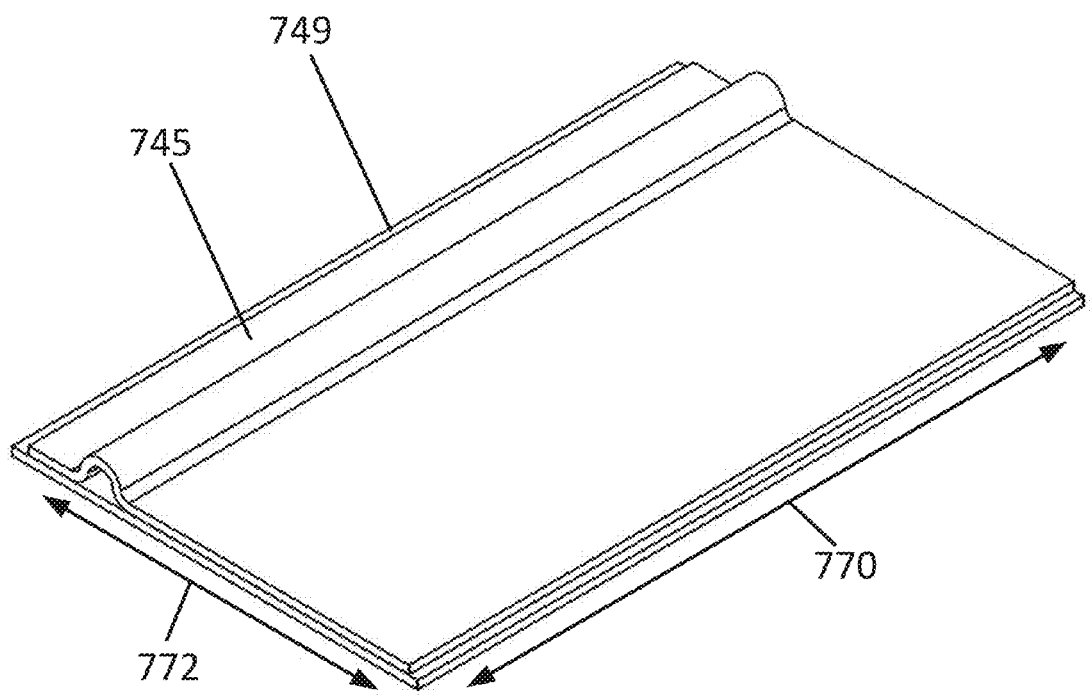

A second material 749 may be provided and positioned proximate (e.g., below) the first material 745 as shown in FIG. 12C. The first material 745 and the second material 749 may be sized relative to each other to provide effective coupling. As shown, the second material 749 has a longer width 772 than the first material 745 and the second material 749 and the first material 745 have about the same length 770. In other embodiments, the second material 749 may have the same or shorter width 772 than the first material 745 and/or the second material 749 may have a longer or shorter length 770 than the first material 745. Each material 745, 749 may have the same thickness such as, e.g., about 0.005 inches, about 0.01 inches, about 0.02 inches, etc. In other embodiments, each material 745, 749 may have a different thickness. For example, the first material 745 may have a thickness of about 0.005 inches and the second material 749 may have a thickness of about 0.007 inches.

Figure 12D:
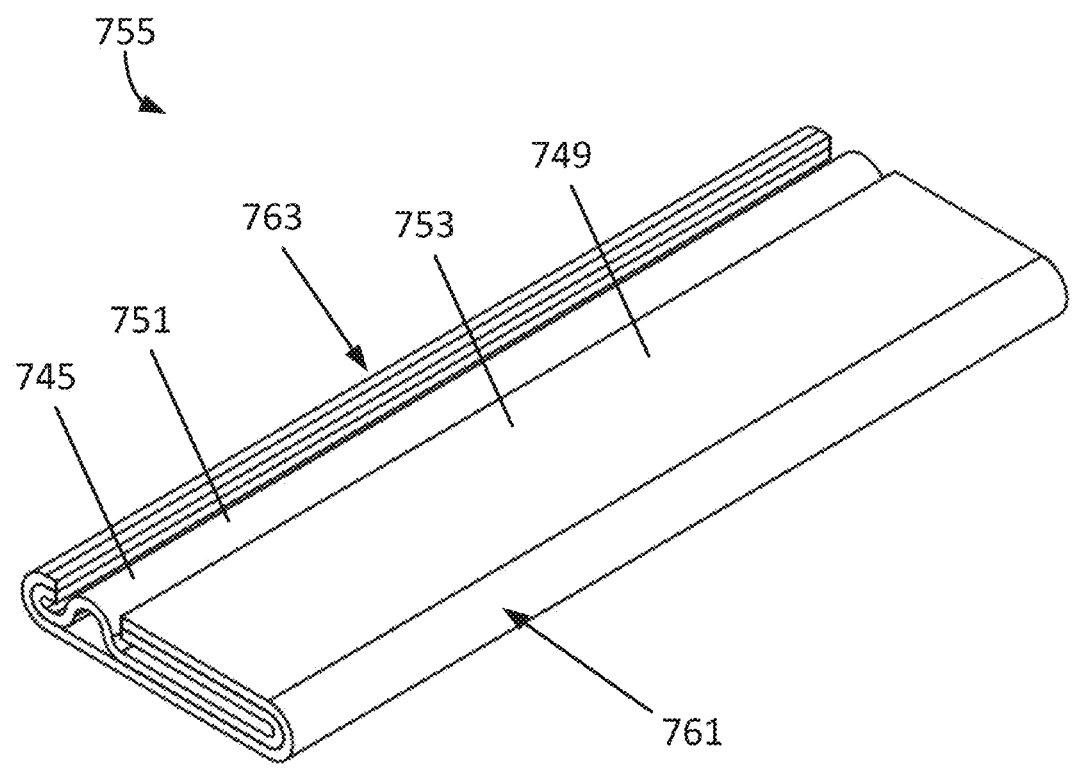

The first material 745 and the second material 749 may be mechanically coupled to each other by coupling at least a portion of the first material 745 to at least a portion of the second material 749 as shown in FIG. 12D. Generally, at least a portion of the first material 745 may be positioned adjacent to at least a portion of the second material 749 to couple the two materials. In at least one embodiment, at least a portion of the second material 749 may be wrapped about at least a portion of the first material 745, e.g., while being bent, to provide effective mechanical coupling between the first material 745 and the second material 749. For example, the sides of the first material 745 and the sides of the second material 749 may be moved towards each other to be coupled to each other. As shown, the mechanical coupling between the first material 745 and the second material 749 includes a first 180 degree bend 761 and a second 180 degree bend 763. Each of the bends 761, 763 may be formed concurrently (e.g., at the same time) or separately (e.g., one at a time).

Further, the bends 761, 763 for each of the first material 745 and the second material 749 may also be formed concurrently (e.g., at the same time) or separately (e.g., one at a time). For example, the bends 761, 763 for the first material 745 may be formed prior to locating the first material 745 proximate the second material 749. Then, the second material 749 may be bent or wrapped around the first material 745.

Further, for example, the bends 761, 763 for the second material 749 may be formed prior to locating the first material 745 proximate the second material 749. In this example, after each of the first material 745 and the second material 749 are formed or bent, the first material 745 may be slid into the second material 749 to be adjacent to the first material 745 for mechanical coupling.

As shown in FIG. 12D, the first material 745 may provide a connector element coupling portion 751 and the second material 749 may provide an electrode coupling portion 753. Taken together, the connector element coupling portion 751 and the electrode coupling portion 753 may form a mandrel portion 755.

To further provide the coupling between the connector element coupling portion 751 and the electrode coupling portion 753, the portions 751, 753 may be crimped, welded (e.g., laser welded, spot welded, etc.), adhered, etc. to each other. For example, a polymer portion may be molded over at least a portion of the mandrel portion 755 to mechanically couple each of the connector element coupling portion 751 and the electrode coupling portion 753 as described in U.S. Pat. App. Pub. No. 2013/0288092 entitled "ELECTRODE ASSEMBLIES INCLUDING INSULATIVE PORTIONS" and filed on Apr. 26, 2012, issued as U.S. Pat. No. 9,356,264 on May 31, 2016, which is incorporated herein by reference in its entirety.

Another exemplary mandrel 820 is depicted in FIGS. 13A-13E. The exemplary mandrel 820 may include a positive mandrel portion 822 and a negative mandrel portion 824 arranged along an axis 808. Although each of the positive and negative mandrel portions 822, 824 are depicted, only the positive mandrel portion 822 will be described in further detail herein for simplicity. It is to be understood that the negative mandrel portion 824 may include the same or similar features and/or elements of the positive mandrel portion 822 and may be configured in the same, or in a similar, way.

The positive mandrel portion 822 may include a connector element coupling portion 850 configured to be coupled to a connector element (e.g., coupled by laser welding, ultrasonic welding, crimping, stamping, pressing, etc.) such as, e.g., a feedthrough pin, and an electrode coupling portion 860 configured to be coupled to an electrode (e.g., coupled by laser welding, ultrasonic welding, crimping, stamping, pressing, etc.). Similar to the exemplary mandrel portion 520 described here with reference to FIGS. 10A-10B, the exemplary positive mandrel portion 822 may be produced using one or more various mechanical processes such as progressive stamping, crimping, swaging etc. For example, at least a portion of the connector element coupling portion 850 may be positioned adjacent to at least a portion of the electrode coupling portion 860 to provide a mechanical coupling therebetween. Further, the mechanical coupling between the connector element coupling portion 850 and the electrode coupling portion 860 may provide an electrical coupling therebetween.

As shown, the connector element coupling portion 850 and electrode coupling portion 860 together define a connector element coupling region 870 for the electrical and mechanical coupling of a connector element 890 (shown in FIG. 13B) to the positive mandrel portion 822. For example, both of the connector element coupling portion 850 and the electrode coupling portion 860 may define a channel 871 within which the connector element 890 may be located and coupled as generally shown and illustrated in the end view of the mandrel 820 depicted in FIG. 13E.

The connector element coupling portion 850 and the electrode coupling portion 860 may define one or more features that may improve effective mechanical coupling therebetween. For example, as shown in FIGS. 13B-13C, the connector element coupling portion 850 may define two finger portions 856 and three apertures 858 that are configured to assist in the coupling of a connector element located within the channel 871 (e.g., coupled by laser welding, ultrasonic welding, crimping, stamping, pressing, etc.). Likewise, as shown in FIG. 13D (which depicts the opposite side of the mandrel 820 as FIG. 13C), the electrode coupling portion 860 may also define two finger portions 896 and three apertures 898. The finger portions 856, 896 may be deformable, or deflectable, into the channel 871 to contact a connector element located therein (e.g., to provide pressure to the connector element, to form an interference fit, etc.). Although this embodiment defines two finger portions 856, 896 and three apertures 858, 898, it is to be understood that this embodiment or any of the other embodiments described herein may define one or more finger portions and/or one or more apertures similar to the finger portions 856, 896 and apertures 858, 898, respectively. In at least one embodiment, the finger portions 856, 896 may be deformed, or deflected, into the channel 871 before, or prior to, a connector element being located therein (e.g., the finger portions 856, 896 may be biased to a position within the channel 871, etc.). As such, when a connector element is positioned inside the channel 871, the finger portions 856, 896 may contact, or grasp, the connector element.

In at least one embodiment, the finger portions 856, 896 may not be deformed, or deflected, into the channel 871 before a connector element is located therein. In this embodiment, after a connector element has been located inside the channel 871, the finger portions 856, 896 may be deflected, or deformed, towards the connector element to contact, or grasp, the connector element to provide improved effective mechanical coupling between the connector element coupling portion 850 and/or the electrode coupling portion 860 and the connector element. For example, the finger portions 856, 896 (or tab portions) may be deflected (e.g., stamped) into the channel 871 and into contact with the connector element 890.

The apertures 858, 898 may be used to, e.g., provide fluid conduction pathways, welding sight lines (e.g., line-of-sight access for a laser weld), expand/thermal growth areas, etc. Further, the apertures 858, 898 and the finger portions 856, 896 may be formed in the connector element coupling portion 850 and electrode coupling portion 860 before or after the connector element coupling portion 850 and the electrode coupling portion 860 are coupled together. In at least one embodiment, the apertures 858, 898 and the finger portions 856, 896 are formed by laser cutting, stamping, punching, etc.

Figure 13A:
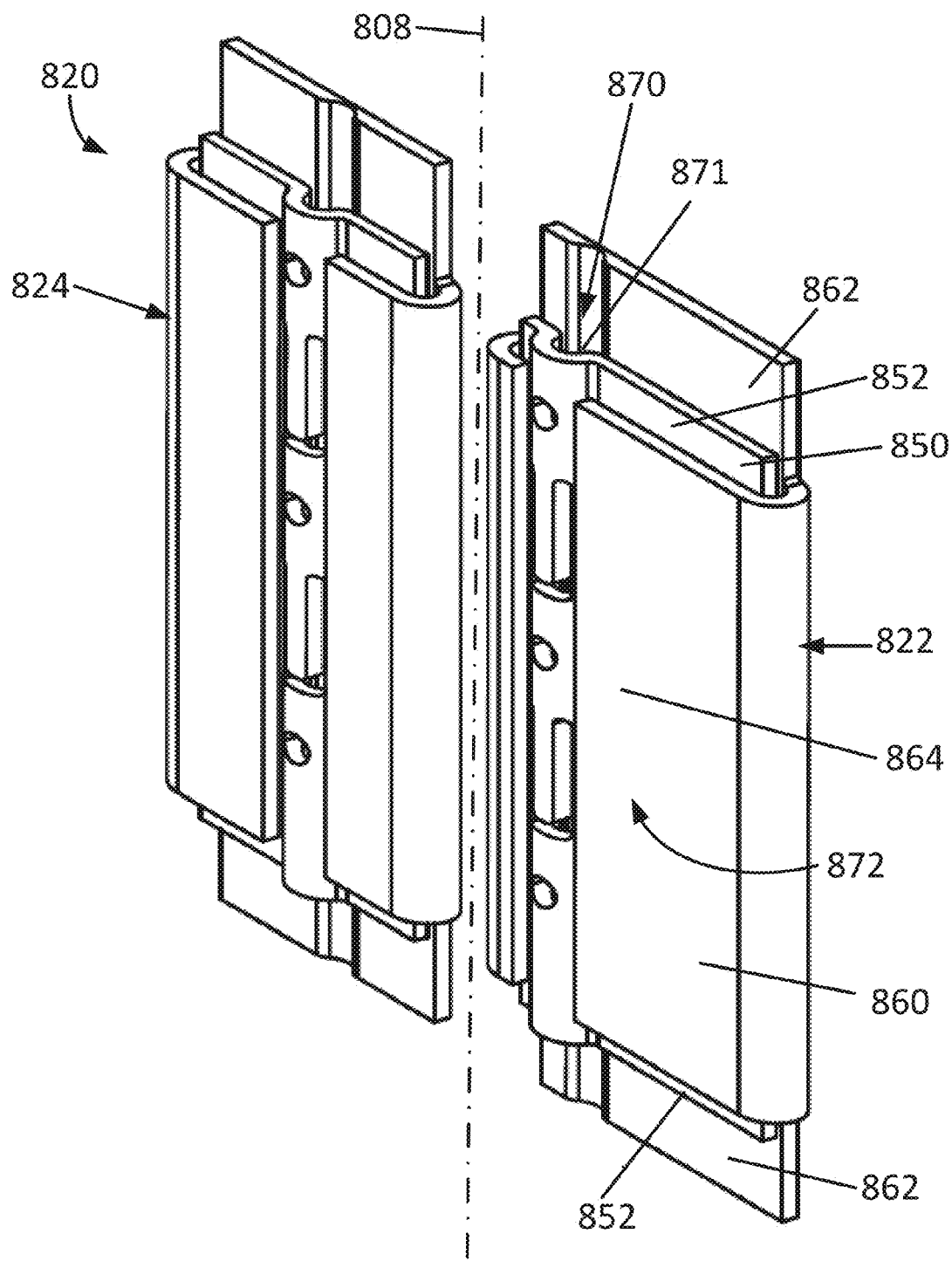
FIG. 13A is a perspective view of an exemplary mandrel for an electrode assembly including positive and negative mandrel portions, each including a connector element coupling portion and an electrode coupling portion.
Figure 13B:
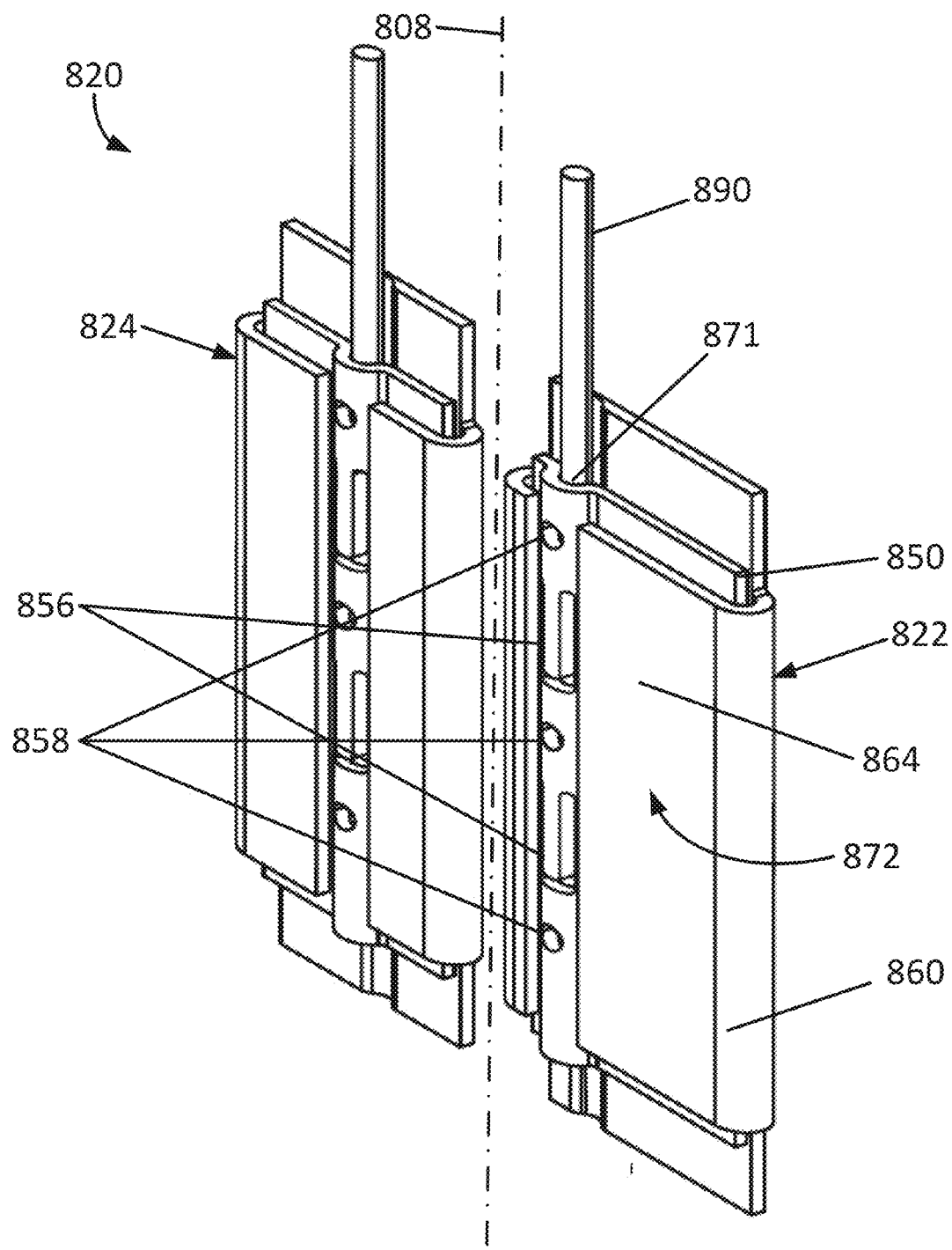
FIG. 13B is a perspective view of the mandrel of FIG. 13A with connector elements coupled thereto.
Figure 13C:
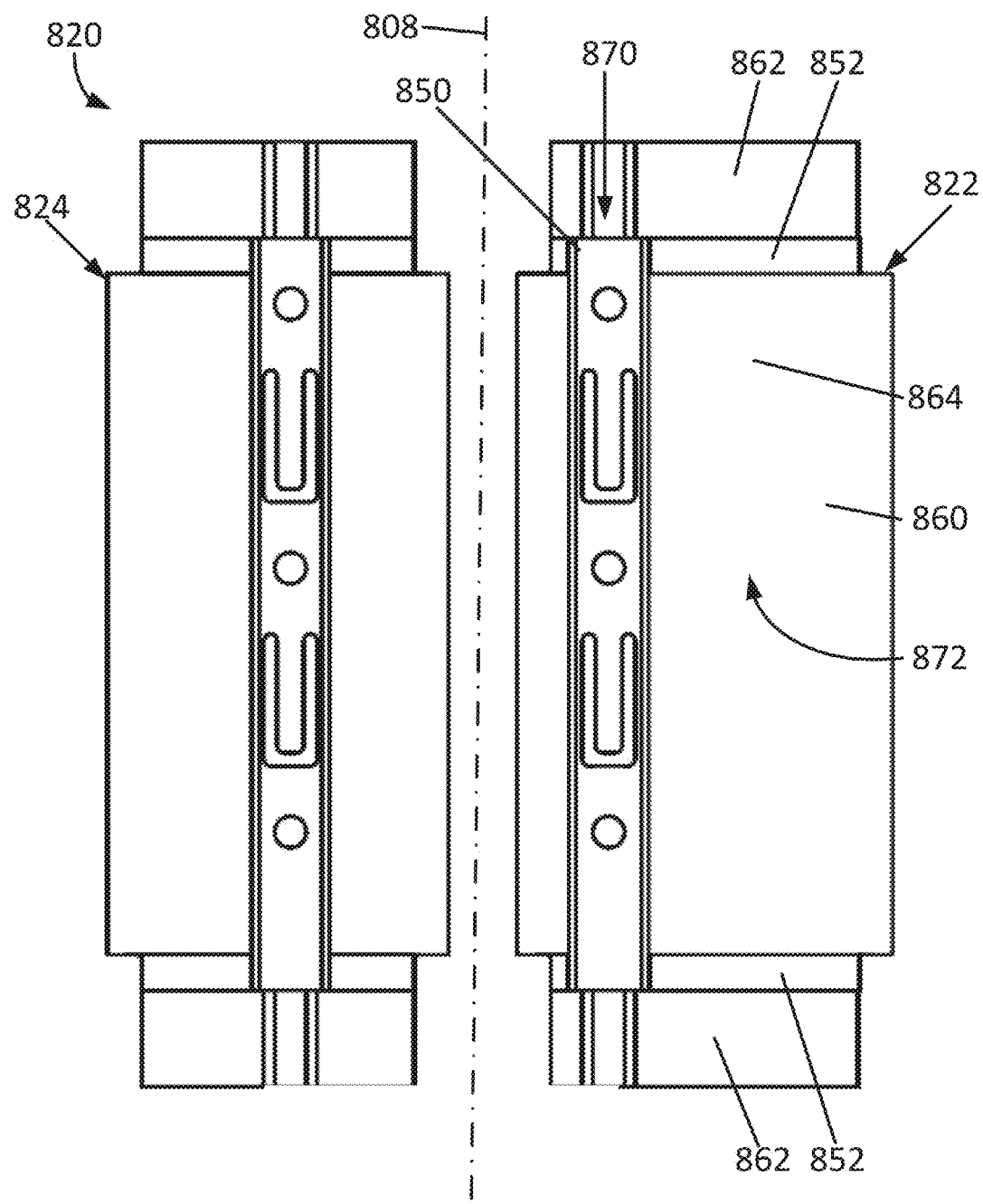
FIG. 13C is a front view of the mandrel of FIGS. 13A-13B.
Figure 13D:
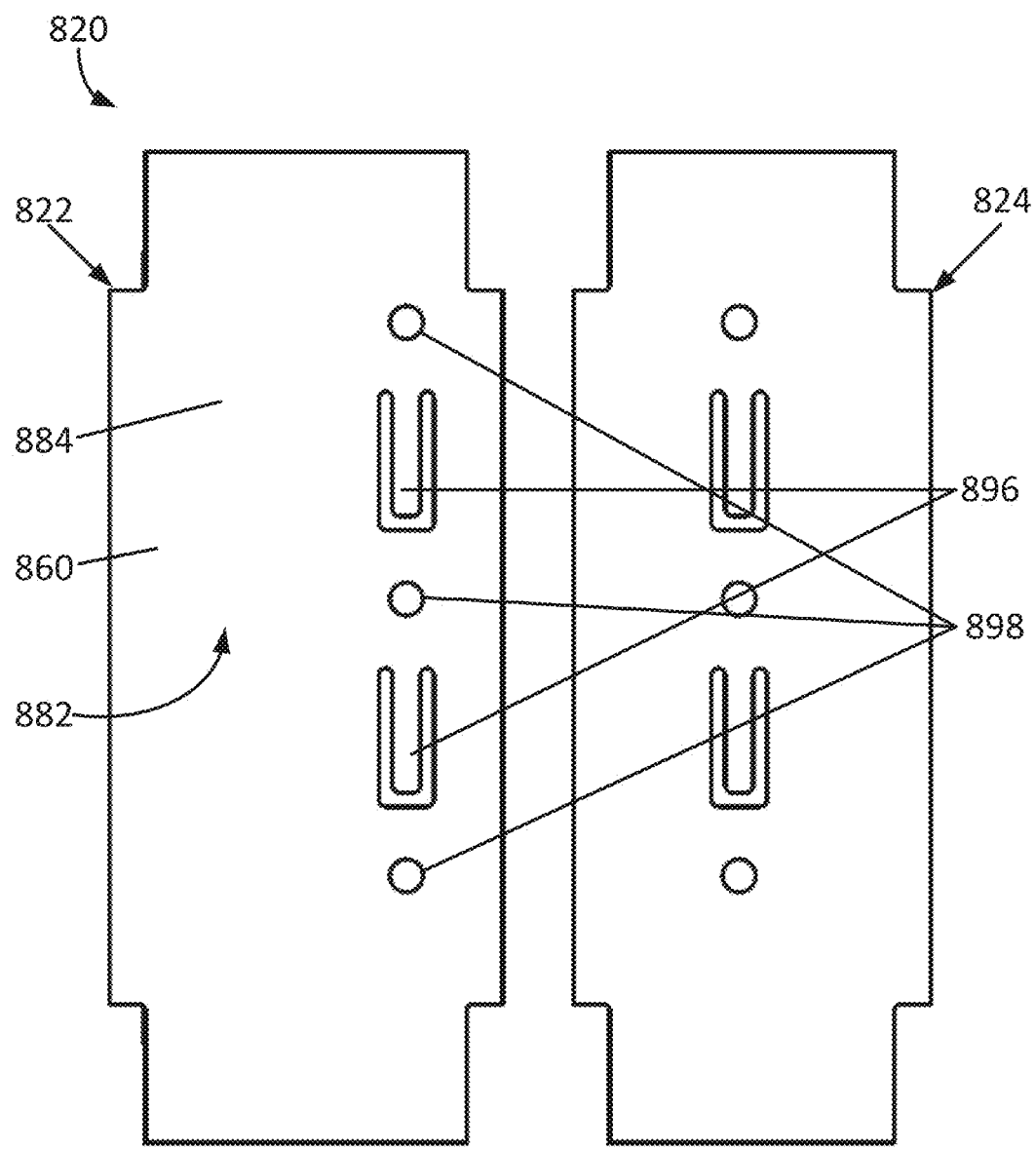
FIG. 13D is a rear view of the mandrel of FIGS. 13A-13C.

As shown in FIGS. 13A & 13D, the electrode coupling portion 860 may further define one or more electrode coupling regions 872, 882. More specifically, the electrode coupling regions 872, 882 of the electrode coupling portion 860 may define planar, or flat, surfaces 864, 884, respectively, for the coupling of an electrode thereto (e.g., coupled by laser welding, ultrasonic welding, crimping, stamping, pressing, etc.).

The electrode coupling portion 860 may further define a pair of tab portions 862 and the connector element coupling portion 850 may also further define a pair of tab portions 852 that extend out of the ends (e.g., top and bottom ends) of the positive mandrel portion 822. In at least one embodiment, the tab portions 852, 862 may be used to provide additional coupling surfaces to provide effective mechanical coupling to one or more battery assembly features such as one or more insulator portions, casings, polymer portions, etc.

Figure 13E:
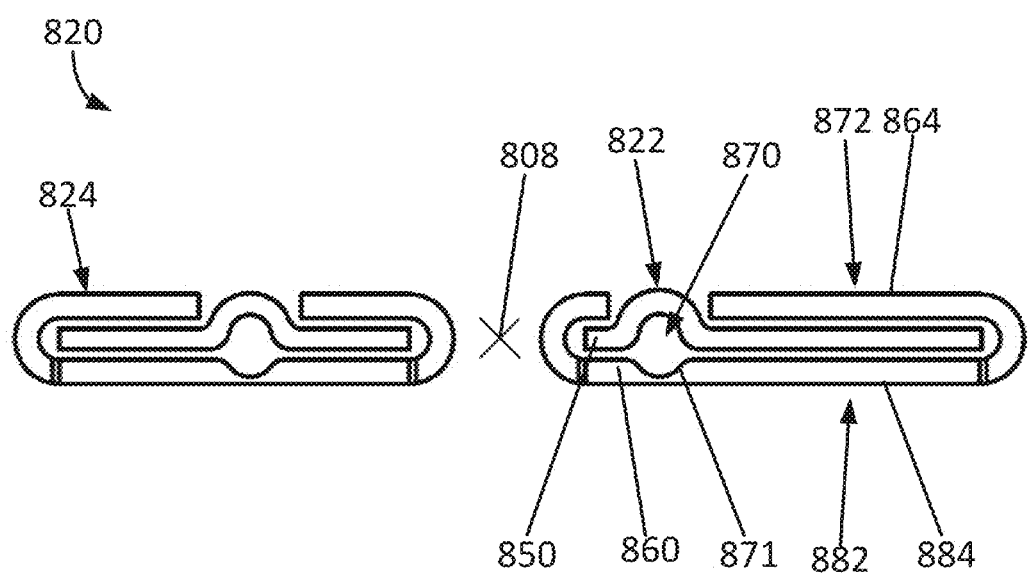
FIG. 13E is an end view of the mandrel of FIGS. 13A-13D.

In this embodiment depicted in FIGS. 13A-13E, the connector element coupling portion 850 may be generally planar (e.g., other than the channel 871 formed in the connector element coupling portion 850). For example, the sides of the connector element coupling portion 850 may not include bends similar to the bends 761, 763 described herein with reference to FIG. 12D. Instead, only the electrode coupling portion 860 may be bent such that it wraps around the generally planar connector element coupling portion 850. Further, although space is shown in FIG. 13E between the connector element coupling portion 850 and the electrode coupling portion 860, at least a portion of each of the connector element coupling portion 850 and the electrode coupling portion 860 may be positioned adjacent either other to provide coupling therebetween.

Figure 14:
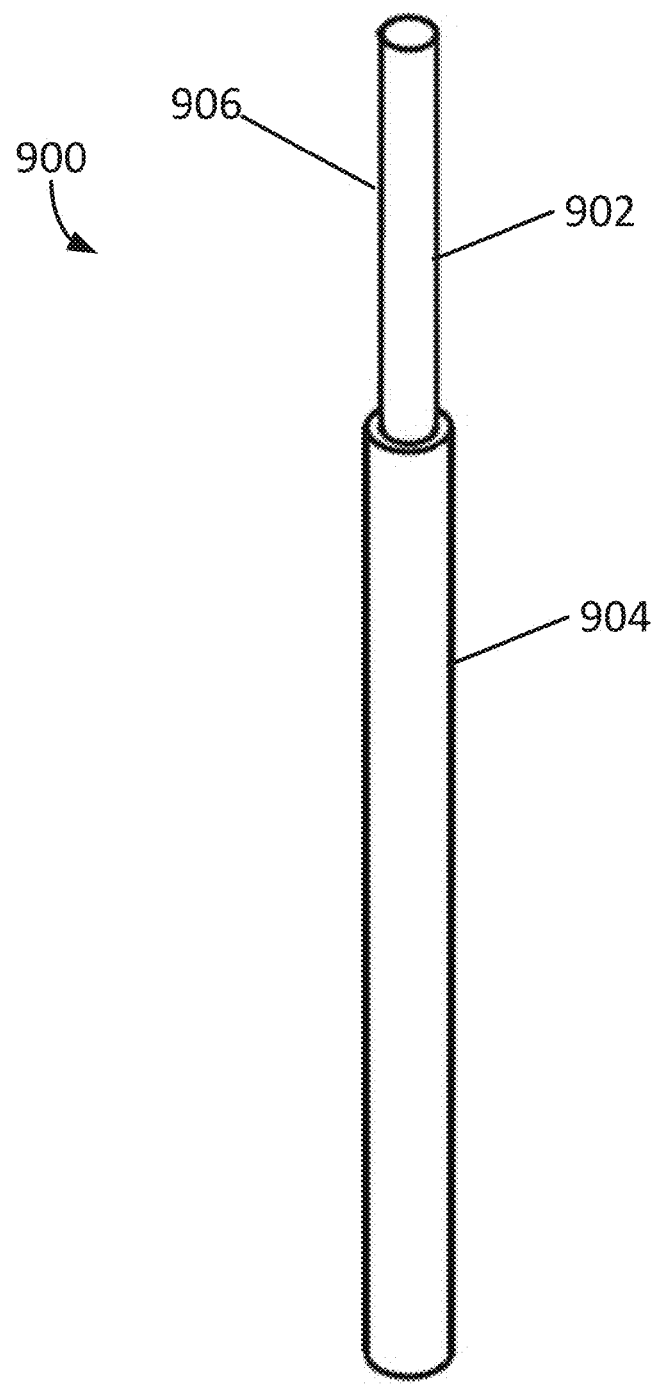
FIG. 14 is a perspective view of an exemplary connector element.

In at least one embodiment, the positive and/or negative mandrel portion of an exemplary mandrel may include a single material. Such a single material may be configured to be coupled to the electrode. For example, the single material may be aluminum, which may be similar to the electrode material. As such, to provide effective coupling to a connector element, which may be formed of a different material than the single material, a bimetal connector element 900 may be used as depicted in FIG. 14.

The bimetal connector element 900 may include a core 902 and a cladding 904. The cladding 904 may cover some or the entire core 902. As depicted, the cladding 904 covers a portion of the core 902 leaving an exposed portion 906. The cladding 904 may be formed of the same material as the positive and/or negative mandrel portion of an exemplary mandrel. For example, if the mandrel portion includes aluminum, then the cladding 904 may include aluminum. Further, the core 902 may include a different material than the cladding 904. In at least one embodiment, the core 902 may include titanium. The exposed portion 906 of the core 902 may be the portion of the connector element 900 that may extend outside of a battery assembly (e.g., through an insulator, through a top cover, and through a ferrule of a battery assembly, etc.) to be connected to an outside device.

Figure 15C:
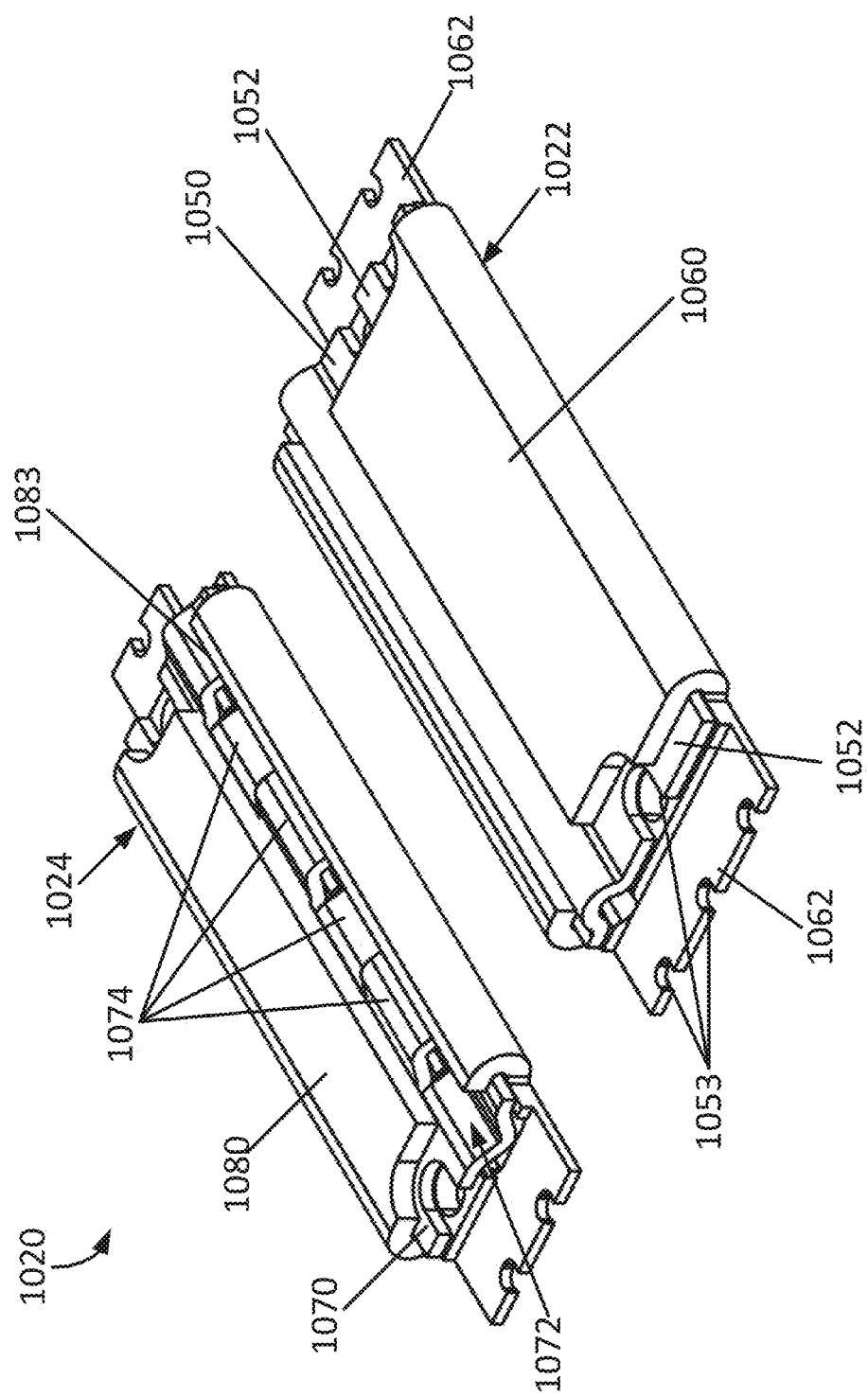
FIG. 15C is a perspective view of the mandrel of FIGS. 15A-15B.
Figure 15D:
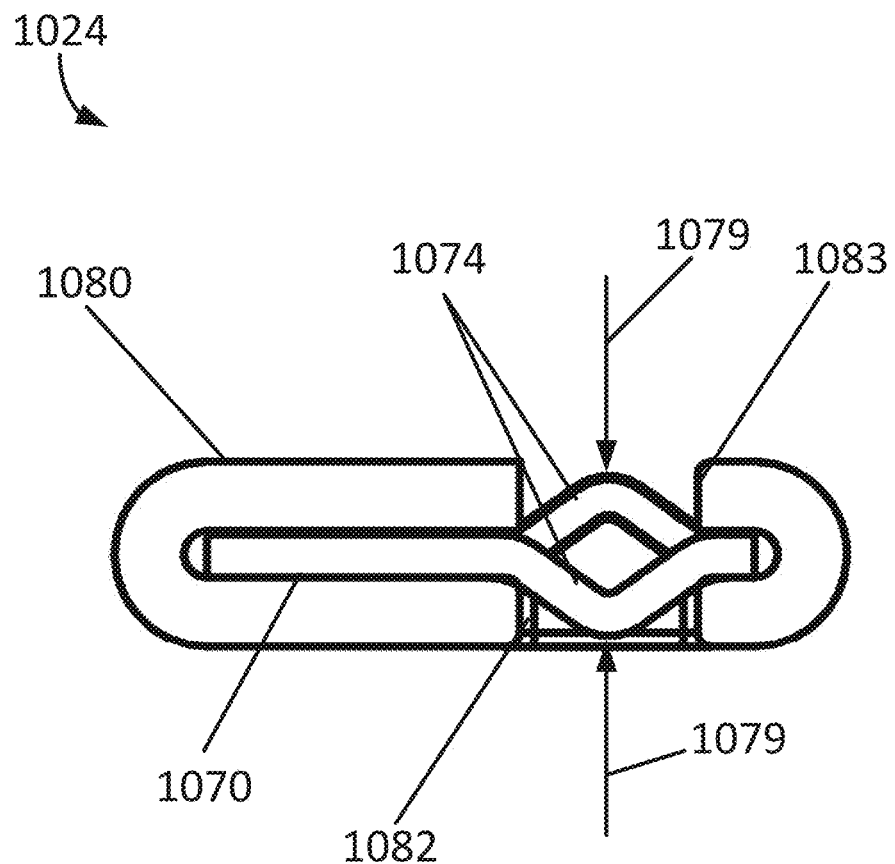
FIG. 15D is a cross sectional view of an exemplary negative mandrel portion of the mandrel of FIGS. 15A-15C.
Figure 16A:
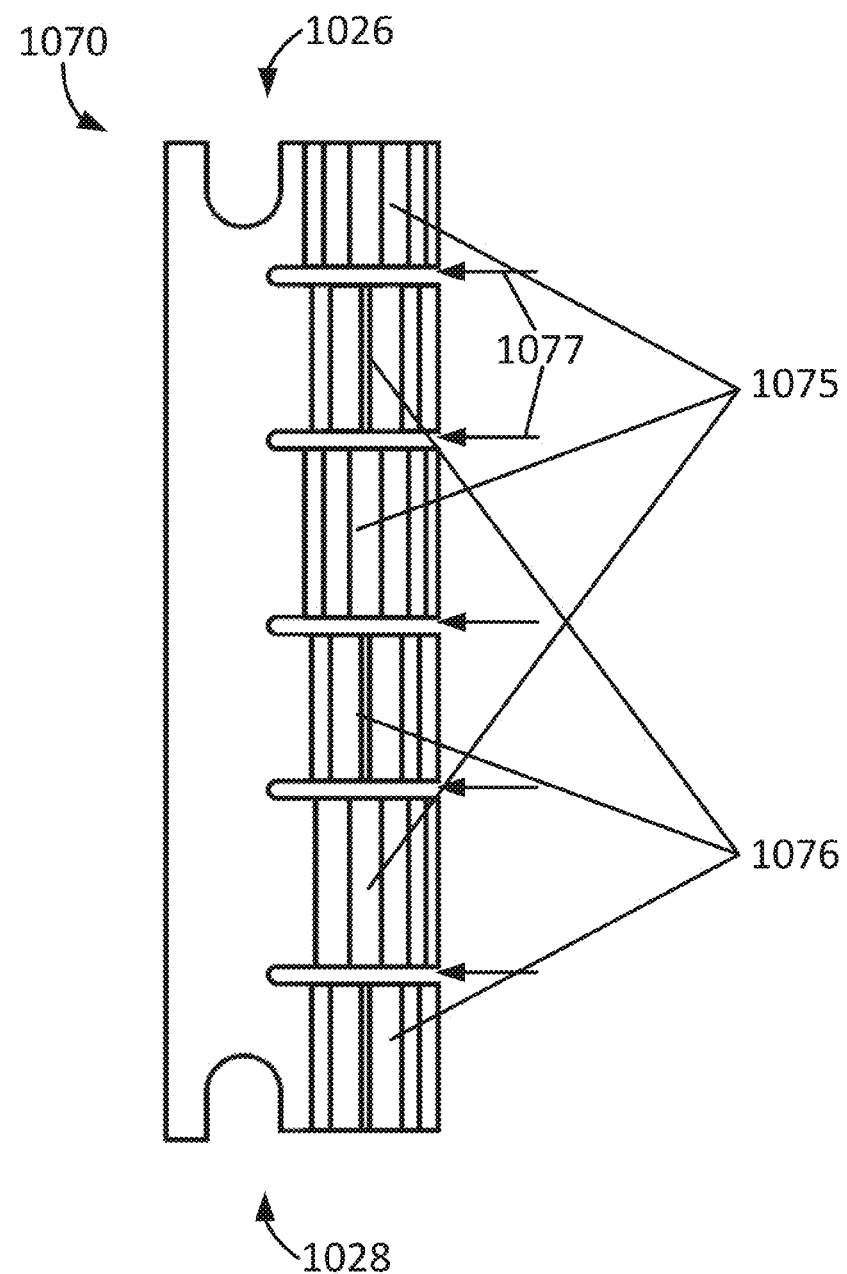
FIG. 16A is a front view of an exemplary connector element coupling portion of the negative mandrel portion of the mandrel of FIGS. 15A-15D.
Figure 16B:
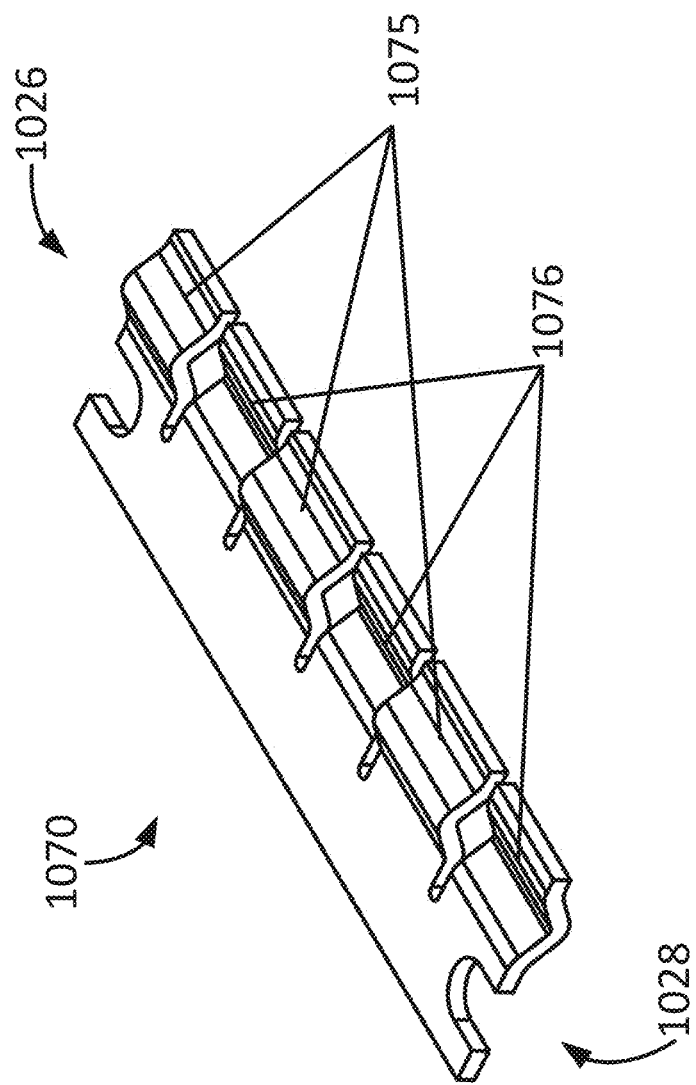
FIG. 16B is a perspective view of the connector element coupling portion of FIG. 16A.
Figure 17A:
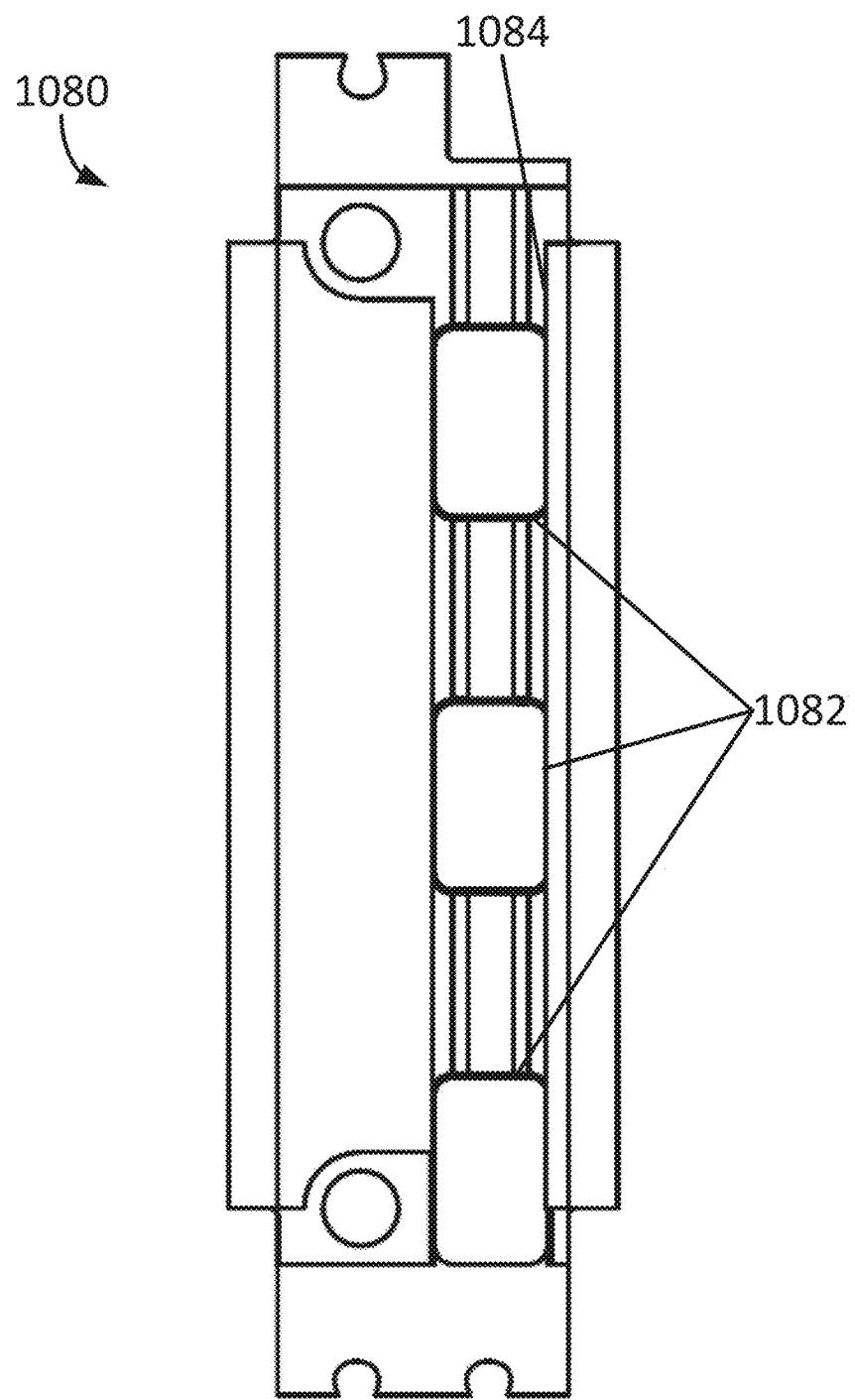
FIG. 17A is a front view of an exemplary electrode coupling portion of the negative mandrel portion of the mandrel of FIGS. 15A-15D.
Figure 17B:
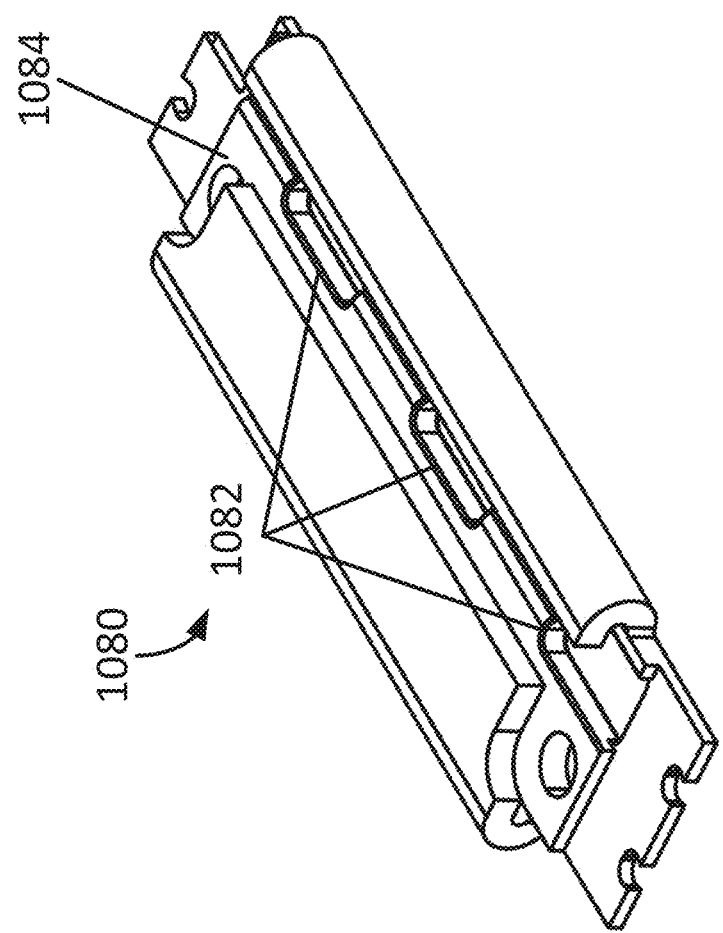
FIG. 17B is a perspective view of the electrode coupling portion of FIG. 17A.

Another exemplary mandrel 1020 and portions thereof is depicted in FIGS. 15-17. The exemplary mandrel 1020 may include a positive mandrel portion 1022 and a negative mandrel portion 1024 arranged along axis 1008. In this embodiment, the positive mandrel portion 1022 is different than the negative mandrel portion 1024 (e.g., for illustrative purposes), and as such, will be described separately. Although the positive mandrel portion 1022 is different than the negative mandrel portion 1024 in this embodiment, in other embodiments, the positive mandrel portion 1022 and the negative mandrel portion 1024 may be substantially the same. FIGS. 15A-15D depicted the exemplary mandrel 1020, FIGS. 16A-16B depict the connector element coupling portion of the negative mandrel portion 1024 of the exemplary mandrel 1020, and FIGS. 17A-17B depict the electrode coupling portion of the negative mandrel portion 1024 of the exemplary mandrel 1020. In other words, only portions of the negative mandrel portion 1024, namely the connector element coupling portion and electrode coupling portion are depicted in FIGS. 16A-16B and 17A-17B, respectively, while the entire exemplary mandrel 1020 is depicted in FIGS. 15A-15D.

As shown, the positive mandrel portion 1022 is wider (e.g., a direction perpendicular to the axis 1008) than the negative mandrel portion 1024, e.g., for manufacturability, to provide electrode coupling regions on opposite sides of the mandrel, etc. In other embodiments, the positive mandrel portion 1022 may be substantially the same size as or smaller than the negative mandrel portion 1024.

The positive mandrel portion 1022 may be similar to the positive mandrel portion 822 of the exemplary mandrel 820 of FIGS. 13A-13E. For example, the positive mandrel portion 1022 may include a connector element coupling portion 1050 and an electrode coupling portion 1060 electrically and mechanically coupled to each other. Further, each of the connector element coupling portion 1050 and the electrode coupling portion 1060 may include tab portions 1052, 1062, respectively, configured for coupling to additional electrode assembly elements such as, e.g., one or more insulator portions, casings, etc.

The tab portions 1052, 1062 may also define various features to assist in the coupling of the positive mandrel portion 1022 to additional electrode assembly elements and/or features. For example, the tab portions, 1052, 1062 may define apertures 1053 extending through the connector element coupling portion 1050 and/or the electrode coupling portion 1060. The apertures 1053 may allow a flowable material such as adhesive, insulative material, a polymer, etc. to flow through the apertures 1053 and harden in the apertures 1053 to mechanically couple the flowable material to the positive mandrel portion 1022. Further, the apertures 1053 may be configured to receive various battery assembly elements such as protrusions, bolts, etc.

The negative mandrel portion 1024 depicted in FIGS. 15A-15B includes a connector element coupling portion 1070 and an electrode coupling portion 1080 coupled together. The connector element coupling portion 1070 defines a connector element coupling region 1072 for the coupling of a connector element (e.g., coupled by laser welding, ultrasonic welding, crimping, stamping, pressing, etc.) such as a feedthrough pin. The connector element coupling portion 1070 is constructed, or formed, such that the connector element coupling region 1072 provides intermittent or broken contact to a connector element along a length of the connector element coupling region 1072.

Further, as shown more clearly in FIGS. 16A-16B, the connector element coupling portion 1070 includes a plurality of alternating fold portions 1074. The fold portions 1074 are spaced apart from one another to provide intermittent, or broken, contact with a connector element located proximate the connector element coupling region 1072 (e.g., along a length thereof). Spaces between the fold portions 1074 are indicated by arrows 1077 in FIG. 16A. Further, the fold portions 1074 may alternate to contact opposing, or diametric, sides of a connector element when the connector element is located in the connector element coupling region 1072. The fold portions 1074 may alternate between contacting a top portion and a bottom portion of a connector element from a first end 1026 to a second end 1028 of the mandrel 1010 as shown in FIGS. 16A-16B. More specifically, top fold portions 1075 may be configured to contact a top portion of a connector element and bottom fold portion 1076 may be configured to contact a bottom portion of the connector element. In this way, the fold portions 1074 may provide opposing forces (as indicated by arrows 1079 in the cross sectional view of the negative mandrel portion 1024 in FIG. 15 D taken across line 1010-1010' depicted in FIG. 15A) configured to compress a connector element therebetween to, e.g., maintain effective mechanical coupling to the connector element.

When the connector element coupling portion 1070 and the electrode coupling portion 1080 are coupled together, the bottom fold portions 1076 may extend through openings 1082 and slot 1084 of the electrode coupling portion 1080 as shown in FIG. 15B, which may assist in the coupling of the connector element coupling portion 1070 and the electrode coupling portion 1080. For example, the bottom fold portions 1076 located in the openings 1082 may restrict movement between the connector element coupling portion 1070 and the electrode coupling portion 1080.

The bottom fold portions 1076 and the top fold portion 1075 may also be compressed, or pinched, inwardly (e.g., in the same directions as the arrows 1079 of FIG. 15D) by the electrode coupling portion 1080 to further assist in the coupling between the connector element coupling portion 1070 and the electrode coupling portion 1080. For example, the perimeters of the openings 1082 and the slot 1084 may contact the bottom fold portions 1076 and the top fold portions 1075 to provide compression therebetween.

A front view and a perspective view of the electrode coupling portion 1080 are depicted in FIGS. 17A-17B, respectively. As shown, the electrode coupling portion 1080 defines a slot 1084 and a plurality of openings 1082 for receiving the fold portions 1074 of the connector element coupling portion 1070. In other words, the slot 1084 and the plurality of openings 1082 may be configured to hold the connector element coupling portion 1070 therebetween.

Figure 18A:
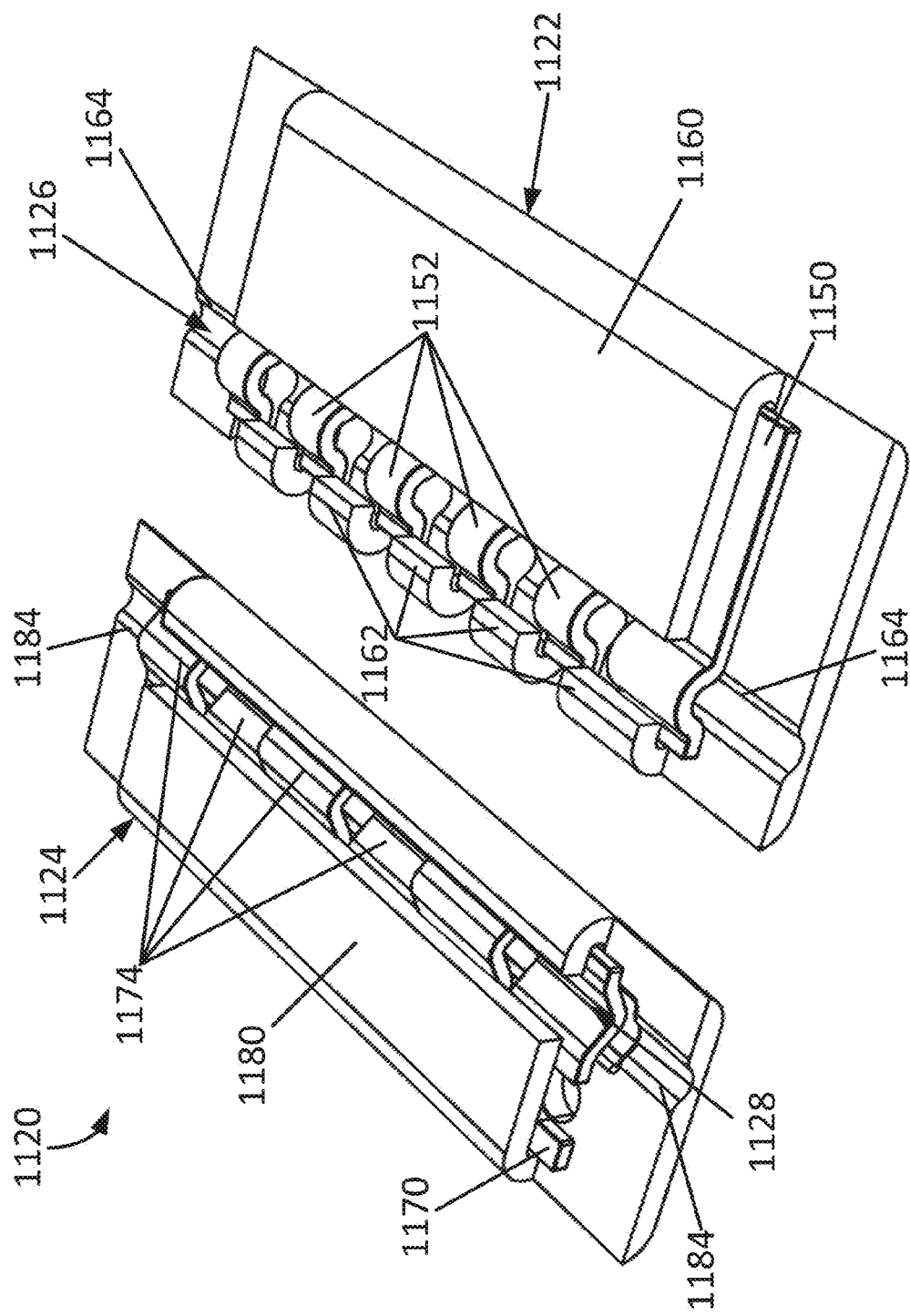
FIG. 18A is a perspective view of an exemplary mandrel for an electrode assembly including positive and negative mandrel portions, each including a connector element coupling portion and an electrode coupling portion.
Figure 18B:
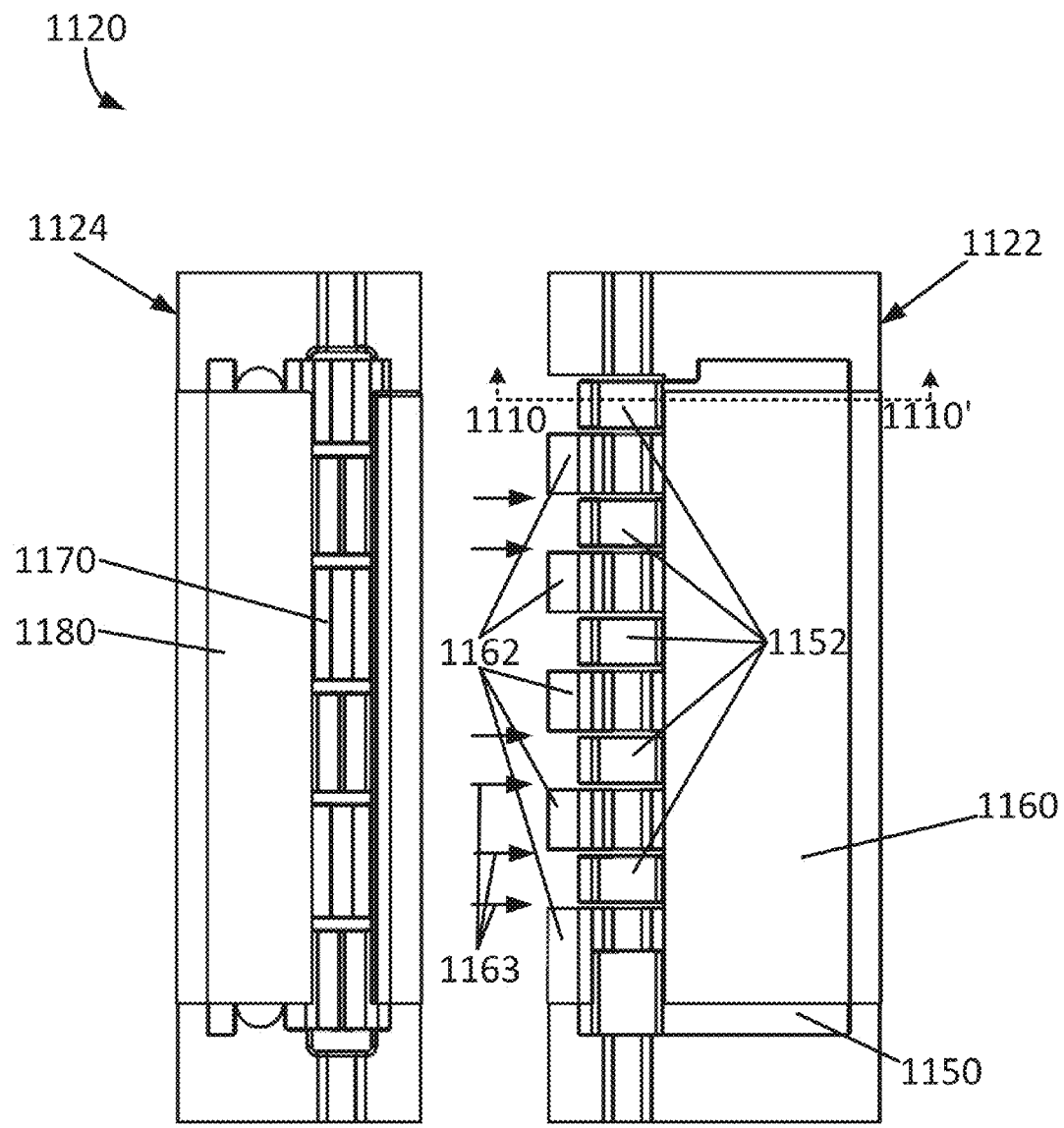
FIG. 18B is a front view of the mandrel of FIG. 18A.
Figure 18C:
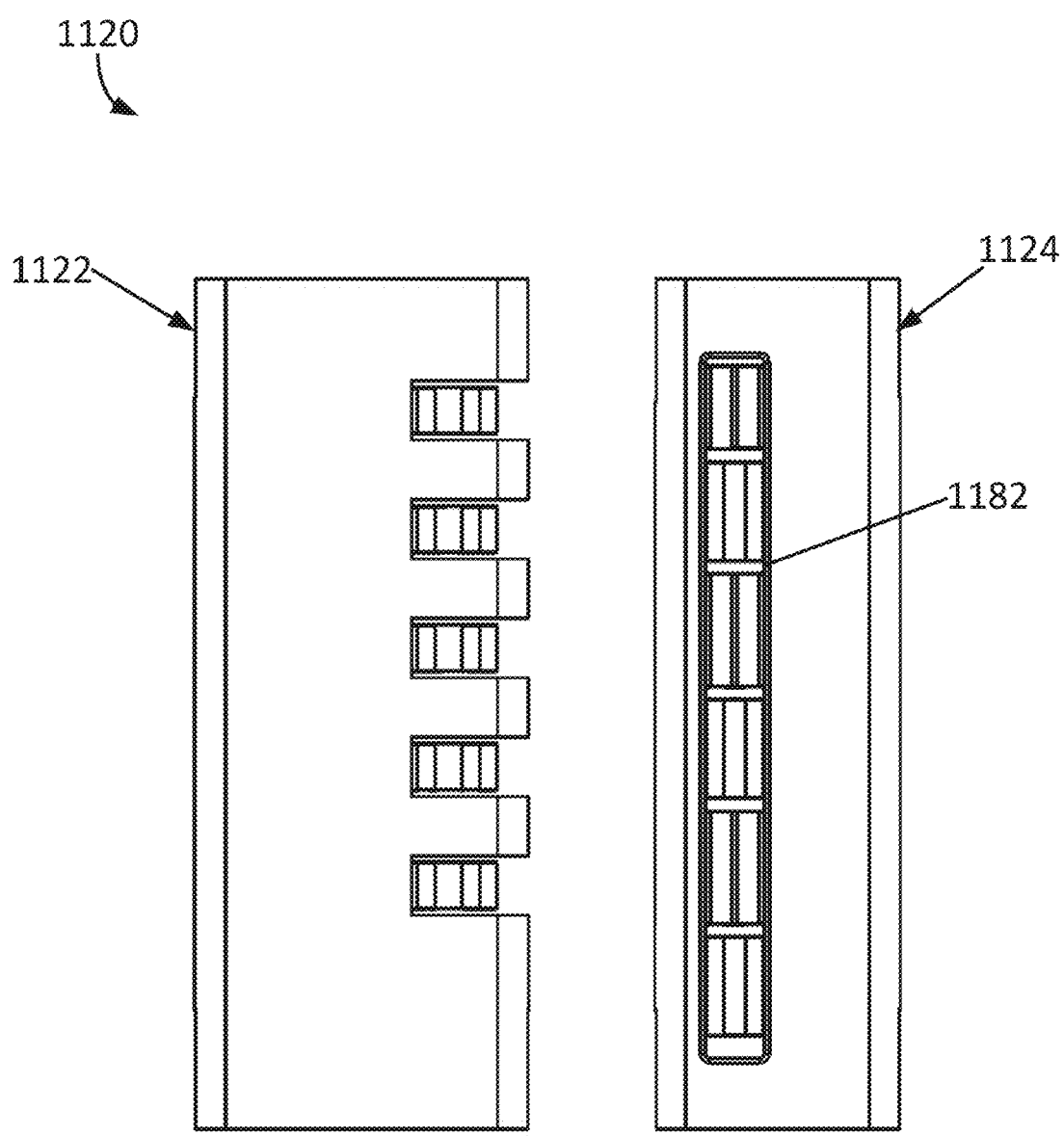
FIG. 18C is a rear view of the mandrel of FIGS. 18A-18B.
Figure 18D:
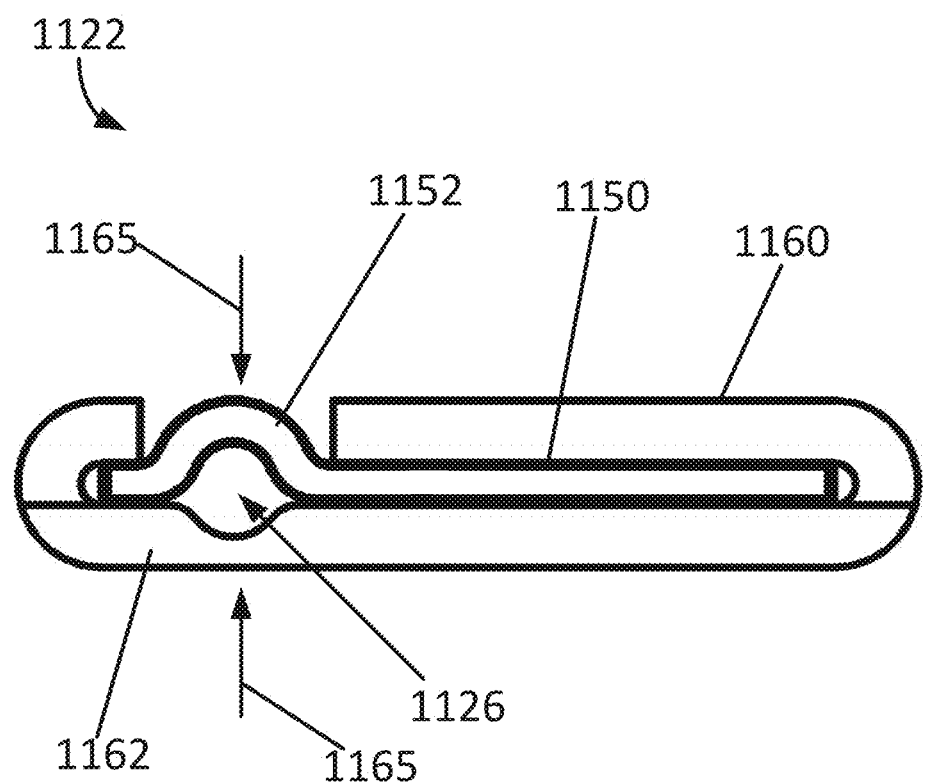
FIG. 18D is a cross sectional view of an exemplary positive mandrel portion of the mandrel of FIGS. 18A-18C.
Figure 19:
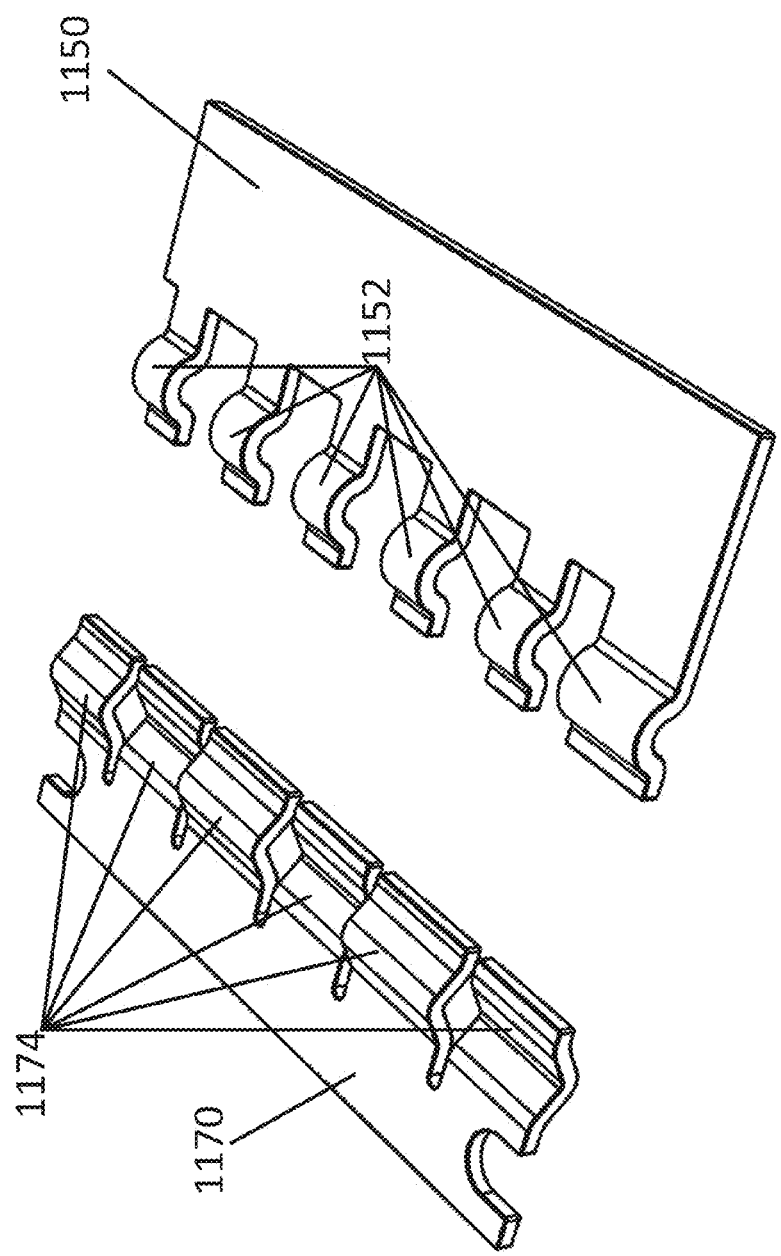
FIG. 19 is a perspective view an exemplary connector element coupling portion of the mandrel of FIGS. 18A-18D.
Figure 20:
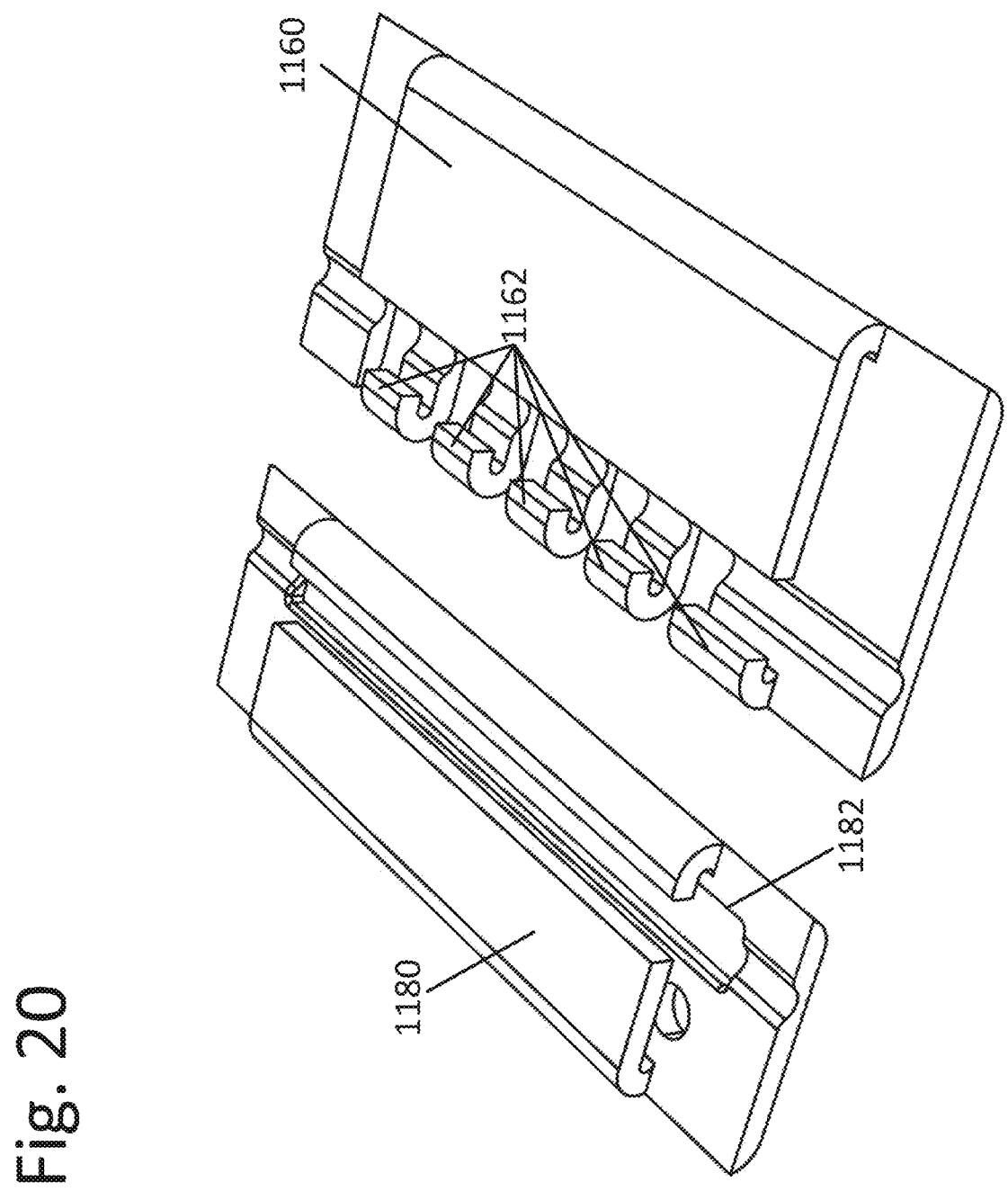
FIG. 20 is a perspective view an exemplary electrode coupling portion of the mandrel of FIGS. 18A-18D.

Yet another exemplary mandrel 1120 and portions thereof are depicted in FIGS. 18-20. The exemplary mandrel 1120 may include a positive mandrel portion 1122 and a negative mandrel portion 1124. In this embodiment, the positive mandrel portion 1122 is different than the negative mandrel portion 1124 (e.g., for illustrative purposes), and as such, will be described separately. Although the positive mandrel portion 1122 is different than the negative mandrel portion 1124 in this embodiment, in other embodiments, the positive mandrel portion 1122 and the negative mandrel portion 1124 may be substantially the same. FIGS. 18A-18D depict exemplary mandrel 1120, FIG. 19 depicts the connector element coupling portions of the exemplary mandrel 1120, and FIG. 20 depicts the electrode coupling portions of the exemplary mandrel 1120. In other words, only portions of the exemplary mandrel 1120, namely the connector element coupling portions and electrode coupling portions, are depicted in FIGS. 19 and 20, respectively, while the entire exemplary mandrel 1120 is depicted in FIGS. 18A-18D.

The negative mandrel portion 1124, however, may be similar to the negative mandrel portion 1024 of the exemplary mandrel 1020 depicted in FIGS. 15-17. For example, the connector element coupling portion 1170 of the negative mandrel portion 1124 may include a plurality of alternating fold portions 1174 similar to the plurality of alternating fold portions 1074 of the connector element coupling portion 1070 depicted in FIGS. 15-17. The fold portions 1174 may define a connector element coupling region 1128 (e.g., an intermittent or broken contact channel). The electrode coupling portion 1180 of the negative mandrel portion 1124 may, however, include a single aperture 1182 for receiving every other alternating fold portion 1174 of the connector element coupling portion 1170 as shown in FIGS. 18C & 20. Further the electrode coupling portion 1180 may also define a channel 1184 located at both ends of the electrode coupling portion 1180. The channel 1184 may be configured to receive at least a portion of a connector element to be coupled to the negative mandrel portion 1124.

The positive mandrel portion 1122 may include a connector element coupling portion 1150 and an electrode coupling portion 1160. The positive mandrel portion 1122 may define a connector element coupling region 1126. The connector element coupling region 1126 may be formed by one or both of the connector element coupling portion 1150 and the electrode coupling portion 1160.

For example, the connector element coupling portion 1150 may define a first set of coupling fingers 1152 (as shown in FIG. 19) and the electrode coupling portion 1160 may define a second set of coupling fingers 1162 (as shown in FIG. 20) to, e.g., form at least a portion of the connector element coupling region 1126. As shown in FIG. 18B, the first set of coupling fingers 1152 and the second set of coupling fingers 1162 may be spaced apart from one another to form intermittent, or broken, contact with a connector element along a length of the connector element coupling region 1126. In other words, the coupling fingers 1152, 1162 may provide an intermittent or broken contact channel for receiving a connector element. Spaces between the coupling fingers 1152, 1162, are indicated by arrows 1163 in FIG. 18B. In other words, the first and second set of coupling fingers 1152, 1162 may provide non-continuous contact with a connector element.

Further, the first set of fingers 1152 may provide a downward force on a connector element while the second set of fingers 1162 may provide an upward force on a connector element as shown by the arrows 1165 in the cross sectional view of the exemplary mandrel 1120 taken across line 1110-1110' depicted in FIG. 18D.

Similar to the negative mandrel portion 1124, the electrode coupling portion 1160 may also define a channel 1164 configured to receive at least a portion of a connector element to be coupled to the positive mandrel portion 1122.

This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A mandrel for an electrode assembly comprising:
  a positive mandrel portion and a negative mandrel portion spaced apart from the positive mandrel portion, wherein at least one of the positive mandrel portion and the negative mandrel portion comprises:
    a primary portion comprising a first conductive material, wherein the primary portion defines a connector element region configured for coupling to a connector element, wherein the connector element region defines a connector element channel configured for receiving a connector element to be coupled therein, and
    an electrode coupling portion electrically coupled to the primary portion, wherein the electrode coupling portion comprises a second conductive material different than the first conductive material, wherein the electrode coupling portion defines an electrode coupling region configured for coupling to an electrode.

2. The mandrel of claim 1, wherein the electrode coupling region comprises at least a planar surface on the electrode coupling portion for coupling an electrode thereto.

3. The mandrel of claim 1, wherein the electrode coupling region defines at least one coupling protrusion on the electrode coupling portion for coupling an electrode thereto.

4. The mandrel of claim 1, wherein the primary portion defines a mating region configured to mate with a mating region defined by at least a portion of the electrode coupling portion to mechanically couple the primary portion and the electrode coupling portion.

5. The mandrel of claim 4, wherein the mating region of the primary portion defines an opening configured to receive at least a portion of the mating region of the electrode coupling portion.

6. The mandrel of claim 1, wherein the electrode coupling portion is formed using one or more deposition techniques to deposit the second conductive material onto a deposition region of the primary portion.

7. The mandrel of claim 1, wherein the mandrel further comprises a removable portion removably coupled to both of the positive mandrel portion and the negative mandrel portion.

8. The mandrel of claim 1, wherein the first conductive material comprises titanium and the second conductive material comprises aluminum.

9. A mandrel for an electrode assembly comprising:
a positive mandrel portion and a negative mandrel portion spaced apart from the positive mandrel portion, wherein at least one of the positive mandrel portion and the negative mandrel portion comprises:
a primary portion comprising a first conductive material, and
a connector element coupling portion electrically coupled to the primary portion,
wherein the connector element coupling portion comprises a second conductive material different than the first conductive material, wherein the connector element coupling portion defines a connector element coupling region configured for coupling to a connector element, wherein the connector element coupling region defines a connector element channel configured for receiving a connector element to be coupled therein.

10. The mandrel of claim 9, wherein the primary portion defines a mating region configured to mate with a mating region defined by at least a portion of the connector element coupling portion to mechanically couple the primary portion and the connector element coupling portion.

11. The mandrel of claim 10, wherein the mating region of the primary portion defines an opening configured to receive at least a portion of the mating region of the connector element coupling portion.

12. The mandrel of claim 9, wherein the connector element coupling portion is formed using one or more deposition techniques to deposit the second conductive material onto a deposition region of the primary portion.

13. The mandrel of claim 9, wherein the primary portion defines an electrode coupling region, wherein the electrode coupling region comprises at least a planar surface on the primary portion for coupling an electrode thereto.

14. The mandrel of claim 9, wherein the mandrel further comprises a removable portion removably coupled to both of the positive mandrel portion and the negative mandrel portion.

15. The mandrel of claim 9, wherein the first conductive material comprises aluminum and the second conductive material comprises titanium.

16. The mandrel of claim 9, further comprises a connector element coupled to the connector element coupling region, wherein the connector element comprises a conductive material that is the same as the second conductive material.

17. A mandrel for an electrode assembly comprising:
a positive mandrel portion and a negative mandrel portion spaced apart from the positive mandrel portion, wherein at least one of the positive mandrel portion and the negative mandrel portion comprises:
a primary portion comprising a first conductive material, and
an electrode coupling portion electrically coupled to the primary portion, wherein the electrode coupling portion comprises a second conductive material different than the first conductive material, wherein the electrode coupling portion defines an electrode coupling region configured for coupling to an electrode,
wherein the primary portion defines a mating region configured to mate with a mating region defined by at least a portion of the electrode coupling portion to mechanically couple the primary portion and the electrode coupling portion, wherein the mating region of the primary portion defines an opening configured to receive at least a portion of the mating region of the electrode coupling portion.

18. The mandrel of claim 17, wherein the electrode coupling region comprises at least a planar surface on the electrode coupling portion for coupling an electrode thereto.

19. The mandrel of claim 17, wherein the primary portion defines a mating region configured to mate with a mating region defined by at least a portion of the electrode coupling portion to mechanically couple the primary portion and the electrode coupling portion.

20. The mandrel of claim 17, wherein the mandrel further comprises a removable portion removably coupled to both of the positive mandrel portion and the negative mandrel portion.

* * * * *